United States Patent
MacKenzie et al.

(10) Patent No.: US 10,530,011 B1
(45) Date of Patent: Jan. 7, 2020

(54) ELECTROCHEMICAL CELLS AND METAL SALT-BASED ELECTROLYTES

(71) Applicant: Imprint Energy, Inc., Alameda, CA (US)

(72) Inventors: John Devin MacKenzie, Lafayette, CA (US); Christine Ho, Fremont, CA (US); Karthik Yogeeswaran, San Francisco, CA (US); Greg Roberts, Oakland, CA (US); Chaojun Shi, Fremont, CA (US)

(73) Assignee: IMPRINT ENERGY, INC., Alameda, CA (US)

(*) Notice: Subject to any disclaimer, the term of this patent is extended or adjusted under 35 U.S.C. 154(b) by 79 days.

(21) Appl. No.: 14/805,387

(22) Filed: Jul. 21, 2015

Related U.S. Application Data

(60) Provisional application No. 62/027,140, filed on Jul. 21, 2014.

(51) Int. Cl.
  *H01M 4/02* (2006.01)
  *H01M 10/0569* (2010.01)
  *H01M 10/0568* (2010.01)
  *H01M 10/0567* (2010.01)
  *H01M 10/0565* (2010.01)

(52) U.S. Cl.
  CPC ... *H01M 10/0569* (2013.01); *H01M 10/0565* (2013.01); *H01M 10/0567* (2013.01); *H01M 10/0568* (2013.01); H01M 2220/30 (2013.01)

(58) Field of Classification Search
  CPC .................................................. H01M 10/0568
  See application file for complete search history.

(56) References Cited

U.S. PATENT DOCUMENTS

| | | | |
|---|---|---|---|
| 3,993,508 | A | 11/1976 | Erlichman |
| 4,461,816 | A | 7/1984 | Leribaux |
| 4,585,715 | A | 4/1986 | Marple |
| 4,714,665 | A | 12/1987 | Siegel et al. |
| 5,296,318 | A | 3/1994 | Gozdz et al. |
| 5,443,601 | A | 8/1995 | Doeff et al. |
| 5,540,742 | A | 7/1996 | Sangyoji et al. |
| 5,643,490 | A | 7/1997 | Takahashi et al. |
| 5,654,640 | A | 8/1997 | Bailey |
| 5,865,640 | A | 8/1997 | Bailey |
| 5,731,104 | A | 3/1998 | Ventura et al. |

(Continued)

FOREIGN PATENT DOCUMENTS

| | | |
|---|---|---|
| EP | 1449886 A1 | 8/2004 |
| EP | 1995817 A1 | 11/2008 |

(Continued)

OTHER PUBLICATIONS

US 9,053,855 B2, 06/2015, Wright et al. (withdrawn)

(Continued)

*Primary Examiner* — Jacob B Marks
(74) *Attorney, Agent, or Firm* — Wilson Sonsini Goodrich & Rosati

(57) ABSTRACT

Ion transport in electrochemical cells or energy storage devices may take place in metal salt-based electrolytes. The metal salt-based electrolytes may comprise high doping metal salt formulations. Electrochemical cells or energy storage devices comprising metal salt-based electrolytes may be used as single-use or rechargeable power sources.

20 Claims, 28 Drawing Sheets

(56) References Cited

U.S. PATENT DOCUMENTS

| | | |
|---|---|---|
| 5,865,860 A | 2/1999 | Delnick |
| 5,912,759 A | 6/1999 | Good et al. |
| 6,294,111 B1 | 9/2001 | Shacklett et al. |
| 6,316,142 B1 | 11/2001 | Delnick et al. |
| 6,369,793 B1 | 4/2002 | Parker |
| 6,379,835 B1 | 4/2002 | Kucherovsky et al. |
| 6,780,208 B2 | 8/2004 | Hopkins et al. |
| 6,986,199 B2 | 1/2006 | Arnold et al. |
| 7,277,770 B2 | 10/2007 | Huang |
| 7,316,866 B2 | 1/2008 | Yong et al. |
| 7,320,845 B2 | 1/2008 | Zucker |
| 7,335,441 B2 | 2/2008 | Luski et al. |
| 7,347,954 B2 | 3/2008 | Banno et al. |
| 7,449,033 B2 | 11/2008 | Ward et al. |
| 7,494,743 B2 | 2/2009 | Hirose et al. |
| 7,501,208 B2 | 3/2009 | Feddrix et al. |
| 7,524,587 B2 | 4/2009 | Omote |
| 7,579,112 B2 | 8/2009 | Chiang et al. |
| 7,842,420 B2 | 11/2010 | Wixom et al. |
| 7,943,254 B2 | 5/2011 | Hirose et al. |
| 7,968,248 B2 | 6/2011 | Liu et al. |
| 7,989,110 B2 | 8/2011 | Cavaille et al. |
| 8,173,299 B2 | 5/2012 | Hirose et al. |
| 8,187,753 B2 | 5/2012 | Wixom et al. |
| 8,236,446 B2 | 8/2012 | Lu |
| 9,076,589 B2 | 7/2015 | Wright et al. |
| 9,276,292 B1 | 3/2016 | MacKenzie et al. |
| 9,520,598 B2 | 12/2016 | Lockett et al. |
| 9,548,511 B2 | 1/2017 | Lockett et al. |
| 2002/0102465 A1 | 8/2002 | Chen et al. |
| 2003/0211389 A1 | 11/2003 | Schlaikjer |
| 2004/0191617 A1 | 9/2004 | Visco et al. |
| 2005/0260492 A1 | 11/2005 | Tucholski et al. |
| 2006/0035137 A1 | 2/2006 | Maruo et al. |
| 2006/0210873 A1 | 9/2006 | Hollenkamp et al. |
| 2006/0216586 A1 | 9/2006 | Tucholski |
| 2006/0251965 A1 | 11/2006 | Nagayama et al. |
| 2007/0184576 A1 | 8/2007 | Chang et al. |
| 2008/0063931 A1 | 3/2008 | Zucker |
| 2009/0075176 A1 | 3/2009 | Singh et al. |
| 2009/0173632 A1 | 7/2009 | Nagayama et al. |
| 2009/0246625 A1 | 10/2009 | Lu |
| 2009/0286157 A1* | 11/2009 | Chen .................. H01M 4/0416 429/209 |
| 2010/0216031 A1* | 8/2010 | Machida ........... H01M 10/0525 429/320 |
| 2010/0229950 A1* | 9/2010 | Kuang ................. H01G 9/2013 136/263 |
| 2011/0204020 A1 | 8/2011 | Ray et al. |
| 2011/0205688 A1 | 8/2011 | Ray et al. |
| 2012/0034515 A1 | 2/2012 | Kang et al. |
| 2012/0214047 A1 | 8/2012 | Kwak et al. |
| 2013/0273443 A1 | 10/2013 | Zhang et al. |
| 2013/0280579 A1 | 10/2013 | Wright et al. |
| 2014/0001421 A1 | 1/2014 | Lockett et al. |
| 2014/0059820 A1 | 3/2014 | Wright et al. |
| 2014/0099528 A1 | 4/2014 | Lockett et al. |
| 2014/0183421 A1 | 7/2014 | Lockett et al. |
| 2014/0302373 A1 | 10/2014 | Lockett et al. |
| 2015/0024247 A1 | 1/2015 | Lockett et al. |
| 2016/0126581 A1* | 5/2016 | Timofeeva ............ H01M 8/188 429/81 |
| 2017/0018049 A1 | 1/2017 | Ray et al. |

FOREIGN PATENT DOCUMENTS

| | | |
|---|---|---|
| EP | 2071584 A1 | 6/2009 |
| EP | 2262037 B1 | 8/2014 |
| JP | S52111625 A | 9/1977 |
| JP | H 03-238771 A | 10/1991 |
| JP | H0434871 A | 2/1992 |
| JP | H07118480 A | 5/1995 |
| JP | H11260400 A | 9/1999 |
| JP | H 11-306859 A | 11/1999 |
| JP | 2003017058 A | 1/2003 |
| JP | 2003229021 A | 8/2003 |
| JP | 2004-146346 A | 5/2004 |
| JP | 2006-049158 A | 2/2006 |
| JP | 2006-172995 A | 6/2006 |
| WO | WO 2001/080338 A1 | 10/2001 |
| WO | WO 2004/027789 A1 | 4/2004 |
| WO | WO-2005114770 A1 | 12/2005 |
| WO | WO 2007/055172 A1 | 5/2007 |
| WO | WO-2011103025 A1 | 8/2011 |
| WO | WO 2012/037171 A2 | 3/2012 |
| WO | WO-2012042004 A1 | 4/2012 |
| WO | WO-2013160240 A1 | 10/2013 |
| WO | WO-2014004712 A1 | 1/2014 |
| WO | WO-2014014758 A2 | 1/2014 |
| WO | WO-2014015074 A1 | 1/2014 |
| WO | WO-2014059127 A1 | 4/2014 |
| WO | WO-2014106088 A1 | 7/2014 |
| WO | WO-2015009867 A1 | 1/2015 |

OTHER PUBLICATIONS

Galiński, Maciej, Andrzej Lewandowski, and Izabela Stępniak. "Ionic Liquids as Electrolytes." Electrochimica Acta 51 (2006): 5567-580. Web.*

U.S. Appl. No. 13/844,221, filed Mar. 15, 2013, MacKenzie, et al.

Bates, et al. Thin-film lithium and lithium-ion batteries. Solid State Ionics. 2000; 135:33-45.

Forsyth, et al. Ionic liquids—An overview. Australian journal of Chemistry, vol. 57, pp. 113-119, 2004.

Guerrero-Sanchez, et al. Water-soluble ionic liquids as novel stabilizers in suspension polymerization reactions: engineering polymer beads Chem. Eur. J. 2006, 12, 9036-9045.

Ho, "Dispenser Printed Zinc Microbattery with an Ionic Liquid Gel Electrolyte," Dissertation Engineering—Materials Science and Engineering, University of California, Berkeley. Fall 2010, pp. 1-205.

Ho, C., et al. "Direct Write Dispenser Printing of Zinc Microbatieries," PowerMEMS 2009, Washington DC, USA, Dec. 1-4, 2009, pp. 141-144.

Ho, C.C., et al. "Direct Write Dispenser Printed Energy Storage Devices" The Jim Evans Honorary Symposium, TMS, Seattle, WA Feb. 2010, pp. 317-324.

Ho, et al. "Direct write dispenser printing of a zinc microbattery with an ionic liquid gel electrolyte," J. Micromech. Microeng. vol. 20, Sep. 14, 2010, pp. 104009.

Ho, et al. A super ink jet printed zinc-silver 3D microbattery J. Micromech. Microeng. 19:094013. Aug. 26, 2009.

Ho, et al. Direct write dispenser printed energy storage devices. Micro and Nanotechnology Sensors, Systems and Application II. Proceedings of the SPIE, vol. 7679, id. 76792A, Orlando Florida, Apr. 5, 2010.

Ho, et al. Dispenser printed electrochemical capacitors for power management of millimeter scale lithium ion polymer microbatteries for wireless sensors. Proc. 6th Int. Workshop on Micro and Nanotechnology for Power Generation and Energy Conversion Applications pp. 219-22. Nov. 29-Dec. 1, 2006.

Ho, et al. Printed energy storage devices for micro-power supplies. Naval Research Laboratory. May 25, 2010.

Ho, et al. Tailoring electrochemical capacitor energy storage using direct write dispenser printing ECS Trans. 16 35-47. Oct. 14, 2008.

Ho, et al. Technologies for an autonomous home healthcare system Proc. 6th Int. Workshop on Wearable and Implantable Body Sensor Networks pp. 29-34. Jun. 3-5, 2009.

Ho. Pneumatic Dispenser Printed Electrochemical Capacitors. Masters Thesis, University of California, Berkeley, Materials Science and Engineering. 2007.

Kumar, et al. Electrochemical Characterization of a Zinc-Based Gel-Polymer Electrolyte and Its Application in Rechargeable Batteries. J. Electrochem. Soc. 2003; 150(5):A608-A615. doi: 10.1149/1.1566017.

Kumar, et al. Electrochemical characterization of poly(vinylidenefluoride)-zinc triflate gel polymer electrolyte and its application in solid-state zinc batteries. Solid State Ionics. 2003; 160:289-300.

(56) References Cited

OTHER PUBLICATIONS

McEwen, et al. Electrochemical properties of imidazolium salt electrolytes for electrochemical capacitor applications. Journal of The Electrochemical Society, 146 (5) 1687-1695 (1999).

Miller, et al. Integration of a low frequency, tunable MEMS piezoelectric energy harvester and a thick film micro capacitor as a power supply system for wireless sensor nodes. In Energy Conversion Congress and Exposition, 2009. ECCE Sep. 2009. IEEE (pp. 2627-2634).

Seddon, et al., Influence of chloride, water and organic solvents in the physical properties of ionic liquids. Pure Appl. Chem., vol. 72, No. 12, pp. 2275-2287, 2000.

Song, et al. Review of gel-type polymer electrolytes for lithium-ion batteries. Journal of Power Sources. 1999; 77:183-197.

Steingart, et al. Dispenser Printing of Solid Polymer-Ionic Liquid Electrolytes for Lithium Ion Cells in 6th International IEEE Conference on Polymers and Adhesives in Microelectronics and avionics (Polytronic 2007), Oadaiba, Tokyo, Japan, 2007, pp. 261-264. Jan. 15-18, 2007.

Supplemental information for Xu, et al. Energetic Zinc Ion Chemistry: The Rechargeable Zinc Ion Battery. Angew. Chem Int. Ed. 2012; 51:933-935.

Wright, et al. Dispenser printing for prototyping microscale devices Trans. NAMRI/SME. 2010; 38:555-61.

Xu, et al. Energetic Zinc Ion Chemistry: The Rechargeable Zinc Ion Battery. Angew. Chem Int. Ed. 2012; 51(4):933-935.

Xu, et al. Novel zinc ion conducting polymer gel electrolytes based on ionic liquids. Electrochemistry Communications. 2005; 7:1309-1317.

Ye, et al. Zinc ion conducting polymer electrolytes based on oligomeric polyether/PVDF-HFP blends. Journal of Power Sources. 2007; 165:500-508.

Das, et al. Influence of oxide particle network morphology on ion solvation and transport in "soggy sand" electrolytes. J Phys Chem B. 2010;114(20):6830-5. doi: 10.1021/jp102548e.

Ebnesajjad, et al. Fluoropolymer additives. Ch. 9. Use of Fluorinated Additives in Coatings. 1st Edition, Elsevier, 2012, pp. 157-174.

Kunze, et al. Melting behavior of pyrrolidinium-based ionic liquids and their binary mixtures. J. Phys. Chem. C (2010), 114, 12364-12369.

Le Bideau, et al. Ionogels, ionic liquid based hybrid materials. Chem Soc Rev. 2011;40(2):907-25. doi: 10.1039/c0cs00059k. Epub Dec. 22, 2010.

Yuan, et al. Poly(ionic liquid)s: an update. Progress in Polymer Science. 2013. 38(7), 1009-1036.

Notice of allowance dated Mar. 16, 2016 for U.S. Appl. No. 13/968,603.

PCT/US2018/026960 International Search Report and Written Opinion dated Jun. 25, 2018.

Sutto, Thomas E. Hydrophobic and Hydrophilic Interactions of Ionic Liquids and Polymers in Solid Polymer Gel Electrolytes. J. Electrochem. Soc., Aug. 2007, vol. 154, Issue 10, p. 101-p. 107.

U.S. Appl. No. 15/474,763 Office Action dated Jan. 18, 2019.

* cited by examiner

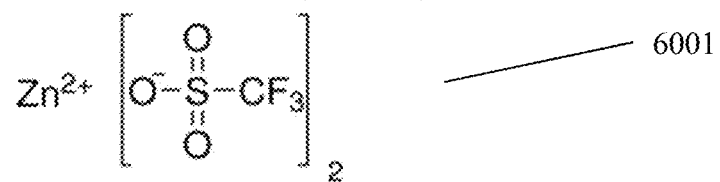
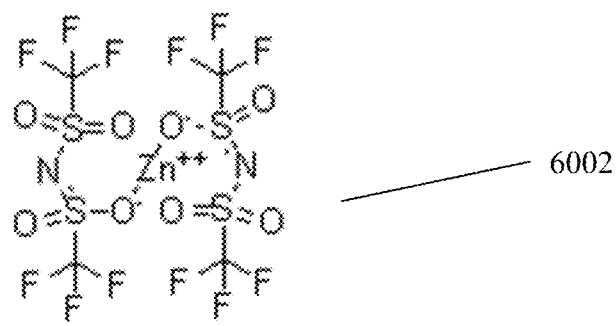
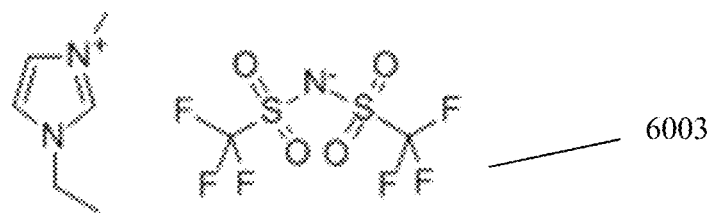
*FIG. 6*

FIG. 9A                    FIG. 9B

Carbon Current Collector

MnO$_2$ Cathode

High Zn Molarity Electrolyte

Zn Metal Anode

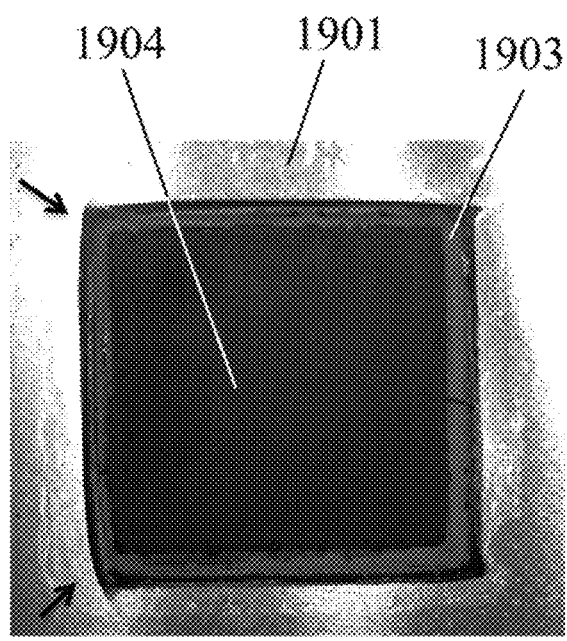 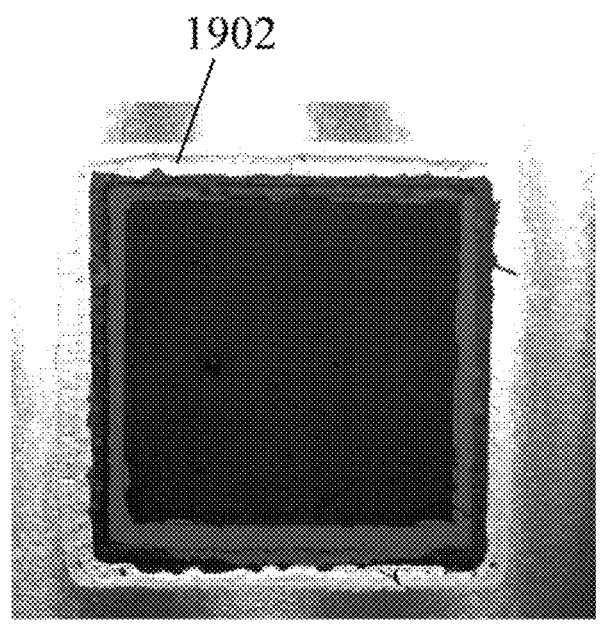
*FIG. 19A*  *FIG. 19B*

ELECTROCHEMICAL CELLS AND METAL SALT-BASED ELECTROLYTES

CROSS-REFERENCE

This application claims the benefit of U.S. Provisional Application No. 62/027,140, filed Jul. 21, 2014, which is entirely incorporated herein by reference.

BACKGROUND

The evolution of portable electronics devices, in addition to progress in thin and flexible displays, circuitry, components, interconnects and integration, can be in part attributed to the combination of advancements in battery electrode materials and their compatibility with electrolyte materials. For example, the development of more effective high energy density lithium and lithium-ion electrode materials has enabled portable, compact, high capacity batteries, while the introduction of lithium and lithium-ion solid polymer and gel electrolytes has relaxed the requirement for rigid and hard packaging, spurring the wide-spread adoption of thinner batteries, hermetically sealed within a pouch material. The sealing typically serves multiple purposes, including preventing ingress of moisture into active regions of a cell, thereby causing degradation, and preventing toxic materials from leaking out from the cell. In typical consumer applications of lithium batteries, there is also a need, either through the external product casing or structure, or through additional packaging layers around the cell, to prevent puncture of the cell and to resist fire.

SUMMARY

Recognized herein is a growing interest in small portable electronics, flexible electronics, and new emerging areas of wearable electronics and thin form factor medical electronic devices. Thin, compact and lightweight device designs that include energy storage devices (e.g., batteries) are needed. Such designs may enable realization of devices that are thinner, more flexible, curved and conformable to the body. Further recognized herein is a need for lower cost energy storage (e.g., battery) technologies. Such technologies may be enabled through use of lower cost materials and processes, including, for example, materials that are more earth abundant, less hazardous, and easier to transport and dispose of.

The present disclosure provides devices, systems and methods for ion transport. In some embodiments, the ion transport may take place in metal salt-based electrolytes. The metal salt-based electrolytes may comprise various metal salt-based electrolyte chemistries. In some embodiments, the metal salt-based electrolyte chemistries may comprise high doping metal salt formulations. These electrolytes may be utilized in electrochemical cells (also "cells" herein) or energy storage devices, such as, for example, batteries and capacitors. In some cases, the electrochemical cells or energy storage devices may be ion transport batteries, such as, for example, polymer electrolyte batteries (also "polymer ion batteries" herein). The electrolyte formulations herein may advantageously be used to achieve improved performance in polymer ion batteries. In some cases, the electrochemical cells or energy storage devices may be printed. Further, the disclosure provides methods of making electrochemical cells or energy storage devices (e.g., batteries) that may be used as single-use or rechargeable power sources.

An aspect of the disclosure is directed to an electrochemical cell comprising a first electrode, a second electrode and an electrolyte between the first electrode and the second electrode. The electrolyte comprises a metal salt and an ionic liquid. A molarity of the metal salt in the ionic liquid is greater than about 1 molar (M). The electrochemical cell is rechargeable.

Another aspect of the disclosure is directed to an electrolyte comprising a metal salt and a carrier. A molarity of the metal salt in the carrier exceeds a solubility limit of the metal salt in the carrier.

Another aspect of the disclosure relates to an electrochemical cell comprising a positive electrode, a negative electrode and an electrolyte between the positive electrode and the negative electrode. The electrolyte comprises a metal salt and an ionic liquid. A molarity of the metal salt in the ionic liquid is greater than about 1 molar (M). The electrochemical cell has a capacity of at least about 1 milliampere-hour per square centimeter (mAh/cm$^2$).

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 6 illustrates molecular structures of example salts and ionic liquids.

FIGS. 9A-9B provide images of example mixtures of a dopant in a carrier.

FIGS. 19A-19B provides optical images showing printed cell delamination in electrochemical cells without and with nanoparticle dispersion.

DETAILED DESCRIPTION

Figure 1:
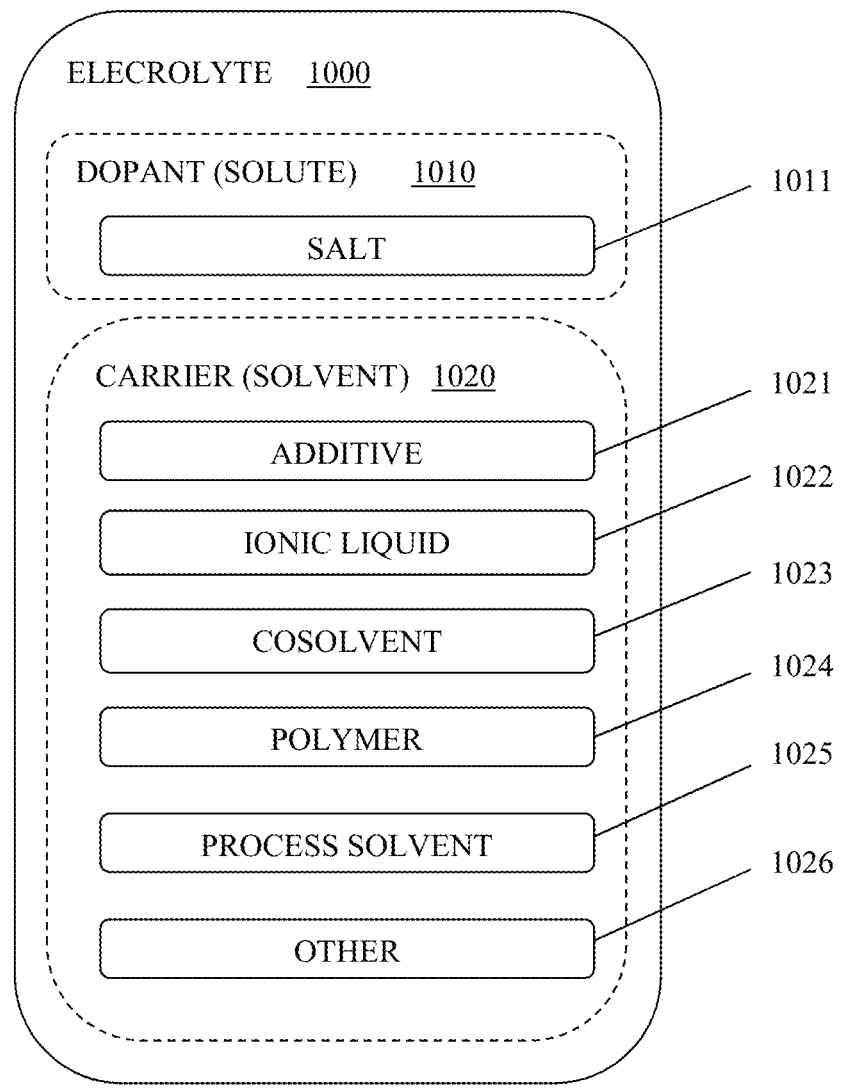
FIG. 1 is a schematic of an electrolyte comprising a dopant and a carrier.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The disclosure provides devices, systems and methods for ion transport. The ion transport may be used in electrochemical cells or energy storage devices, such as, for example, batteries and capacitors. The ion transport may include transporting ions through an electrolyte. In some embodiments, the electrolyte may be a metal salt-based electrolyte comprising a metal salt formulation. The metal salt formulation may enable metal ions to be transported through the electrolyte. In some embodiments, the metal salt formulation may comprise a high level of a metal salt. In some embodiments, the metal ions may be multivalent metal ions.

Electrolyte

An aspect of the present disclosure is directed to electrolyte formulations. The electrolytes described herein may comprise a high level (also referred to as "doping" herein) of a metal salt. These high doping formulations may comprise a composition with a given molarity (moles/volume), mole fraction (mole %, also "mol %" herein), mass fraction (weight %, also "wt. %" and "wt %" herein) or volume fraction (volume %, also "vol. %" herein) of the metal salt. The metal salt-based electrolytes herein may be used, for example, in anodic metal ion transport-based electrochemical cells.

The term "solution," as used herein, generally refers to a homogeneous mixture (at a molecular level) of molecules.

The terms "dispersion," "suspension," "colloid," "emulsion" and "slurry," as used herein, generally refer to various forms of heterogeneous mixtures.

The term "solute," as used herein, generally refers to a single molecule or a homogeneous mixture of molecules.

The term "solvent," as used herein, generally refers to a molecular medium that dissociates ions and supports them in solution (e.g., by forming a homogeneous mixture with the solute).

The term "dopant," as used herein, generally refers to a molecular medium that is mixed with a carrier. The dopant may comprise a homogeneous mixture or a heterogeneous mixture. In some embodiments, the dopant may be a solute.

The term "carrier," as used herein, generally refers to a molecular medium that supports the dopant. In some embodiments, the carrier may be a solvent. Alternatively, or in addition, the dopant may be dispersed, suspended or otherwise heterogeneously mixed with the carrier. In some embodiments, the dopant may not be dispersed or suspended at a molecular level. In some embodiments, the dopant may be dispersed or suspended in the carrier as particles or drop(let)s. In one example, the dopant may be dispersed or suspended in the carrier as particles or drop(let)s that are larger than one molecule. In another example, the solute (or a portion or component thereof) may form particles or drop(let)s, each particle or drop(let) comprising a single molecule or a solution of molecules. Thus, the dopant may be dissolved (e.g., completely dissolved) in the carrier, agglomerated within the carrier (e.g., as a dispersion, suspension, colloid, emulsion or slurry of particles or drop(let)s, each comprising one or more molecules), or any combination thereof. In some embodiments, the carrier may support particles or drop(let)s in the carrier itself. For example, the carrier may comprise particles, each particle comprising a single-molecule polymer.

The term "low volatility solvent," as used herein, generally refers to a solvent having a boiling point of greater than 250° C. and/or a vapor pressure less than about 0.1 mmHg at 25° C.

The term "high volatility solvent," as used herein, generally refers to a solvent having a boiling point of less than 250° C. and/or a vapor pressure greater than about 0.1 mmHg at 25° C.

The term "solubility," as used herein, generally refers to a solubility of a dopant in a carrier.

The term "solubility limit," as used herein, generally refers to a homogenous solubility limit in liquid, gel or solid form. Below the solubility limit, the dopant and the carrier (e.g., salt in electrolyte) may form a homogeneous mixture (e.g., a fully dissolved solution). Above the solubility limit, the dopant and the carrier may form a heterogeneous mixture (e.g., not a fully dissolved solution but a suspension exceeding the solubility limit). In some embodiments, the solubility may be inferred via light scattering. For example, detectable light scattering from a mixture in the visible to near infrared region of the optical spectrum may be compared to scattering observed from neat component(s) of the mixture (e.g., neat liquid or liquids of the mixture), and used as an indicator of exceeding the homogenous solubility limit. In another example, concentration-dependent change (s) in dynamic light scattering behavior that determine the radius of gyration of dissolved macromolecules and polymers may be used to determine the solubility and/the or solubility limit.

The term "apparent pH," as used herein, generally refers to an index of relative acidity measured with a pH meter, pH sensitive color indicator, or test strip in or in contact with a partially or substantially non-aqueous mixture.

The term "pH," as used herein, generally refers to an index of relative acidity measured with a pH meter, pH sensitive color indicator, or test strip in or in contact with any aqueous or non-aqueous mixture. In some embodiments, the pH may be an apparent pH.

FIG. 1 is a schematic of an electrolyte 1000 comprising a dopant 1010 and a carrier 1020. In some embodiments, the dopant may be a solute and the carrier may be a solvent. The dopant 1010 and/or the carrier 1020 may comprise one or more of a salt 1011 (e.g., a metal salt), an additive 1021, an ionic liquid (also "IL" herein) 1022, a cosolvent 1023 (e.g., a low volatility solvent), a polymer 1024, a process solvent 1025 (e.g., a high volatility solvent), and some other component 1026 (e.g., an agent, a stabilizer, a surfactant, etc.).

The dopant (e.g., solute) may be mixed with the carrier (e.g., solvent). In some embodiments, the dopant 1010 may be at least partially dissolved in the carrier 1020 (e.g., at least a portion of the solute may form a homogeneous mixture with the solvent). In some embodiments, the dopant 1010 may be at least partially dispersed, suspended or otherwise heterogeneously mixed in the carrier 1020 (e.g., at least a portion of the dopant may form a heterogeneous mixture with the carrier). The electrolyte 1000 may form a solution, dispersion, suspension, colloid, emulsion, or slurry. In one example, the electrolyte may form a flowable solution. In another example, the electrolyte may form a flowable suspension or colloid. Such compositions may be suitable for use as a printable ink (e.g., a printable ink for forming the electrochemical cells herein).

The printable ink may comprise a homogeneous or heterogeneous mixture. In some embodiments, the printable ink may have a lower viscosity (e.g., a liquid consistency) during printing, and a higher viscosity after printing (e.g., a semi-solid consistency). The homogeneity/heterogeneity of the electrolyte ink may undergo a change as a result of changing consistency or composition associated with forming a printed electrolyte. For example, before printing, the ink may comprise a homogeneous electrolyte mixture or a heterogeneous electrolyte mixture. At any given time during printing (or at least a portion thereof), the ink may comprise a homogeneous electrolyte mixture or a heterogeneous electrolyte mixture. Finally, at any given time after printing, the ink may comprise a homogeneous electrolyte mixture or a heterogeneous electrolyte mixture. In one example, the ink may comprise a homogeneous (or heterogeneous) mixture until shortly after printing; then, a heterogeneous (or homogeneous) mixture may form as the printed electrolyte mixture dries. In another example, the ink may comprise a first homogeneous (or heterogeneous) mixture until shortly after printing; then, a second homogeneous (or heterogeneous) mixture may form as the printed electrolyte mixture dries. In some embodiments, the electrolytes herein may be printed to form gel electrolytes (e.g., gel electrolytes comprising metal salt(s) and ionic liquid(s)) that are suspensions or colloids. In some embodiments, the electrolytes herein may be printed to form gel electrolytes (e.g., gel electrolytes comprising metal salt(s) and ionic liquid(s)) that are solutions.

The electrolyte 1000 may have a given consistency. In some cases, the consistency of the electrolyte may change. For example, electrolytes comprising the process solvent 1025 may initially have a fluid consistency. Upon evaporation of the process solvent 1025, such electrolytes may become less fluid (e.g., more viscous). In another example, the consistency of the electrolyte 1000 may change during mixing of its constituents. In some embodiments, upon evaporation, setting, curing or in other any other way acquiring a steady state consistency or composition, the electrolyte 1000 may form a liquid, a gel or a solid. For example, the electrolyte may be a gel electrolyte or a liquid electrolyte. In some cases, the electrolyte may be substantially liquid. In some cases, the electrolyte may be substantially solid. In some cases, the electrolyte may have a given viscosity, as described in greater detail elsewhere herein. In some cases, the electrolyte (e.g., steady state electrolyte) may be a mixture of solids and liquids where the liquid is an isolated, sub-percolation dispersion within the solid matrix. In some cases, the electrolyte (e.g., steady state electrolyte) may be a mixture of solids and liquids where the liquid and solid phases form a continuous, interpenetrating network which can be random or oriented preferentially relative to electrode interfaces in an electrochemical cell.

The dopant 1010 may comprise one or more components, such as, for example, the salt 1011 and/or one or more of the components of the carrier 1020 shown in FIG. 1. For example, the dopant may comprise the salt 1011 together with the additive 1021, the ionic liquid 1022, the cosolvent 1023, the polymer 1024, the process solvent 1025 and/or any of the components 1026.

In some situations, providing one or more additional components together with the dopant 1010 (e.g., the salt 1011) may improve solubility of the dopant in the carrier 1020 (e.g., in the ionic liquid 1022). For example, the salt 1011 may be first dissolved in (or mixed with) the process solvent 1025, and then the combination (e.g., a solution or a mixture) may be dissolved in the ionic liquid 1022. Similarly, providing at least a portion of the dopant 1010 (or a component thereof) in the carrier prior to main mixing of the dopant 1010 with the carrier 1020 may change the mixing characteristics (e.g., improve solubility of the dopant 1010 in the carrier 1020). Further, in some situations, the order of mixing may be of importance. For example, a metastable mixture may form upon mixing at least a portion of the dopant 1010 (or a component thereof) in the carrier 1020 (or a component thereof). Thus, various combinations of mixing steps of the components 1011, 1021, 1022, 1023, 1024, 1025 and/or 1026 may result in particular mixing characteristics. An example mixing sequence may include dissolution of the salt in the ionic liquid prior to introduction of other component(s) (e.g., additional solvents, such as, for example, the process solvent 1025 or the cosolvent 1023). Another example mixing sequence may include combining the salt with the ionic liquid (e.g., with or without adding one or more other electrolyte components) and imbibing the resulting mixture into the polymer. Another example mixing sequence may include dissolution of the salt in a solvent (e.g., the process solvent 1025 or the cosolvent 1023) prior to combination with the ionic liquid, the polymer and/or other component(s). Yet another example mixing sequence may include dissolution of the polymer in a solvent (e.g., the process solvent 1025 or the cosolvent 1023) prior to combination with the ionic liquid, the salt, other component(s), and/or simpler solutions or dispersions (e.g., simpler solutions or dispersions of ionic liquid, salt and/or other component(s)). In some examples, rapid heating, rapid cooling, high shear mixing, ultrasound, or any combination thereof, may be used to form any of the aforementioned solutions, dispersions or colloidal suspensions. Further examples relating to order of mixing are provided elsewhere herein.

Further, solubility of the dopant 1010 (e.g., the salt 1011) may vary depending on dopant-carrier combination. Thus, for example, a dopant may have a lower solubility (e.g., lower solubility limit) in a carrier comprising the cosolvent 1023 (e.g., a carbonate) than in a carrier comprising the ionic liquid 1022. As described in greater detail elsewhere herein, metal salt formulations may exhibit improved performance at high doping levels. The performance at a given doping level may vary depending on dopant-carrier combination.

The salt 1011 may comprise a cation, such as, for example, a multivalent ion of zinc (e.g., $Zn^{2+}$), aluminum (e.g., $Al^{3+}$), magnesium (e.g., $Mg^{2+}$), yttrium (e.g., $Y^{3+}$), or any combination thereof. The terms "Zn," "Al," "Mg" and "Y" may refer to cation(s) of the respective elements or to the neutral form of the respective elements. The salt 1011 may further comprise an anion, such as, for example, triflate ($CF_3SO_3^-$, also "OTf," "OTF" and "TFO" herein, also known as, for example, "trifluoromethansulfonate"), bis(trifluoromethane)sulfonamide ($((CF_3SO_2)_2N)^-$, also "TFSI" herein), bis(fluorosulfonyl)imide ($N(SO_2F)_2^-$, also "FSI" herein), acetate ($C_2H_3O_2^-$, also "OAc" herein), triflouroacetate ($CF_3CO_2^-$), hexafluorophosphate ($PF_6^-$), fluoroborate ($BF_4^-$), or any combination thereof. Further examples of anions include, but are not limited to chlorides and bis(trifluoromethylsulfonyl)amide ($NTf_2^-$). The salt 1011 may comprise an anion, such as, for example, dicyanamide ($N(CN)_2^-$, also "DCA" herein), chloride ($Cl^-$), sulfate ($SO_4^{2-}$), nitrate ($NO_3^-$) or another inorganic anion. Any combination of the aforementioned salt anions may be used (e.g., organic and inorganic anions may be combined). It will be appreciated that such nomenclature includes the ionic (anionic or cationic) form of the aforementioned compounds or elements. In some embodiments, the metal salt may be any combination of zinc triflate ($Zn(CF_3SO_3)_2$, also "Zn triflate," "Zn OTf," "Zn TFO," "Zn OTF" and "Zn[TFO]" herein), zinc bis(trifluoromethane)sulfonamide ($Zn((CF_3SO_2)_2N)_2$, also "Zn TFSI" and "Zn[TFSI]" herein), zinc bis(fluorosulfonyl)imide ($Zn(N(SO_2F)_2)_2$, also "Zn FSI" and "Zn[FSI]" herein), zinc acetate ($Zn(C_2H_3O_2)_2$, also "Zn OAc" herein), zinc triflouroacetate ($Zn(CF_3CO_2)_2$), zinc hexafluorophosphate ($Zn(PF_6)_2$), zinc fluoroborate ($Zn(BF_4)_2$), zinc dicyanamide ($Zn(N(CN)_2)_2$, also "Zn DCA" and "Zn[DCA]" herein), aluminum triflate ($Al(CF_3SO_3)_3$, also "(Al OTf)" herein, aluminum bis(trifluoromethane)sulfonamide ($Al((CF_3SO_2)_2N)_3$, also "Al TFSI" herein), aluminum bis(fluorosulfonyl)imide ($Al(N(SO_2F)_2)_3$, also "Al FSI" herein), aluminum acetate ($Al(C_2H_3O_2)_3$, also "Al OAc" herein), aluminum triflouroacetate ($Al(CF_3CO_2)_3$), aluminum hexafluorophosphate ($Al(PF_6)_3$), aluminum fluoroborate ($Al(BF_4)_3$), aluminum dicyanamide ($Al(N(CN)_2)_3$, also "Al DCA" herein), magnesium triflate (($CF_3SO_3)_2$, also "Mg OTf" herein), magnesium bis(trifluoromethane)sulfonamide ($((CF_3SO_2)_2N)_2$, also "Mg TFSI" herein), magnesium bis(fluorosulfonyl)imide ($Mg(N(SO_2F)_2)_2$, also "Mg FSI" herein), magnesium acetate ($Mg(C_2H_3O_2)_2$, also "Mg OAc" herein), magnesium triflouroacetate ($Mg(CF_3CO_2)_2$), magnesium hexafluorophosphate ($Mg(PF_6)_2$), magnesium fluoroborate ($Mg(BF_4)_2$), magnesium dicyanamide ($Mg(N(CN)_2)_2$, also "Mg DCA" herein), yttrium triflate ($Y(CF_3SO_3)_3$, also "Y OTf" herein), yttrium bis(trifluoromethane)sulfonamide ($Y((CF_3SO_2)_2N)_3$, also "Y TFSI" herein), yttrium bis(fluorosulfonyl)imide ($Y(N(SO_2F)_2)_3$, also "Y FSI" herein), yttrium acetate ($Y(C_2H_3O_2)_3$, also "Y OAc" herein), yttrium triflouroacetate ($Y(CF_3CO_2)_3$), yttrium hexafluorophosphate ($Y(PF_6)_3$), yttrium fluoroborate ($Y(BF_4)_3$), yttrium dicyanamide ($Y(N(CN)_2)_3$, also "Y DCA" herein), and related salts.

The ionic liquid 1022 may comprise a cation, such as, for example, 1-butyl-3-methylimidazolium ($BMIM^+$, also "BMIM" herein), 1-ethyl-3-methylimidazolium ($EMIM^+$, also "EMIM," "Emim" and "emim" herein), 1-ethyl-3-ethylimidazolium ($EEIM^+$, also "EEIM" herein), 1-butyl-3-methylimidazolium ($MMIM^+$, also "MMIM" herein), or any combination thereof. In some cases, in addition to or instead of imidazolium cations, the ionic liquid may comprise pyrrolidinium, ammonium, pyridinium, piperidinium, phosphonium, and/or sulfonium cations. The ionic liquid 1022 may comprise a cation, such as, for example, N-butyl-N-methyl pyrrolidinium ($Pyr14^+$) or tributylmethylammonium ($N1444^+$). Any combination of the aforementioned ionic liquid cations may be used. The ionic liquid 1022 may comprise an anion, such as, for example, acetate ($C_2H_3O_2^-$, also "OAc" herein), bis(fluoromethanesulfonyl)imide ($N(SO_2F)_2^-$, also "FSI" herein, also known as, for example, "bis(fluorosulfonyl)imide"), bis(trifluoromethanesulfonyl)imide ($((CF_3SO_2)_2N)^-$, also "TFSI" herein), or any combination thereof. Further examples of anions include, but are not limited to chlorides, triflate ($CF_3SO_3^-$, also "OTf," "OTF" and "TFO" herein, also known as, for example, "trifluoromethansulfonate"), fluoroborate ($BF_4^-$), trifluoroacetate ($CF_3CO_2^-$), hexafluorophosphate ($PF_6^-$) and bis(trifluoromethylsulfonyl)amide ($NTf_2^-$). The ionic liquid 1022 may comprise an anion, such as, for example, dicyanamide ($N(CN)_2^-$, also "DCA" herein), chloride ($Cl^-$) or another inorganic anion. Dicyanamide anions can be attractive due to the relatively low cost of ionic liquids based on these species. Any combination of the aforementioned ionic liquid anions may be used (e.g., organic and inorganic anions may be combined). It will be appreciated that such nomenclature includes the ionic (anionic or cationic) form of the aforementioned compounds or elements. The ionic liquid 1022 may include, but is not limited to, imidizolium-based fluorinated anion ionic liquids, imidizolium acetates, imidizolium fluoroacetates, pyrrolidinium ionic liquids, or any combination thereof. In some embodiments, the ionic liquid may be any combination of 1-butyl-3-methylimidazolium acetate (($BMIM)(C_2H_3O_2)$), also "BMIM OAc" herein), 1-ethyl-3-methylimidazolium acetate (($EMIM)(C_2H_3O_2)$), also "EMIM OAc" herein), 1-ethyl-3-ethylimidazolium acetate (($EEIM)(C_2H_3O_2)$), also "EEIM OAc" herein), 1-butyl-3-methylimidazolium bis(trifluoromethanesulfonyl)imide (($BMIM)(N(SO_2F)_2)$), also "BMIM FSI" herein), 1-butyl-3-methylimidazolium bis(trifluoromethanesulfonyl)imide (($MMIM)(N(SO_2F)_2)$), also "(MMIM FSI" herein), 1-ethyl-3-methylimidazolium bis(trifluoromethanesulfonyl)imide (($EMIM)(N(SO_2F)_2)$), also "EMIM FSI" and "[emim][FSI]" herein), 1-butyl-3-methylimidazolium bis(trifluoromethanesulfonyl)imide (($BMIM)((CF_3SO_2)_2N)$), also "BMIM TFSI" herein), 1-ethyl-3-methylimidazolium bis(trifluoromethanesulfonyl)imide (($EMIM)((CF_3SO_2)_2N)$), also "EMIM TFSI" and "[emim][TFSI]" herein), 1-butyl-3-methylimidazolium triflate (($BMIM)(CF_3SO_3)$), also "BMIM triflate," "BMIM triflate," "BMIM OTf" and "BMIM OTF" herein), 1-ethyl-3-methylimidazolium triflate (($EMIM)(CF_3SO_3)$), also "EMIM triflate," "EMIM OTf," "[emim][TFO]" and "EMIM TFO" herein), and 1-ethyl-3-methylimidazolium dicyanamide (($EMIM)(N(CN)_2)$), also "EMIM DCA," "[emim][DCA]" and "[Emim][DCA]" herein).

It will also be appreciated that ionic components and/or compounds may be denoted herein in various formats, including, for example, as cation anion, cation[anion] or

[cation][anion] (e.g., EMIM OTf or [emim][TFO], or Zn OTf or Zn[TFO]). Unless otherwise specified, such notation refers to a neutral compound comprising the specified cation(s) and anion(s) in appropriate stoichiometric proportions (e.g., as used herein, Zn[DCA] refers to $Zn(N(CN)_2)_2$ and Zn OTf refers to $Zn(CF_3SO_3)_2$).

FIG. 6 illustrates molecular structures of example salts 1011 and ionic liquids 1022. In some embodiments, the ionic liquid 1022 may be a room temperature ionic liquid, such as, for example, an organic salt with a low melting point (e.g., below 100° C.). Schematically shown in FIG. 6 are structures 6001, 6002 and 6003 of salts Zn OTf and Zn TFSI, and room temperature ionic liquid EMIM TFSI, respectively.

In some embodiments, the salt 1011 and the ionic liquid 1022 may comprise the same anion (but different cations). Alternatively, in some embodiments, the salt 1011 and the ionic liquid 1022 may comprise different anions. In some embodiments, the salt 1011 and the ionic liquid 1022 may comprise the same as well as different anions. Any aspects of the disclosure described in relation to anions of the salt 1011 may equally apply to anions of the ionic liquid 1022 at least in some configurations, and vice versa.

In some embodiments, cation and anion mixtures may be used to form blended electrolyte formulations. For example, cation and anion mixtures may be implemented through salt blending and/or ionic liquid blending. In some cases, ion mixing or blending may produce advantageous results. For example, mixtures comprising equal parts (e.g., 50/50 by weight or molarity) of imidizoliums or pyrrolidiniums may lower the melting point and prevent freezing out and crystallization of the ionic component from the electrolyte at lower temperatures. Illustrative examples of pyrrolidiniums and their mixtures are set forth in Kunze et al., "MELTING BEHAVIOR OF PYRROLIDINIUM-BASED IONIC LIQUIDS AND THEIR BINARY MIXTURES," J. Phys. Chem. C (2010), 114, 12364-12369, incorporated herein by reference in its entirety. Dissimilarities in crystallization behavior of mixtures may be a function of steric, enthalpic and/or other effects. In some cases, differences in ion size may be a useful parameter for designing mixtures. For example, anion size criteria for a mixture may include at least one ion (e.g., anion) species equal to or larger in size than a first anion and at least one other ion (e.g., anion) species smaller than this size. In one instance, anion size criteria for a mixture may include at least one ion (e.g., anion) species equal to or larger in size than a TFSI ion (e.g., with an estimated size of about 143 cubic Ångstroms, as set forth in McEwen et al., "ELECTROCHEMICAL PROPERTIES OF IMIDAZOLIUM SALT ELECTROLYTES FOR ELECTROCHEMICAL CAPACITOR APPLICATIONS," Journal of The Electrochemical Society, 146 (5) 1687-1695 (1999), incorporated herein by reference in its entirety) and at least one other ion (e.g., anion) species smaller than the size of the TFSI ion. In another instance, the electrolyte mixture may comprise one ion (e.g., anion) species larger or equal to that of a triflate ion (e.g., with an estimate size about 80 cubic Ångstroms) and one or more ion (e.g., anion) species smaller than the triflate ion. In some examples, cation size criteria may be used. In some cases, the use of blended salts and/or ionic liquids may provide a means to increase total ionic liquid and/or salt content in the electrolyte. For example, the electrolyte may reach a maximum solubility of a first ionic liquid and/or salt comprising a cation and a first anion (e.g., EMIM OTf), but a second ionic liquid and/or salt comprising the cation and a second anion (e.g., EMIM TFSI) may be added, leading to higher soluble concentrations of the cation (e.g., EMIM) and total anion content. In some cases, the blended formulations of the disclosure may be used to change, tailor, or improve one or more physicochemical properties of the electrolyte, as described in greater detail elsewhere herein. In one example, a blended electrolyte formulation may exhibit greater ionic conductivity than an electrolyte formulation comprising a single ionic liquid and/or salt. In another example, a blended electrolyte formulation may be used to tune metal ion stabilizing tendencies of the electrolyte by adding an anion with a more acidic conjugate acid. In yet another example, blended electrolyte formulations may be used to affect morphology and/or consistency changes of the electrolyte (e.g., of a printable ink, of a gel electrolyte, etc.). In some embodiments, the blended electrolyte formulations (e.g., cation and anion mixtures) may form a eutectic mixture.

In some implementations, the salt or the ionic liquid may comprise a mixture of anions of two or more anion types (e.g., any combination of anions described herein). In one example, one of the anion types may be a sulfonate or sulfonyl derivative and another of the anion types may not be a sulfonate or sulfonyl derivative. In another example, at least one of the anion types may be an acetate, a fluoroacetate or a dicyanamide. In some cases, the salt may comprise a mixture of anion types, and may have a lower melting point than a neat salt comprising only one of the anion types. The mixture may comprise, for example, a first anion and a second anion. In some cases, the first anion may have a volume equal to or greater than about 143 cubic Ångstroms or equal to or greater than a volume or size of a bis (trifluoromethylsulfonyl)imide anion, and the second anion may have a volume less than about 143 cubic Ångstroms or less than the volume or size of the bis(trifluoromethylsulfonyl)imide anion. In some cases, the first anion may have a volume equal to or greater than about 80 cubic Ångstroms or equal to or greater than a volume or size of a triflate anion, and the second anion may have a volume less than about 80 cubic Ångstroms or less than the volume or size of the triflate anion. A ternary, quaternary or higher order mixture of anions may have a lower melting point than (i) any individual binary mixture of the anions or (ii) a mixture comprising only one of the anions or any lower order mixture of the anions.

In some implementations, the ionic liquid may comprise a mixture of cations of two or more cation types (e.g., any combination of cations described herein). The mixture may comprise, for example, a first cation and a second cation. In some cases, the first cation may have a volume equal to or greater than about 118 cubic Ångstroms or equal to or greater than a volume or size of a 1-ethyl-3-methylimidazolium anion, and the second cation may have a volume less than about 118 cubic Ångstroms or less than the volume or size of the 1-ethyl-3-methylimidazolium anion. A ternary, quaternary or higher order mixture of cations may have a lower melting point than (i) any individual binary mixture of the cations or (ii) a mixture comprising only one of the cations or any lower order mixture of the cations.

In some implementations, the salt, the ionic liquid and/or the electrolyte (as a whole or any component(s) thereof) may comprise a mixture of cations and anions. The mixture can comprise one or more anion types and one or more cation types. A ternary, quaternary or higher order mixture of the cations and anions may have a lower melting point than any individual binary, ternary, or lower order mixture of the cations and anions.

The salt 1011 may comprise one or more salts (e.g., metal salts). In some examples, the salt 1011 may comprise a fraction (mole %, weight % or volume %) of each salt of at least about 1%, 2%, 5%, 10%, 15%, 20%, 25%, 30%, 40%, 50%, 60%, 70%, 80%, 90%, 95%, and the like. In some examples, the salt 1011 may comprise a concentration (also "content" and "level" herein) of each salt of at least about 0.1 moles/volume (M), 0.25 M, 0.5 M, 0.75 M, 1 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, and the like. In some examples, the salt 1011 may comprise a first salt and one or more second salts in a proportion (by mole, weight, volume or molarity) of at least about 10:90, 20:80, 30:70, 40:60, 50:50, 60:40, 70:30, 80:20, 90:10, and the like.

The ionic liquid 1022 may comprise one or more ionic liquids. The ionic liquids may or may not have the same cation (but different anions). The ionic liquids may or may not have the same anion (but different cations). In some examples, the ionic liquid 1022 may comprise a fraction (mole %, weight % or volume %) of each ionic liquid of at least about 1%, 2%, 5%, 10%, 15%, 20%, 25%, 30%, 40%, 50%, 60%, 70%, 80%, 90%, 95%, and the like. In some examples, the ionic liquid 1022 may comprise a concentration of each ionic liquid of at least about 0.1 M, 0.25 M, 0.5 M, 0.75 M, 1 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, and the like. In some examples, the ionic liquid 1022 may comprise a first ionic liquid and one or more second ionic liquids in a proportion (by mole, weight, volume or molarity) of at least about 10:90, 20:80, 30:70, 40:60, 50:50, 60:40, 70:30, 80:20, 90:10, and the like.

Together, the salt 1011 and the ionic liquid 1022 may comprise one or more salts (e.g., metal salts) and one or more ionic liquids. In some cases, at least a subset of the salts may comprise the same anion as at least a subset of the ionic liquids. In some examples, the salt 1011 combined with the ionic liquid 1022 may comprise a fraction (mole %, weight % or volume %) of each salt and/or of each ionic liquid of at least about 1%, 2%, 5%, 10%, 15%, 20%, 25%, 30%, 40%, 50%, 60%, 70%, 80%, 90%, 95%, and the like. In some examples, the salt 1011 combined with the ionic liquid 1022 may comprise a concentration of each salt and/or of each ionic liquid of at least about 0.1 M, 0.25 M, 0.5 M, 0.75 M, 1 M, 1.05 M, 1.1 M, 1.15 M, 1.2 M, 1.25 M, 1.3 M, 1.35 M. 1.4 M. 1.45, 1.5 M, 1.75 M, 2 M, 2.25 M, 2.5 M, 2.75 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, and the like. In some cases, the salt 1011 combined with the ionic liquid 1022 may comprise one or more portions, each portion comprising salt(s) and/or ionic liquid(s) comprising a given anion. In some examples, the salt 1011 combined with the ionic liquid 1022 may comprise a fraction (mole %, weight % or volume %) of each such portion of at least about 1%, 2%, 5%, 10%, 15%, 20%, 25%, 30%, 40%, 50%, 60%, 70%, 80%, 90%, 95%, and the like. In some examples, the salt 1011 combined with the ionic liquid 1022 may comprise a concentration of each such portion of at least about 0.1 M, 0.25 M, 0.5 M, 0.75 M, 1 M, 1.05 M, 1.1 M, 1.15 M, 1.2 M, 1.25 M, 1.3 M, 1.35 M. 1.4 M. 1.45, 1.5 M, 1.75 M, 2 M, 2.25 M, 2.5 M, 2.75 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, and the like. In some examples, the salt 1011 combined with the ionic liquid 1022 may comprise a combined fraction (mole %, weight % or volume %) of species comprising a given anion or the given anion itself of at least about 1%, 2%, 5%, 10%, 15%, 20%, 25%, 30%, 40%, 50%, 60%, 70%, 80%, 90%, 95%, and the like. In some examples, the salt 1011 combined with the ionic liquid 1022 may comprise a combined concentration of species comprising a given anion or the given anion itself of at least about 0.1 M, 0.25 M, 0.5 M, 0.75 M, 1 M, 1.05 M, 1.1 M, 1.15 M, 1.2 M, 1.25 M, 1.3 M, 1.35 M. 1.4 M. 1.45, 1.5 M, 1.75 M, 2 M, 2.25 M, 2.5 M, 2.75 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, and the like.

The cosolvent 1023 may include, but is not limited to, one or more low volatility (e.g., organic) cosolvents, such as, for example, carbonates (e.g., ethylene carbonate or propylene carbonate), fluorinated carbonates (e.g., fluorinated ethylene carbonate or various partially fluorinated alkyl carbonates), polyethers, ethylene glycols or related low molecular weight ethylene oxide derivatives, fluorinated polyethers, fluorinated ethylene glycols, and related materials. In some examples, ethylene glycol or a related low molecular weight ethylene oxide derivative (e.g., in the cosolvent 1023 or in the component 1026) can increase ionic conductivity of the electrolyte, reduce viscosity of the electrolyte, or a combination thereof. In some examples, a fluorinated polyether (e.g., in the cosolvent 1023 or in the component 1026) can increase ionic conductivity of the electrolyte, reduce viscosity of the electrolyte, change the association of other ions in the system (e.g., which may lead to more reactivity or transport of some of the ions), or a combination thereof.

The carrier 1020 may be based on the ionic liquid 1022 and/or the cosolvent 1023 (collectively referred to herein in as "carrier base"). The ionic liquid may or may not be considered a cosolvent. In some embodiments, the electrolyte formulation may comprise the ionic liquid 1022 but not the cosolvent 1023. Alternatively, in some embodiments, the electrolyte formulation may comprise the cosolvent 1023 but not the ionic liquid 1022. In yet other embodiments, a combination the ionic liquid 1022 and the cosolvent 1023 may be used. For example, neat ionic liquids and/or their solutions in several organic cosolvents may be used.

In some embodiments, the carrier base and/or the electrolyte (or any component(s) thereof) may have amphoteric properties that may aid in formation of the electrolytes of the disclosure. For example, heterogeneous mixtures (e.g., dispersions) may be formed and practically stabilized in supersaturated mixtures of salts in ionic liquids and/or network-forming polymers (e.g., PVDF-HFP). The ionic liquids may be inherently amphoteric in that they may include highly polar ionic bonding nature as well as dispersive or apolar groups. In an example, amphoteric ionic liquids are used as stabilizers for water suspensions, as described in Guerrero-Sanchez et al., "WATER-SOLUBLE IONIC LIQUIDS AS NOVEL STABILIZERS IN SUSPENSION POLYMERIZATION REACTIONS: ENGINEERING POLYMER BEADS," Chem. Eur. J. 2006, 12, 9036-9045, incorporated herein by reference in its entirety.

The carrier base (e.g., anions of the carrier) and/or the electrolyte (or any component(s) thereof) may have a given Lewis base donor property. The Lewis base donor solvent property can be an indicator of the solvation properties of, for example, a carrier base such as an ionic liquid for a range of metal ions. The stronger the Lewis base donor property, the more soluble a metal ion salt may be in the ionic liquid. The DCA anion can be a strong Lewis base donor, whereas TFO, TFSI, FSI, $PF_6^-$ and $BF_4^-$ anions can be considered weak Lewis base donors.

In some examples, the metal ion is zinc. $Zn^{2+}$ can coordinate with 3 DCA anions, creating a $Zn(DCA)_3^-$ octahedral complex. In comparison, Zn[TFO] can have a low solubility (e.g., the solution may not be transparent) in [emim][TFO] despite its common anion. For example, the maximum solubility (e.g., above which the solution is no longer clear and transparent) of a zinc salt in an ionic liquid with a common anion can vary for different anions depending on their Lewis base donor property. TABLE 1 provides example values of maximum solubilities of zinc salts in ionic liquids that have matching anions. Of the four anions in the example in TABLE 1, DCA has the strongest Lewis base donor property, and the highest solubility of a zinc salt with the same corresponding anion.

TABLE 1

| Solute | Solvent | Max solubility | |
|---|---|---|---|
| | | wt % | mol % |
| Zn[DCA] | [emim] [DCA] | 34.7 | 32 |
| Zn[FSI] | [emim] [FSI] | 26.5 | 20 |
| Zn[TFSI] | [emim] [TFSI] | 13.9 | 9 |
| Zn[TFO] | [emim] [TFO] | 10 | 8 |

Depending on the Lewis base donor properties of an anion, solubility and miscibility properties of a metal salt with that anion (e.g., a zinc salt with that anion) can also vary for other solvents, carrier bases, ionic liquids, water or any other type of dopant, carrier or electrolyte components herein. The variation may differ depending on type of solvent, carrier base, ionic liquid, water or any other type of dopant, carrier or electrolyte components herein. For example, different degrees of variation may be observed for ionic liquids and cosolvents. Solubility and miscibility may vary for various anions (other than the anion of the metal salt) in a given type of solvent, carrier base, ionic liquid, water or any other type of dopant, carrier or electrolyte components herein.

TABLE 2 provides example values of zinc salt solubilities in solvents (e.g., ionic liquids, water or organic solvents) that do not share a common anion with the zinc salt.

TABLE 2

| Solute | Solvent | Max solubility | |
|---|---|---|---|
| | | wt % | mol % |
| Zn[DCA] | [emim] [TFO] | Insoluble | |
| Zn[DCA] | water | Insoluble | |
| Zn[DCA] | PC and EC | Insoluble | |
| Zn[TFO] | [emim] [DCA] | 30 | 17 |
| Zn[TFO] | water | 56.5 | 6.0 |
| Zn[TFO] | PC | 4.93 | 1.46 |
| Zn[TFO] | PC and EC (1:1) | 3.89 | 1.05 |

Figure 20:
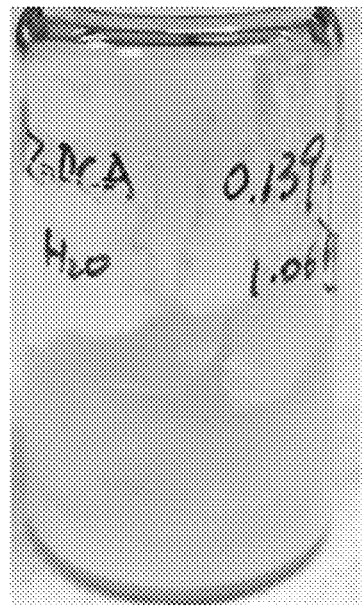
FIG. 20 is an image of an example mixture of Zn[DCA] in water.

FIG. 20 is an image of an example mixture (e.g., 0.139 grams Zn[DCA] in 1.06 grams $H_2O$) of Zn[DCA] salt in water. In this example, the solution is opaque and the salt is insoluble in water.

Depending on the Lewis base donor properties of an anion, solubility and miscibility properties of a metal salt (e.g., a zinc salt) with that anion in mixtures of different solvents, carrier bases, ionic liquids, water or any other type of dopant, carrier or electrolyte components herein can vary. For example, a mixture can combine a metal salt (e.g., a zinc salt) that is insoluble in an ionic liquid with another solvent, thereby achieving a miscible and soluble solution (e.g., a solution comprising the metal salt, the ionic liquid together and another solvent). By utilizing mixtures, high solubility solutions can be achieved, and the resulting electrolyte mixture can benefit from achieving high transport properties, high electrochemical reactivity, etc. For example, Zn[TFO] zinc salt can be sparingly soluble (e.g., have a relatively low solubility) in [emim][TFO] ionic liquid. However, Zn[TFO] can be soluble (e.g., have a relatively high solubility) in [emim][DCA] ionic liquid up to 30 wt. % or 17 mol %. When [emim][TFO] ionic liquid is added to a Zn[TFO]+[emim][DCA] solution, the mixture can remain soluble and miscible.

Ionic materials/components of the disclosure may be mixed or blended. Surprisingly, the order of mixing constituents (also "components" herein) of a mixture can influence the solubility and miscibility of the mixture. For example, when [emim][TFO] ionic liquid is added to a Zn[TFO]+[emim][DCA] solution, the mixture can remain soluble and miscible. In contrast, when [emim][TFO] ionic liquid is added to a Zn[DCA]+[emim][DCA] zinc salt and ionic liquid solution, the entire mixture can become insoluble and the system can "crash out" so that the mixture is no longer a clear solution. In another example, Zn[DCA] is dissolved into [emim][DCA] at 32 wt. %, forming a soluble, miscible and transparent solution. When 3 wt. % water is added to this mixture, the solution can become immiscible, insoluble and no longer transparent. In contrast, [emim][DCA] ionic liquid can be miscible when mixed with 3 wt. % water. When Zn[DCA] is added to the [emim][DCA]+water solution, the mixture can surprisingly remain miscible and transparent. Further examples that highlight the importance of the order of mixing are provided in TABLE 3.

Order of mixing may be advantageously used to achieve increased solubility (e.g., to get higher molarity concentrations). The order of mixing may include addition of water in a given (e.g., correct) sequence. A suitable order of mixing may advantageously allow high doping metal salt formulations (e.g., high molarity solutions) of the disclosure to be formed. Such formulations can be stable, metastable or unstable. For example, resulting solutions can be stable or at least metastable. Metastable or unstable solutions or mixtures may be stable for a given period of time.

TABLE 3 provides example observations regarding solubility of mixtures. Upon addition of an add-in material to a soluble, miscible and transparent starting solution ("Solution 1"), observed results may include various changes in solubility, miscibility, transparency, or any combination thereof.

TABLE 3

| Solution 1 | Add-in material | Result |
|---|---|---|
| 26.7 wt % Zn [TFO] in [Emim] [DCA] | [emim] [TFO] | Miscible, transparent solution |
| 32 wt % Zn [DCA] in [Emim] [DCA] | [emim] [TFO] | Immiscible solution |
| 26.7 wt % Zn [TFO] in [Emim] [DCA] | 3 wt % $H_2O$ | Miscible, transparent solution |
| 32 wt % Zn [DCA] in [Emim] [DCA] | 3 wt % $H_2O$ | Immiscible solution |
| [Emim] [DCA] + 3 wt % $H_2O$ | 32 wt % Zn [DCA] | Miscible, transparent solution |

Underlying mechanism that may affect the solubilities and/or miscibilities of different mixtures herein (e.g., salt, ionic liquid and solvent mixtures) may include, but are not limited to, different Lewis base donor solvent properties of each material (e.g., constituent), the pH of the solution, how bound various ions (e.g., the cations of the metal salt and/or the ionic liquid, or the anions of the metal salt and/or the ionic liquid) are to other ions, solvents or other constituents, or any combination thereof. For example, when [emim][DCA] is mixed with 3 wt. % water, because [emim][DCA] can be relatively neutral and/or because water can be amphoteric and may act as an acid or base depending on the environment it is in, the water may act like a base and complex with the emim cations. When Zn[DCA] salt is added to the [emim][DCA] and water solution, the mixture can remain miscible since the water can be essentially neutralized. In contrast, when Zn[DCA] is added to [emim][DCA], the DCA anions can complex strongly with the zinc ions and form a slightly basic pH environment. Water added to the Zn[DCA]+[emim][DCA] solution can respond to the basic environment by acting like an acid. As a result, in this instance, water addition in this can cause the system to become immiscible and opaque.

By utilizing mixtures with varying degrees of solvation and solubility properties, higher doping/molarity/concentration solutions can be developed. The resulting properties of a mixture (e.g., including physicochemical and electrochemical properties) can be drastically different from each of the constituents on their own or blended with only a subset of the mixture's constituents. For example, a solution of [emim][DCA] and Zn[DCA] may have drastically different electrochemical reactivity and zinc electrodeposition properties than a system in which water was also part of the mixture. Water may aid the electrolyte mixture's transport properties by decreasing, for example, viscosity. Water may drastically increase reactivity of the system (e.g., by disturbing the strong association between other ion constituents such that larger populations of ions are able to participate in redox reactions).

In another example, Zn TFO can have a low solubility in EMIM TFO (e.g., see TABLE 1), but may be very soluble in water (e.g., see TABLE 2). With a mixture of water and EMIM TFO, increased (e.g., high) salt concentrations of Zn TFO can be dissolved in the solution.

The solubility information in TABLES 1-3 and/or similar solubility information may be used to determine a suitable mixing order for various electrolyte components. In some examples, the electrolyte can be formed in a sequence in which an agent (e.g., a complexing agent) is added to the metal salt species prior to the metal salt being mixed with an ionic liquid-containing component (e.g., a component of the electrolyte that comprises the ionic liquid, such as, for example, a carrier base or a carrier). In some examples, the electrolyte can be formed in a sequence in which an agent (e.g., a complexing agent) is added to the metal salt species prior to the metal salt being mixed with the ionic liquid-containing component.

Salts such as, for example, $ZnSO_4$ and $Zn(NO_3)_2$ can have different (e.g., variable) solubilities in ionic liquids (e.g., in EMIM TFO) and/or other carrier components of the disclosure. For example, such salts can have different or lower solubilities in ionic liquids than, for example, salts comprising organic and/or more complex anions. Therefore, sequential and/or ordered mixing, and/or the use of complexing agents such as, for example, water in a suitable (e.g., correct) sequence may allow the use of such salts in high doping (e.g., high molarity) electrolytes. In the absence of suitable complexing agents (e.g., added in a suitable order of mixing) and/or without a suitable order of mixing (e.g., with or without addition of suitable complexing agents), such salts may not be suitable for use in high doping (e.g., high molarity) electrolytes. In some embodiments, complexing agents may be added (e.g., as additive(s) 1021 and/or as component 1026). In some embodiments, complexing action may be inherent in a given combination of electrolyte components (e.g., suitable combination of dopant components, carrier components, or both). Inherent complexing action may be tailored or accommodated/controlled (e.g., through suitable order of mixing).

The carrier base 1022 and/or 1023 may have a suitable set of physicochemical properties, such as, for example, ionic conductivity, electrical conductivity, electrochemical stability, temperature stability, viscosity, volatility, flammability, moisture sensitivity, toxicity, acidic tendency, reactivity etc. Further, the electrolyte 1000 or any component thereof (e.g., other than the carrier base) may have a suitable set of physicochemical properties. The composition or amount of any component of the electrolyte 1000 may be selected or tailored to achieve a suitable set of physicochemical properties of the electrolyte (e.g., ionic conductivity, electrical conductivity, electrochemical stability, temperature stability, viscosity, volatility, flammability, moisture sensitivity, toxicity, acidic tendency, reactivity etc.). Thus, any aspects of the disclosure described in relation to properties of the carrier base may equally apply to any other individual component of the electrolyte or to the electrolyte as a whole at least in some configurations, and vice versa.

The carrier base may have a high ionic conductivity (e.g., ionic conductivity of at least about 1 mS/cm, 2 mS/cm, 3 mS/cm, and the like). In an example, the carrier base (e.g., an ionic liquid) may have an ionic conductivity of greater than or equal to about 2.4 mS/cm. In some examples, the ionic conductivity of the electrolyte comprising the carrier base may have an ionic conductivity exceeding (e.g., by a factor of at least about 1, 2, 5, 10, 25, 50, 75, 100, 250, 500, 1000, and the like) that of dry polymer and/or glassy electrolytes (e.g., exceeding a conductivity of about 10 µS/cm by a factor of at least about 1, 2, 5, 10, 25, 50, 75, 100, 250, 500, 1000, and the like). In some examples, the ionic conductivity of the electrolyte may be greater than about 10 µS/cm, 50 µS/cm, 0.1 mS/cm, 0.2 mS/cm, 0.3 mS/cm, 0.4 mS/cm, 0.5 mS/cm, 0.6 mS/cm, 0.7 mS/cm, 0.8 mS/cm, 0.9 mS/cm, 1 mS/cm, 1.5 mS/cm, 2 mS/cm, 2.5 mS/cm, 3 mS/cm, and the like. In an example, the electrolyte may have an ionic conductivity of greater than or equal to about 0.37 mS/cm. In some embodiments, the ionic conductivities herein may refer to room temperature (e.g., temperature at ambient conditions) ionic conductivities. Alternatively, in some embodiments, the ionic conductivities herein may refer to ionic conductivities at a test temperature other than the room temperature, or at a cell operating temperature.

The carrier base and/or the electrolyte (as a whole or any component(s) thereof) may have a low electrical conductivity (e.g., in order to limit internal current leakage and/or reduction in charge state of a cell or battery). In some examples, the electrical conductivity may be less than or equal to about 1 µS, 1 nS, 10 pS, and the like. For example, the electrical conductivity may be less than or equal to about 2.78 µS, 1.11 µS, 2.78 nS or 27.8 pS.

The carrier base and/or the electrolyte (or any component(s) thereof) may have a suitable electrochemical stability (e.g., minimum voltage threshold, maximum voltage threshold and/or voltage range that the electrolyte can withstand). The electrochemical stability range and thresholds may overlap with at least a portion of the voltages across the electrolyte in an electrochemical cell (e.g., the electrochemical stability range may overlap with an operating electrochemical potential range). The electrochemical stability may include stability of cations and/or anions. For example, the stability of triflate anions may include an operating voltage range (e.g., 1.1-1.6 V depending on cathode electrode chemistry) of an electrochemical cell comprising a zinc anode and a manganese dioxide ($MnO_2$) cathode. In some examples, this electrochemical cell may be operated in a voltage range of 0.7-3 V, and a suitable anion or combination of anions may be selected for this range, or a portion thereof. For example, within at least a portion of the operating voltage range of the electrochemical cell comprising the zinc anode and the manganese dioxide ($MnO_2$) cathode, the triflate anions may have a relatively high ionic conductivity and good electrochemical stability. Further, as previously noted, the salt 1011 and the ionic liquid 1022 may or may not comprise the same anion. Therefore, the electrochemical stability of any ion in the electrolyte 1000 may be selected to fit a given operating voltage (also "operating electrochemical potential" herein) range in an electrochemical cell with a given anode/cathode chemistry. For example, the constituents of the electrolyte 1000 may be selected to enable an electrochemical stability range of at least about 1 V (e.g., between about 1 V and 2 V). In some examples, the constituents of the electrolyte 1000 may be selected to enable electrochemical stability at voltages less than or equal to about 4 V, 3.5 V, 3 V, 2.5 V, 2 V, 1.9 V, 1.8 V, 1.7 V, 1.6 V, 1.5 V, 1.4 V, 1.3 V, 1.2 V, 1.1 V, 1 V, 0.9 V, 0.8 V, 0.7 V, 0.6 V or 0.5 V. In some examples, the constituents of the electrolyte 1000 may be selected to enable electrochemical stability at voltages greater than or equal to about 3 V, 2.5 V, 2 V, 1.9 V, 1.8 V, 1.7 V, 1.6 V, 1.5 V, 1.4 V, 1.3 V, 1.2 V, 1.1 V, 1 V, 0.9 V, 0.8 V, 0.7 V, 0.6 V, 0.5 V or 0 V. In some examples, the constituents of the electrolyte 1000 may be selected to enable an electrochemical stability range of greater than or equal to about 0.2 V, 0.4 V, 0.6 V, 0.8 V, 1 V, 1.2 V, 1.4 V, 1.6 V, 1.8 V, 2 V, or more.

Similarly, the composition of the carrier base and/or the electrolyte (or any component(s) thereof) may be selected to withstand a given operating temperature range. In some examples, the carrier base and/or the electrolyte (or any component(s) thereof) may be suitable for operation at temperatures of at least about −40° C., −20° C., 0° C., 25° C., 65° C., 90° C., 125° C., 150° C., 200° C., 300° C., and the like. In some examples, the carrier base and/or the electrolyte (or any component(s) thereof) may be suitable for operation at temperatures of less than about −40° C., −20° C., 0° C., 25° C., 65° C., 90° C., 125° C., 150° C., 200° C., 300° C., and the like. In some examples, the carrier base and/or the electrolyte (or any component(s) thereof) may be suitable for operation at temperatures between about −20° C. and 20° C., 45° C. and 90° C., 60° and 90° C., 25° C. and 125° C., 200° C. and 300° C., and the like.

The carrier base and/or the electrolyte (or any component(s) thereof) may exhibit a suitable viscosity. For example, the carrier base and/or the electrolyte (or any component(s) thereof) may have a viscosity of at least about 50 centipoise (cP), 100 cP, 200 cP, 300 cP, 400 cP, 500 cP, 600 cP, 700 cP, 800 cP, 900 cP, 1000 cP, 1100 cP, and the like.

The carrier base and/or the electrolyte (or any component(s) thereof) may exhibit a suitable volatility. In some embodiments, the carrier base and/or the electrolyte (or any component(s) thereof) may comprise a low volatility component (e.g., a low volatility solvent, such as, for example, the ionic liquid 1022 or the cosolvent 1023), a high volatility component (e.g., a high volatility solvent, such as, for example, the process solvent 1025), or a combination thereof. In some embodiments, the volatility of the electrolyte may change over time (e.g., as the high volatility solvent evaporates). Thus, at any given time, the carrier base and/or the electrolyte 1000 (or any component(s) thereof) may have a vapor pressure at 25° C. of less than or equal to about $10^{-10}$ Pa, $10^{-9}$ Pa, $10^{-8}$ Pa, $10^{-7}$ Pa, $10^{-6}$ Pa, $10^{-5}$ Pa, $10^{-4}$ Pa, $10^{-3}$ Pa, $10^{-2}$ Pa, $10^{-1}$ Pa, 1 Pa, 5 Pa, 10 Pa, 15 Pa, 20 Pa, 30 Pa, 40 Pa, 50 Pa, and the like. In some embodiments, high boiling point solvents may substantially remain in the electrolyte after cell formation while low boiling solvents may be substantially removed (e.g., residual amount (percent level or lower) may remain).

The carrier base and/or the electrolyte (or any component(s) thereof) may exhibit a low flammability. For example, the ionic liquid 1022 may have a reduced flammability with respect to organic cosolvents. In some embodiments, the carrier base may be non-aqueous.

In some embodiments, the carrier 1020 and/or the electrolyte 1000 (or any component(s) thereof, such as, for example, the ionic liquid 1022) may exhibit low sensitivity to moisture. The carrier 1020 and/or the electrolyte 1000 (or any component(s) thereof) may comprise fluorinated components or other components with a tendency for low water absorption. For example, these components may comprise materials that may saturate to a water content of less than about 5%, 1%, 0.1%, and the like, when exposed to ambient conditions (e.g., temperatures of, for example, about 20-30° C. and/or relative humidities of, for example, about 40-50%).

The carrier base and/or the electrolyte 1000 (or any component(s) thereof, such as, for example, the salt 1011) may have a given toxicity. For example, ionic liquids may have varying toxicities and associated hazards. The toxicity may be associated with cations, anions, or a combination thereof. In some examples, compounds based on the BMIM cation ($BMIM^+$) may be associated with a larger toxicity than compounds based on the EMIM cation ($EMIM^+$). In an example, BMIM OTf may be associated with a larger toxicity than EMIM TFSI. In some cases, the electrolytes herein may comprise a high level or concentration of the carrier base and/or the salt. For example, in cases where higher concentrations of ionic liquid are used, toxicity issues, along with associated hazards and additional costs related to handling and transportation of more hazardous materials may become more significant.

The carrier base (e.g., anions of the carrier base) and/or the electrolyte (or any component(s) thereof) may have a given acidic tendency and/or reactivity. In some embodiments, acid-promoting species (e.g., triflates) in the carrier base and/or the electrolyte (or any component(s) thereof) may be advantageous to sustaining the electrochemical cell during charging and improving cycling and capacity performance. For example, a conjugate acid of one or more anions (e.g., triflate ions) may be a superacid (e.g., triflic acid). In an example, triflic acid, the conjugate acid of the triflate ion, may stabilize $Zn^{2+}$, thus providing an alternative to formation of zinc hydroxides and oxides.

In some cases, such as, for example, in electrochemical cells comprising $Zn/Zn^{2+}$ ion chemistry, acidity and buffering against high pH may prevent formation of unwanted compounds (e.g., ZnO). Illustrative examples of $Zn/Zn^{2+}$ ion chemistries that may advantageously benefit from the suppression of formation of unwanted compounds are described in PCT Patent Publication No. WO 2012/037171 ("IONIC GEL ELECTROLYTE, ENERGY STORAGE DEVICES, AND METHODS OF MANUFACTURE THEREOF"), Xu et al., "NOVEL ZINC ION CONDUCTING POLYMER GEL ELECTROLYTES BASED ON IONIC LIQUIDS," Electrochemistry Communications 7 (2005), 1309-1317, and Ye et al., "ZINC ION CONDUCTING POLYMER ELECTROLYTES BASED ON OLIGOMERIC POLYETHER/PVDF-HFP BLENDS," Journal of Power Sources 165 (2007) 500-508, incorporated herein by reference in their entireties. In some cases, the formation of such compounds may be distinctly different from alkaline cells (e.g., with a typical pH of about 11), such as, for example, alkaline cells that rely on zincates and oxides. In some cases, the zinc hydroxides and oxides may be insoluble and lead to irreversible anode loss and/or passivation, provide a leakage side reaction pathway, or a combination thereof. For example, such compounds may form at an anode, leading to anode corrosion and detrimental losses in ions (e.g., Zn ions) available for cell function.

Figure 4:
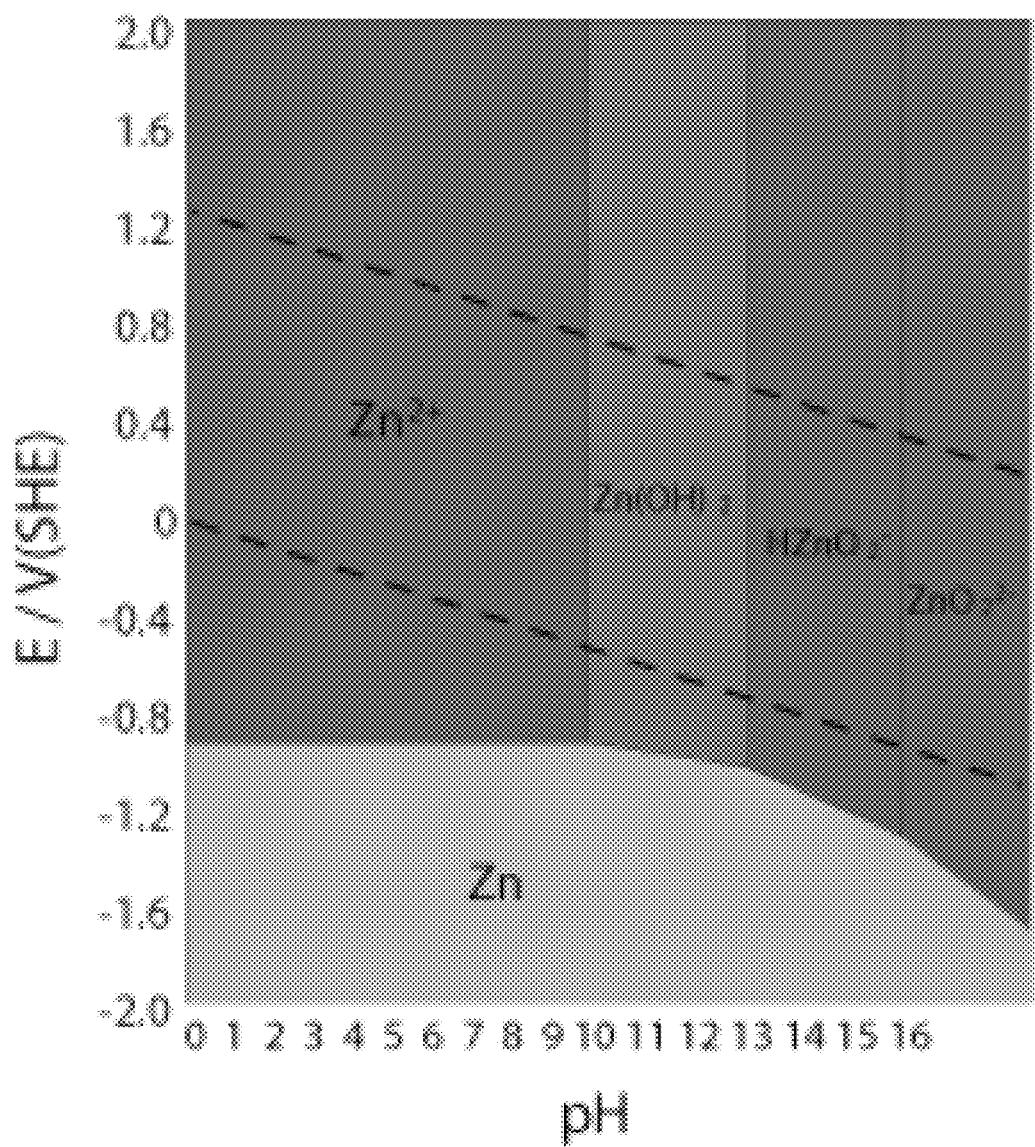
FIG. 4 is a Pourbaix diagram of zinc.

FIG. 4 is a Pourbaix diagram of zinc, showing Zn oxidation products as a function of potential against a standard hydrogen electrode (SHE) and apparent pH. In this example, metal ions (e.g., $Zn^{2+}$ ions) are stabilized in an acidic regime.

In some embodiments, triflates may be used. For example, an advantageous combination combining low viscosity, high reactivity, acidic tendency, and low toxicity for higher ionic content electrolytes may be EMIM OTf. In one example, EMIM OTf and Zn OTf may be used as the ionic liquid and working ion salt combination to combine the low viscosity (e.g., tending to increase ionic conductivity and diffusivity) and high reactivity of the triflate anion with the low toxicity of the EMIM cation. In another example, the electrolyte may be based on BMIM triflate and Zn triflate. Although the triflate anion may be associated with lower electrochemical stability than the TFSI anion in some cases (e.g., in some voltage ranges of interest, such as, for example, a <2V Zn cell), the stability of the triflate may be sufficient. The combination of low toxicity cations (e.g., EMIM) and the acidic tendencies of the triflate anion may provide a suitable combination of properties (e.g., for multivalent ion batteries including Zn).

In some embodiments, acetates (e.g., including acetate ionic liquid anions as well as acetate metal salt anions) may provide low toxicity and environmental impact. For example, zinc acetate may be consumed as a source of dietary zinc. In some cases, low toxicity combinations comprising an acetate anion and a low toxicity cation (e.g., EMIM or EEIM) may be used. In some cases, combinations comprising acetate anions may provide a more chemically dissimilar anion paring than combinations comprising, for example, predominantly triflates, FSI and/or TFSI anions (which may be similar in their substituents and/or chemical nature). In some cases, acetates may be advantageously used in electrochemical cells where the superacidic nature of triflate-based anions may lead to degradation of other cell components, thereby shortening cell cycle or storage life. As previously described, alkaline electrolytes may lead to stabilization of oxides and poor cyclability. Acetic acid may be a relatively low strength acid that is less likely to reduce other cations while still contributing to maintaining a mildly acidic electrolyte.

The process solvent 1025 may include, for example, n-methyl-2-pyrrolidone (NMP), dimethyl sulfoxide (DMSO), 2-pyrrolidone, n-ethyl-2-pyrrolidone (NEP), dimethyl formamide (DMF), or acetone. In some embodiments, the process solvent may change the rheology of the electrolyte 1000. For example, the process solvent may change the rheology of the electrolyte such that the electrolyte is more compatible with different printing processes (e.g., as a printable ink), as described elsewhere herein. Further, the process solvent may change the time for the electrolyte to reach its steady state consistency or composition (e.g., the working time of the ink). The process solvent 1025 may be evaporated from the electrolyte (e.g., after a printed film is formed). The process solvent 1025 may have a sufficiently low volatility such that the electrolyte does not dry during printing. Simultaneously, the process solvent 1025 may have a sufficiently high volatility to enable the electrolyte to dry fast after printing.

The polymer 1024 may be used, for example, for mechanical stabilization. For example, the polymer and/or its amount (also "level" herein) may be selected to achieve suitable mechanical integrity and/or suitable transport properties. Examples of polymers may include, but are not limited to, polyvinylidene fluoride (PVDF), poly(vinylidene fluoride-hexafluoropropylene) (PVDF-HFP, also known as, for example, "poly(vinylidene fluoride-hexafluoropropene)" and "polyvinylidene fluoride-co-hexafluoropropylene"), and/or functionalized versions (which may contain groups for adhesion or crosslinking) or copolymers thereof. Other examples of polymers may include polyethylene oxides (PEOs), and/or ethers, glycols or copolymers thereof. Further examples of polymers include, but are not limited to, polyvinyl alcohol (PVA), polyacrylo-nitrile (PAN), polymethyl-methacrylate (PMMA), and epoxy or silicone derivatives thereof.

The additive(s) 1021 may comprise, for example, additives that alter one or more of viscosity (e.g., viscosity lowering additive), ionic conductivity, reactivity, electrochemical stability, pH (e.g., additive acid and/or buffer to change pH), or any other physicochemical property of the dopant 1010, the carrier 1020 and/or the electrolyte 1000 (as a whole or any component(s) thereof). In some embodiments, the additive 1021 may alter a combination of physicochemical properties. In some embodiments, the additive may alter one or more physicochemical properties without altering one or more other physicochemical properties. In an example, the additive may lower the viscosity, increase or maintain the ionic conductivity, increase or maintain the reactivity (also "reactivity potential" herein), increase, decrease or maintain the electrochemical stability, or any combination thereof. As described in greater detail elsewhere herein, additives that lower the viscosity may be advantageously used in electrolytes comprising high doping formulations (e.g., high salt formulations). An additive 1021 may be added to the dopant 1010 or any component(s) thereof, to the carrier 1020 or any component(s) thereof, or to the electrolyte 1000 or any component(s) thereof (e.g., to a mixture of the dopant 1010 and the carrier 1020).

In some embodiments, water can be a fractional part (e.g., as an additive 1021) of the electrolyte formulation (e.g., of the high molarity electrolyte formulation), where it can contribute to, for example, lowered viscosity and/or increased reactivity. This water can be introduced directly, by allowing formulations or printed layer(s) to equilibrate to an outside ambient or raised humidity atmosphere, by including water or a water-saturated element within the cell package, by including a precursor in the formulations, printed layer(s) or packaging which reacts or decomposes to produce water either spontaneously or through thermal or radiative stimulation, or any combination thereof. Illustrative examples of water additives are described in Seddon et al., "INFLUENCE OF CHLORIDE, WATER, AND ORGANIC SOLVENTS ON THE PHYSICAL PROPERTIES OF IONIC LIQUIDS," Pure Appl. Chem., Vol. 72, No. 12, 2275-2287, 2000, incorporated herein by reference in its entirety. As described in greater detail elsewhere herein, water may change (e.g., increase) solubility of a salt in the electrolyte. In such instances, water may act as an additive 1021 and/or as an agent (e.g., complexing and/or solvating agent) 1026. Any aspects of the disclosure described in relation to functionality of water as an additive 1021 may equally apply to functionality of water as a component (e.g., agent) 1026 at least in some configuration, and vice versa. The functionality of water in electrolyte formulations herein can depend on the order in which the water is mixed into the electrolyte (or any component(s) thereof). Water-like additives (e.g., polyethylene glycol, polyethylene glycol dimethyl ether (PEG DME), ethylene glycol, sugar alcohols, erythritol, sorbitol, glycerol, glycerol carbonate, etc.) may in some cases be used in place of or in concert with water.

Solubility enhancement may be achieved with solvating or complexing additives (or agents). For example, an electrolyte may comprise solvating or complexing additives (or agents) that may enhance solubility or stability of the electrolyte solution, suspension or film structure. In some cases, a suitable sequence of preparing such an electrolyte-formulation can increase effective electrolyte salt solubility and electrolyte stability or metastability in an advantageous way.

Electrolytes of the disclosure may comprise one or more other components 1026, such as, for example, agents, stabilizers, surfactants, etc. In some cases, the component(s) 1026 may help stabilize a solution, dispersion or suspension (or any of the mixtures herein). In some cases, the component(s) 1026 may have one or more characteristics similar to the additive(s) 1021, and vice versa. For example, both the component 1026 and the additive 1021 may alter one or more physicochemical properties (e.g., each may alter a different property) of the dopant 1010, the carrier 1020 and/or the electrolyte 1000 (as a whole or any component(s) thereof). The component(s) 1026 may in some cases be used in concert with the additive(s) 1021. In some cases, the same component (e.g., water) may simultaneously function as an additive 1021 and as a component (e.g., agent) 1026. A component 1021 may be added to the dopant 1010 or any component(s) thereof, to the carrier 1020 or any component(s) thereof, or to the electrolyte 1000 or any component(s) thereof (e.g., to a mixture of the dopant 1010 and the carrier 1020).

In some embodiments, the component 1026 may comprise an agent, such as, for example, a polymer binder. The agent may be a dispersing agent. The agent may be a complexing and/or solvating agent. In some examples, water may be used as a complexing and/or solvating agent. Other examples of complexing and/or solvating agents may include, for example, polyethylene glycol dimethyl ether (PEG DME), Fomblin® perfluoropolyether lubricant, and/or other agents.

In some embodiments, the component 1026 may comprise one or more fluoromaterials, such as, for example, low molecular weight fluoropolymers and/or fluorinated polyethers (also "fluoropolyethers" herein). An advantage of such fluoromaterials may be a high electrochemical stability. For example, the low molecular weight fluoropolymers and/or fluorinated polyethers may be added to the electrolyte formulation to lower the viscosity while remaining electrochemically stable. In some cases, ether functionality of the fluorinated polyethers may contribute to ionic stabilization. Examples of low molecular weight fluoropolymers may include, but are not limited to, PVDF, fluorinated ethylene propylene (FEP), polytetrafluoroethylene (PTFE) with molecular weights less than about 10,000 grams/mol or less than about 1,000 grams/mol, etc. Examples of fluoropolyethers may include, but are not limited to, low viscosity oils such as Fomblin® by Solvay and its derivatives.

In some embodiments, the component 1026 may comprise a surfactant and/or other suspension stabilizer (e.g., to aid in electrolyte processing or to stabilize an electrolyte microstructure, such as, for example, a film microstructure of electrolytes with a composition that exceeds the homogenous solution solubility limit in liquid or solid form). These surfactants and/or stabilizers may include, but are not limited to, siloxanes, fluorinated siloxanes, fluorinated ethers, copolymers, ethylene oxide-based copolymers, fluorinated ethylene oxide-based copolymers, phenyl alkyl-based surfactants, Triton X-100 and its derivatives (including fluorinated alkyl chain derivates), and fluorinated sulfonates like perfluorooctanesulfonic acid and its derivatives.

Figure 10A:
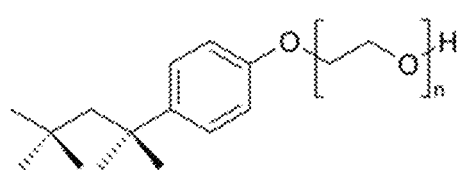
FIGS. 10A-10B show molecular structures of example surfactants.
Figure 10B:
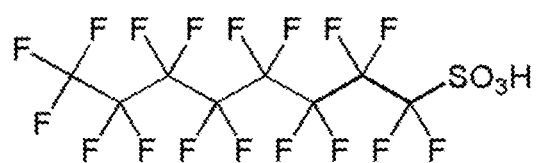

FIGS. 10A-B show molecular structures of example surfactants. FIG. 10A is a schematic of molecular structure of a Triton X phenyl alkyl ethyl glycol-type surfactant. FIG. 10B is a schematic of a molecular structure of a perfluorooctanesulfonic acid surfactant.

In some embodiments, the component 1026 may comprise one or more low molecular weight ethers, including, but not limited to, polyethylene oxides, polypropylene oxides, copolymers and co-oligomers of these oxides, ethylene glycols, ethylene glycol derivatives and functionalized ethylene glycols. For example, poly(ethylene glycol) methyl ether acrylate (PEG MEA) may be added in cases when acrylate functionality improves compatibility of the electrolyte 1000 with the polymer 1024 (e.g., PEG MEA may be added to PVDF or PVDF-HFP, as acrylates can be inter-soluble with PVDF). Other functionality may include, for example, fluorinated or ionic groups. Illustrative examples of such functionality are set forth in Ebnesajjad et al., "FLUOROPOLYMER ADDITIVES," 1st Edition, Elsevier, 2012, p. 167, incorporated herein by reference in its entirety.

In some embodiments, the component 1026 (and/or the additive 1021) may comprise a particle additive. The particle additive may comprise a plurality of particles (e.g., nanoparticles). In some embodiments, such particles may be at least partially intrinsically formed in electrolytes herein (e.g., within the electrolyte 1000 or any component(s) thereof, the dopant 1010 or any component(s) thereof and/or the carrier 1020 or any component(s) thereof). For example, the particles may assemble within the electrolyte, or a first portion (e.g., a metal oxide) may be added and may combine or otherwise interact with one or more components already in the electrolyte (e.g., an ionic liquid) after addition to form the final particle(s). In some embodiments, particles may be added separately from the electrolyte, within other portions of electrochemical cells herein (e.g., within electrodes comprising the electrolyte, in which case the electrolyte in the electrodes may be different from the electrolyte separating the electrodes) and/or at various interfaces (e.g., at interfaces with the electrolyte but not within the electrolyte itself). The particles may be, for example, inorganic, organic, polymeric or copolymeric, as described in greater detail elsewhere herein (e.g., see FIG. 18 and FIG. 19). For example, the particles may comprise an oxide (e.g., zinc oxide, silica, titania and/or similar high surface area oxides). The particles may comprise a solid, a gel, a liquid, or any combination thereof. For example, the particles may comprise fine solid particles, solid particles coated with a layer of gel or liquid, gel particles with functionalized surface groups that attach and retain a surrounding liquid phase, etc. Addition of a particle additive, such as, for example, oxide particles and/or nanoparticles (e.g., ZnO) may improve morphology and/or reduce observable syneresis in, for example, high ionic liquid/salt content electrolytes herein.

Example electrolyte formulations (e.g., of the electrolyte 1000) are shown in TABLES 4-7. The composition is given in terms of molarity, weight % and volume % formulations of various electrolyte components. The electrolyte formulations may comprise a given level (also "doping" herein) of a dopant (e.g., the dopant 1010 comprising, for example, the salt 1011) in a carrier (e.g., the carrier 1020 comprising, for example, the ionic liquid 1022) and/or in the electrolyte (e.g., the electrolyte 1000) as a whole.

As previously described, the formulations herein may in some cases include NMP or some other high volatility process solvent 1025 prior to deposition and drying to allow print processing and/or coating as well as subsequent drying (e.g., to a solid) within a suitable drying time and at a suitable drying temperature. The high volatility process solvent content may be substantially absent after drying and when the cells are in operation. The high volatility process solvent content is in some cases not included in the formulations in TABLES 4-7 (e.g., the high volatility process solvent content is not included on a "solids only" basis). The electrolyte formulations in TABLES 4-7 may be extended to liquid electrolytes. Therefore, the compositions in TABLES 4-7, while provided on a "solids only" basis, may equally apply to compositions provided on a "liquid" basis. The liquid electrolytes may or may not comprise high volatility solvent(s). Thus, electrolyte formulations herein may be used for liquid, gel or solid electrolytes that may or may not comprise high volatility solvent(s).

Further, electrolytes of the disclosure (e.g., liquid electrolytes) may comprise low volatility solvent(s) (e.g., the cosolvent 1023). The formulations herein may or may not include the cosolvent in the composition (e.g., on a liquid basis). For example, the cosolvent amount may or may not be included in the total liquid for the molarity calculation. Thus, individual electrolyte composition values herein may apply to electrolyte formulations additionally comprising or lacking one or more dopant/carrier components (e.g., any of the electrolyte components 1021, 1022, 1023, 1024, 1025 and 1026). Thus, in some cases, electrolyte composition values herein may be scaled in accordance with dilution and/or concentration of the electrolyte mixture.

Yet further, individual electrolyte composition values herein may apply to electrolyte formulations comprising any combination of dopant/carrier components herein, such as, for example, any combination of electrolyte components 1011, 1021, 1022, 1023, 1024, 1025 and 1026. In one example, molarity, weight % and/or volume % of the salt 1011 in the ionic liquid 1022 may equally apply to molarity, weight % and/or volume % of the salt 1011 in the cosolvent 1023 and/or to molarity, weight % and/or volume % of the salt 1011 in a mixture of the ionic liquid 1022 and the cosolvent 1023. In another example, molarity, weight % and/or volume % of the salt 1011 and/or the ionic liquid 1022 in an electrolyte comprising the polymer 1024 may equally apply to molarity, weight % and/or volume % of the salt 1011 and/or the ionic liquid 1022 in an electrolyte not comprising the polymer 1024.

TABLES 4-7 provide examples of electrolyte formulations in terms of molarity (moles/volume), mass fraction (weight %), volume fraction (volume %), etc. Three formulations (Formulation 1, Formulation 2 and Formulation 3) with increasing doping levels are provided. TABLES 4 and 5 provide examples of Zn triflate-BMIM triflate polymer electrolyte formulations. TABLES 6 and 7 provide examples of Zn triflate-EMIM triflate polymer electrolyte formulations.

In some examples, molarity of an ionic liquid or any carrier 1020 (e.g., the ionic liquid 1022, such as, for example, BMIM triflate or EMIM triflate) in an electrolyte formulation (e.g., provided on a "solids only" basis) may be at least about 2 mols/liter (M), at least about 2.1 M, at least about 2.2 M, at least about 2.3 M, at least about 2.4 M, at least about 2.5 M, at least about 2.6 M, at least about 2.7 M, at least about 2.8 M, at least about 2.9 M, at least about 3 M, at least about 3.1 M, at least about 3.2 M, at least about 3.3 M, at least about 3.4 M, at least about 3.5 M, at least about 3.6 M, at least about 3.7 M, at least about 3.8 M, at least about 3.9 M, at least about 4 M, at least about 4.5 M, at least about 5 M, at least about 5.5 M, at least about 6 M, at least about 6.5 M, at least about 7 M, at least about 7.5 M, at least about 8 M, at least about 8.5 M, at least about 9 M, at least about 9.5 M, at least about 10 M, and the like. In an example, molarity of an ionic liquid (e.g., BMIM triflate) in an electrolyte formulation (e.g., comprising Zn triflate salt) provided on a "solids only" basis is at least or equal to about 2.54 M, at least or equal to about 2.45 M or at least or equal to about 2.97 M for Formulation 1, Formulation 2 and Formulation 3, respectively. In another example, molarity of an ionic liquid (e.g., EMIM triflate) in an electrolyte formulation (e.g., comprising Zn triflate salt) provided on a "solids only" basis is at least or equal to about 2.92 M, at least or equal to about 2.81 M or at least or equal to about 3.44 M for Formulation 1, Formulation 2 and Formulation 3, respectively.

In some examples, molarity of a salt or any dopant 1010 (e.g., the salt 1011, such as, for example, Zn triflate) in an electrolyte formulation (e.g., provided on a "solids only" basis) may be at least about 0.1 M, at least about 0.2 M, at least about 0.3 M, at least about 0.4 M, at least about 0.5 M, at least about 0.6 M, at least about 0.7 M, at least about 0.75 M, at least about 0.8 M, at least about 0.9 M, at least about 1 M, at least about 1.1 M, at least about 1.2 M, at least about 1.3 M, at least about 1.4 M, at least about 1.5 M, at least about 1.6 M, at least about 1.7 M, at least about 1.8 M, at least about 1.9 M, at least about 2 M, at least about 2.1 M, at least about 2.2 M, at least about 2.3 M, at least about 2.4 M, at least about 2.5 M, at least about 2.6 M, at least about 2.7 M, at least about 2.8 M, at least about 2.9 M, at least about 3 M, at least about 3.1 M, at least about 3.2 M, at least about 3.3 M, at least about 3.4 M, at least about 3.5 M, at least about 3.6 M, at least about 3.7 M, at least about 3.8 M, at least about 3.9 M, at least about 4 M, at least about 4.5 M, at least about 5 M, at least about 5.5 M, at least about 6 M, at least about 6.5 M, at least about 7 M, and the like. In an example, molarity of a salt (e.g., Zn triflate) in an electrolyte formulation (e.g., comprising BMIM triflate ionic liquid) provided on a "solids only" basis is at least or equal to about 0.28 M, at least or equal to about 0.71 M or at least or equal to about 1.18 M for Formulation 1, Formulation 2 and Formulation 3, respectively. In another example, molarity of a salt (e.g., Zn triflate) in an electrolyte formulation (e.g., comprising EMIM triflate ionic liquid) provided on a "solids only" basis is at least or equal to about 0.29 M, at least or equal to about 0.73 M or at least or equal to about 1.23 M for Formulation 1, Formulation 2 and Formulation 3, respectively.

In some examples, molarity of a salt or any dopant 1010 (e.g., the salt 1011, such as, for example, Zn triflate) in an ionic liquid or any carrier 1020 (e.g., the ionic liquid 1022, such as, for example, BMIM triflate or EMIM triflate) may be at least about 0.1 M, at least about 0.2 M, at least about 0.3 M, at least about 0.4 M, at least about 0.5 M, at least about 0.6 M, at least about 0.7 M, at least about 0.75 M, at least about 0.8 M, at least about 0.9 M, at least about 1 M, at least about 1.05 M, at least about 1.1 M, at least about 1.15 M, at least about 1.2 M, at least about 1.25 M, at least about 1.3 M, at least about 1.35 M, at least about 1.4 M, at least about 1.45 M, at least about 1.5 M, at least about 1.6 M, at least about 1.7 M, at least about 1.8 M, at least about 1.9 M, at least about 2 M, at least about 2.1 M, at least about 2.2 M, at least about 2.3 M, at least about 2.4 M, at least about 2.5 M, at least about 2.6 M, at least about 2.7 M, at least about 2.8 M, at least about 2.9 M, at least about 3 M, at least about 3.5 M, at least about 4 M, at least about 4.5 M, at least about 5 M, at least about 5.5 M, at least about 6 M, at least about 6.5 M, at least about 7 M, at least about 7.5 M, at least about 8 M, at least about 8.5 M, at least about 9 M, at least about 9.5 M, at least about 10 M, and the like. In an example, molarity of a salt (e.g., Zn triflate) in an ionic liquid (e.g., comprising BMIM triflate) is at least or equal to about 0.48 M, at least or equal to about 1.17 M or at least or equal to about 1.55 M for Formulation 1, Formulation 2 and Formulation 3, respectively. In another example, molarity of a salt (e.g., Zn triflate) in an ionic liquid (e.g., comprising EMIM triflate) is at least or equal to about 0.51 M, at least or equal to about 1.25 M or at least or equal to about 1.64 M for Formulation 1, Formulation 2 and Formulation 3, respectively.

In some examples, density of a salt or any dopant 1010 (e.g., the salt 1011, such as, for example, Zn triflate) in an ionic liquid or any carrier 1020 (e.g., the ionic liquid 1022, such as, for example, BMIM triflate or EMIM triflate) may be at least about 1 grams (g)/liter, at least about 1.1 g/liter, at least about 1.2 g/liter, at least about 1.3 g/liter, at least about 1.4 g/liter, at least about 1.5 g/liter, at least about 1.6 g/liter, at least about 1.7 g/liter, at least about 1.8 g/liter, at least about 1.9 g/liter, at least about 2 g/liter, at least about 2.1 g/liter, at least about 2.2 g/liter, at least about 2.3 g/liter, at least about 2.4 g/liter, at least about 2.5 g/liter, at least about 2.6 g/liter, at least about 2.7 g/liter, at least about 2.8 g/liter, at least about 2.9 g/liter, at least about 3 g/liter, and the like. In an example, density of a salt (e.g., Zn triflate) in an ionic liquid (e.g., comprising BMIM triflate) is at least or equal to about 1.42 g/liter, at least or equal to about 1.59 g/liter or at least or equal to about 1.69 g/liter for Formulation 1, Formulation 2 and Formulation 3, respectively. In another example, molarity of a salt (e.g., Zn triflate) in an ionic liquid (e.g., comprising EMIM triflate) is at least or equal to about 1.51 g/liter, at least or equal to about 1.69 g/liter or at least or equal to about 1.79 g/liter for Formulation 1, Formulation 2 and Formulation 3, respectively.

In an example, an electrolyte formulation (e.g., Formulation 1) may comprise about 8 g of the polymer 1024 (e.g., PVDF-HFP), about 8 g of the ionic liquid 1022 (e.g., BMIM triflate or EMIM triflate) and about 1.125 g of the salt 1011 (e.g., Zn triflate). In another example, an electrolyte formulation (e.g., Formulation 2) may comprise about 8 g of the polymer 1024 (e.g., PVDF-HFP), about 8 g of the ionic liquid 1022 (e.g., BMIM triflate or EMIM triflate), about 2.9234 g of the salt 1011 (e.g., Zn triflate), and about 24 g of the process solvent 1025 (e.g., NMP). The process solvent may be evaporated during electrolyte processing, setting, etc. In yet another example, an electrolyte formulation (e.g., Formulation 3) may comprise about 8 g of the polymer 1024 (e.g., PVDF-HFP), about 16 g of the ionic liquid 1022 (e.g., BMIM triflate or EMIM triflate) and about 8 g of the salt 1011 (e.g., Zn triflate).

In some examples, mass fraction of the polymer 1024 (e.g., PVDF-HFP) or any other component of the carrier 1020 in an electrolyte formulation (e.g., provided on a "solids only" basis) may be at least about 5 weight %, at least about 10 weight %, at least about 15 weight %, at least about 20 weight %, at least about 25 weight %, at least about 30 weight %, at least about 35 weight %, at least about 40 weight %, at least about 45 weight %, at least about 50 weight %, at least about 55 weight %, at least about 60 weight %, and the like. In some examples, mass fraction of the polymer 1024 (e.g., PVDF-HFP) in an electrolyte formulation (e.g., provided on a "solids only" basis) may be less than about 5 weight %, less than about 10 weight %, less than about 15 weight %, less than about 20 weight %, less than about 25 weight %, less than about 30 weight %, less than about 35 weight %, less than about 40 weight %, less than about 45 weight %, less than about 50 weight %, less than about 55 weight %, less than about 60 weight %, and the like. In an example, mass fraction of a polymer (e.g., PVDF-HFP) in an electrolyte formulation (e.g., electrolyte comprising BMIM triflate or EMIM triflate ionic liquid, and Zn triflate salt) provided on a "solids only" basis is about 47 weight %, about 42 weight % or about 25 weight % for Formulation 1, Formulation 2 and Formulation 3, respectively.

In some examples, mass fraction of the ionic liquid 1022 (e.g., BMIM triflate or EMIM triflate) or any other component of the carrier 1020 in an electrolyte formulation (e.g., provided on a "solids only" basis) may be at least about 5 weight %, at least about 10 weight %, at least about 15 weight %, at least about 20 weight %, at least about 25 weight %, at least about 30 weight %, at least about 35 weight %, at least about 40 weight %, at least about 45 weight %, at least about 50 weight %, at least about 55 weight %, at least about 60 weight %, at least about 65 weight %, at least about 70 weight %, at least about 75 weight %, at least about 80 weight %, at least about 85 weight %, at least about 90 weight %, at least about 95 weight %, and the like. In an example, mass fraction of an ionic liquid (e.g., BMIM triflate or EMIM triflate) in an electrolyte formulation (e.g., electrolyte comprising PVDF-HFP polymer, and Zn triflate salt) provided on a "solids only" basis is at least or equal to about 47 weight %, at least or equal to about 42 weight % or at least or equal to about 50 weight % for Formulation 1, Formulation 2 and Formulation 3, respectively.

In some examples, mass fraction of the salt 1011 (e.g., Zn triflate) or any other component of the dopant 1010 in an electrolyte formulation (e.g., provided on a "solids only" basis) may be at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 11 weight %, at least about 12 weight %, at least about 13 weight %, at least about 14 weight %, at least about 15 weight %, at least about 16 weight %, at least about 17 weight %, at least about 18 weight %, at least about 19 weight %, at least about 20 weight %, at least about 21 weight %, at least about 22 weight %, at least about 23 weight %, at least about 24 weight %, at least about 25 weight %, at least about 26 weight %, at least about 27 weight %, at least about 28 weight %, at least about 29 weight %, at least about 30 weight %, at least about 35 weight %, at least about 40 weight %, at least about 45 weight %, at least about 50 weight %, at least about 55 weight %, at least about 60 weight %, at least about 65 weight %, at least about 70 weight %, at least about 75 weight %, at least about 80 weight %, at least about 85 weight %, at least about 90 weight %, at least about 95 weight %, and the like. In an example, mass fraction of a salt (e.g., Zn triflate) in an electrolyte formulation (e.g., electrolyte comprising PVDF-HFP polymer, and BMIM triflate or EMIM triflate ionic liquid) provided on a "solids only" basis is at least or equal to about 6-7 weight %, at least or equal to about 15-16 weight % or at least or equal to about 25 weight % for Formulation 1, Formulation 2 and Formulation 3, respectively.

In some examples, mass fraction of the salt 1011 (e.g., Zn triflate) or any other component of the dopant 1010 combined with the ionic liquid 1022 (e.g., BMIM triflate or EMIM triflate) or any other component of the carrier 1020 in an electrolyte formulation (e.g., provided on a "solids only" basis) may be at least about 5 weight %, at least about 10 weight %, at least about 15 weight %, at least about 20 weight %, at least about 25 weight %, at least about 30 weight %, at least about 35 weight %, at least about 40 weight %, at least about 45 weight %, at least about 50 weight %, at least about 55 weight %, at least about 60 weight %, at least about 65 weight %, at least about 70 weight %, at least about 75 weight %, at least about 80 weight %, at least about 85 weight %, at least about 90 weight %, at least about 95 weight %, and the like. In an example, mass fraction of a salt (e.g., Zn triflate) combined with an ionic liquid (e.g., BMIM triflate or EMIM triflate) in an electrolyte formulation (e.g., electrolyte comprising PVDF-HFP polymer) provided on a "solids only" basis is at least or equal to about 53 weight %, at least or equal to about 58 weight % or at least or equal to about 75 weight % for Formulation 1, Formulation 2 and Formulation 3, respectively.

In some examples, a weight ratio of the salt 1011 (e.g., Zn triflate) or any other component of the dopant 1010 combined with the ionic liquid 1022 (e.g., BMIM triflate or EMIM triflate) or any other component of the carrier 1020 to the polymer 1024 (e.g., PVDF-HFP) or another component of the carrier 1020 in an electrolyte formulation (e.g., provided on a "solids only" basis) may be at least about 0.25, 0.5, 0.75, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 2, 2.1, 2.2, 2.3, 2.4, 2.5, 2.6, 2.7, 2.8, 2.9, 3, 3.1, 3.2, 3.3, 3.4, 3.5, 3.75, 4, 4.24, 4.5, 4.75, 5, 5.5, 6, 6.5, 7, 7.5, 8, 8.5, 9, 9.5, 10, 11, 12, 13, 14, 15, 20, 25, 30, 35, 40, 45, 50, 75, 100, 200, 300, 400, 500, and the like. In an example, a weight ratio of a salt (e.g., Zn triflate) combined with an ionic liquid (e.g., BMIM triflate or EMIM triflate) to a polymer (e.g., PVDF-HFP) in an electrolyte formulation is at least or equal to about 1, at least or equal to about 1.4 or at least or equal to about 3 for Formulation 1, Formulation 2 and Formulation 3, respectively.

In some examples, a weight ratio of the salt 1011 (e.g., Zn triflate) or any other component of the dopant 1010 to the polymer 1024 (e.g., PVDF-HFP) or another component of the carrier 1020 in an electrolyte formulation (e.g., provided on a "solids only" basis) may be at least about 0.25, 0.5, 0.75, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 2, 2.1, 2.2, 2.3, 2.4, 2.5, 2.6, 2.7, 2.8, 2.9, 3, 3.1, 3.2, 3.3, 3.4, 3.5, 3.75, 4, 4.24, 4.5, 4.75, 5, 5.5, 6, 6.5, 7, 7.5, 8, 8.5, 9, 9.5, 10, 11, 12, 13, 14, 15, 20, 25, 30, 35, 40, 45, 50, 75, 100, 200, 300, 400, 500, and the like. In an example, a weight ratio of a salt (e.g., Zn triflate) to a polymer (e.g., PVDF-HFP) in an electrolyte formulation is at least or equal to about 1.

In some examples, volume fraction of the polymer 1024 (e.g., PVDF-HFP) or any other component of the carrier 1020 in an electrolyte formulation (e.g., provided on a "solids only" basis) may be at least about 5 volume %, at least about 10 volume %, at least about 15 volume %, at least about 20 volume %, at least about 25 volume %, at least about 30 volume %, at least about 35 volume %, at least about 40 volume %, at least about 45 volume %, at least about 50 volume %, at least about 55 volume %, at least about 60 volume %, and the like. In some examples, volume fraction of the polymer 1024 (e.g., PVDF-HFP) in an electrolyte formulation (e.g., provided on a "solids only" basis) may be less than about 5 volume %, less than about 10 volume %, less than about 15 volume %, less than about 20 volume %, less than about 25 volume %, less than about 30 volume %, less than about 35 volume %, less than about 40 volume %, less than about 45 volume %, less than about 50 volume %, less than about 55 volume %, less than about 60 volume %, and the like. In an example, volume fraction of a polymer (e.g., PVDF-HFP) in an electrolyte formulation (e.g., electrolyte comprising BMIM triflate, and Zn triflate salt) provided on a "solids only" basis is about 41 volume %, about 39-40 volume % or about 24 volume % for Formulation 1, Formulation 2 and Formulation 3, respectively. In another example, volume fraction of a polymer (e.g., PVDF-HFP) in an electrolyte formulation (e.g., electrolyte comprising EMIM triflate ionic liquid, and Zn triflate salt) provided on a "solids only" basis is about 42-43 volume %, about 41 volume % or about 25 volume % for Formulation 1, Formulation 2 and Formulation 3, respectively.

In some examples, volume fraction of the ionic liquid 1022 (e.g., BMIM triflate or EMIM triflate) or any other component of the carrier 1020 in an electrolyte formulation (e.g., provided on a "solids only" basis) may be at least about 5 volume %, at least about 10 volume %, at least about 15 volume %, at least about 20 volume %, at least about 25 volume %, at least about 30 volume %, at least about 35 volume %, at least about 40 volume %, at least about 45 volume %, at least about 50 volume %, at least about 55 volume %, at least about 60 volume %, at least about 65 volume %, at least about 70 volume %, at least about 75 volume %, at least about 80 volume %, at least about 85 volume %, at least about 90 volume %, at least about 95 volume %, and the like. In an example, volume fraction of an ionic liquid (e.g., BMIM triflate) in an electrolyte formulation (e.g., electrolyte comprising PVDF-HFP polymer, and Zn triflate salt) provided on a "solids only" basis is at least or equal to about 56-57 volume %, at least or equal to about 54-55 volume % or at least or equal to about 66 volume % for Formulation 1, Formulation 2 and Formulation 3, respectively. In another example, volume fraction of an ionic liquid (e.g., EMIM triflate) in an electrolyte formulation (e.g., electrolyte comprising PVDF-HFP polymer, and Zn triflate salt) provided on a "solids only" basis is at least or equal to about 55 volume %, at least or equal to about 53 volume % or at least or equal to about 65 volume % for Formulation 1, Formulation 2 and Formulation 3, respectively.

In some examples, volume fraction of the salt 1011 (e.g., Zn triflate) or any other component of the dopant 1010 in an electrolyte formulation (e.g., provided on a "solids only" basis) may be at least about 1 volume %, at least about 2 volume %, at least about 3 volume %, at least about 4 volume %, at least about 5 volume %, at least about 6 volume %, at least about 7 volume %, at least about 8 volume %, at least about 9 volume %, at least about 10 volume %, at least about 11 volume %, at least about 12 volume %, at least about 13 volume %, at least about 14 volume %, at least about 15 volume %, at least about 16 volume %, at least about 17 volume %, at least about 18 volume %, at least about 19 volume %, at least about 20 volume %, at least about 21 volume %, at least about 22 volume %, at least about 23 volume %, at least about 24 volume %, at least about 25 volume %, at least about 26 volume %, at least about 27 volume %, at least about 28 volume %, at least about 29 volume %, at least about 30 volume %, at least about 35 volume %, at least about 40 volume %, at least about 45 volume %, at least about 50 volume %, at least about 55 volume %, at least about 60 volume %, at least about 65 volume %, at least about 70 volume %, at least about 75 volume %, at least about 80 volume %, at least about 85 volume %, at least about 90 volume %, at least about 95 volume %, and the like. In an example, volume fraction of a salt (e.g., Zn triflate) in an electrolyte formulation (e.g., electrolyte comprising PVDF-HFP polymer, and BMIM triflate ionic liquid) provided on a "solids only" basis is at least or equal to about 2-3 volume %, at least or equal to about 5-6 volume % or at least or equal to about 9-10 volume % for Formulation 1, Formulation 2 and Formulation 3, respectively. In another example, volume fraction of a salt (e.g., Zn triflate) in an electrolyte formulation (e.g., electrolyte comprising PVDF-HFP polymer, and EMIM triflate ionic liquid) provided on a "solids only" basis is at least or equal to about 2-3 volume %, at least or equal to about 6 volume % or at least or equal to about 10 volume % for Formulation 1, Formulation 2 and Formulation 3, respectively.

TABLE 4

|  | BMIM triflate molarity mol/l solids only | Zn OTf molarity solids only | Zn OTf in BMIM OTf molarity | Calculated density of salt in IL |
|---|---|---|---|---|
| Formulation 2 | 2.45 | 0.71 | 1.17 | 1.59 |
| Formulation 1 | 2.54 | 0.28 | 0.48 | 1.42 |
| Formulation 3 | 2.97 | 1.18 | 1.55 | 1.69 |

TABLE 5

|  | PVDF-HFP (g) | NMP (g) | BMIM triflate (g) | Zn salt (g) | PVDF-HFP wt. % solids only | BMIM triflate wt. % solids only |
|---|---|---|---|---|---|---|
| Formulation 2 | 8 | 24 | 8 | 2.9234 | 42.28% | 42.28% |
| Formulation 1 | 8 |  | 8 | 1.125 | 46.72% | 46.72% |
| Formulation 3 | 8 |  | 16 | 8 | 25.00% | 50.00% |

|  | Zn OTf wt. % solids only | Zn OTf + IL wt. % of solids only | (Zn OTf + IL): PVDF-HFP weight ratio | PVDF-HFP vol. % solids only | BMIM triflate vol. % solids only | Zn OTf vol. % solids only |
|---|---|---|---|---|---|---|
| Formulation 2 | 15.45% | 57.72% | 1.37 | 39.61% | 54.57% | 5.82% |
| Formulation 1 | 6.57% | 53.28% | 1.14 | 41.08% | 56.60% | 2.32% |
| Formulation 3 | 25.00% | 75.00% | 3.00 | 24.05% | 66.28% | 9.67% |

TABLE 6

|  | EMIM triflate molarity mol/l solids only | Zn OTf molarity solids only | Zn OTf in EMIM OTf molarity | Calculated density of salt in IL |
|---|---|---|---|---|
| Formulation 2 | 2.81 | 0.73 | 1.25 | 1.69 |
| Formulation 1 | 2.92 | 0.29 | 0.51 | 1.51 |
| Formulation 3 | 3.44 | 1.23 | 1.64 | 1.79 |

TABLE 7

|  | PVDF-HFP (g) | NMP (g) | EMIM triflate (g) | Zn salt (g) | PVDF-HFP wt. % solids only | EMIM triflate wt. % solids only |
|---|---|---|---|---|---|---|
| Formulation 2 | 8 | 24 | 8 | 2.9234 | 42.28% | 42.28% |
| Formulation 1 | 8 |  | 8 | 1.125 | 46.72% | 46.72% |
| Formulation 3 | 8 |  | 16 | 8 | 25.00% | 50.00% |

|  | Zn OTf wt. % solids only | Zn OTf + IL wt. % of solids only | (Zn OTf + IL): PVDF-HFP weight ratio | PVDF-HFP vol. % solids only | EMIM triflate vol. % solids only | Zn OTf vol. % solids only |
|---|---|---|---|---|---|---|
| Formulation 2 | 15.45% | 57.72% | 1.37 | 41.04% | 52.93% | 6.03% |
| Formulation 1 | 6.57% | 53.28% | 1.14 | 42.62% | 54.97% | 2.41% |
| Formulation 3 | 25.00% | 75.00% | 3.00 | 25.12% | 64.79% | 10.09% |

In some examples (e.g., see TABLE 3), mass or volume fraction (in weight % or volume %, respectively) of a salt or any dopant 1010 (e.g., the salt 1011, such as, for example, Zn triflate) in an ionic liquid or any carrier 1020 (e.g., the ionic liquid 1022, such as, for example, EMIM DCA) may be at least about 5, 10, 15, 20, 25, 30, 35, 40, 45, 50, 55, 60, 65, 70, 75, 80, 85, 90 or 95 weight % or volume %.

In some examples (e.g., see TABLE 3 or TABLE 8), mass or volume fraction (in weight % or volume %, respectively) of additive(s) 1021 (e.g., of each individual additive 1021 or of all additives 1021 taken together), component(s) 1026 (e.g., of each individual component 1026 or of all components 1026 taken together) or any other component(s) of the dopant 1010, the carrier 1020 or the electrolyte 1000 (e.g., of each individual cosolvent 1023, of all cosolvents 1023 taken together, of each individual process solvent 1025 or of all process solvents 1025 taken together) in a dopant or any component thereof, in a carrier or any component thereof, in a combination of a dopant or a component thereof and a carrier or a component thereof, or in an electrolyte formulation or any component thereof (e.g., provided on a "solids only" or "liquid" basis) may be at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95, 100, 125, 150, 175, 185 or 195 weight % or volume %.

In some examples, as described in greater detail elsewhere herein (e.g., see TABLE 3 or TABLE 8), mass or volume fraction (in weight % or volume %, respectively) of additive(s) 1021 (e.g., of each individual additive 1021 or of all additives 1021 taken together), component(s) 1026 (e.g., of each individual component 1026 or of all components 1026 taken together) or any other component(s) of the dopant 1010, the carrier 1020 or the electrolyte 1000 (e.g., of each individual cosolvent 1023, of all cosolvents 1023 taken together, of each individual process solvent 1025 or of all process solvents 1025 taken together) in a dopant or any component thereof, in a carrier or any component thereof, in a combination of a dopant or a component thereof and a carrier or a component thereof, or in an electrolyte formulation or any component thereof (e.g., provided on a "solids only" or "liquid" basis) may be less than about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95, 100, 125, 150, 175, 185 or 195 weight % or volume %.

In an example, mass fraction of an additive 1021 (e.g., water) or a component 1026 (e.g., a complexing agent such as, for example, water) in an ionic liquid (e.g., [Emim][DCA]) or in a mixture of an ionic liquid and a salt (e.g., a mixture of [Emim][DCA] and Zn[DCA]) can be greater than or equal to about 3 weight %. In another example, mass fraction of an additive 1021 (e.g., water) or a component 1026 (e.g., a complexing agent such as, for example, water) in an electrolyte formulation can be less than or equal to about 3 weight % or less than or equal to about 10 weight %. In yet another example, mass fraction of a component 1026 (or an additive 1021) (e.g., a particle additive such as, for example, zinc oxide nanoparticles) in a mixture comprising a polymer 1024 (e.g., PVDF-HFP), a process solvent (e.g., NMP), an ionic liquid and a salt (e.g., Zn triflate) can be less than or equal to about 2 weight %.

FIGS. 9A-B provide images of example mixtures of a dopant (e.g., the salt 1011) in a carrier (e.g., the ionic liquid 1022) having a concentration of the dopant in the carrier greater than 1 M (e.g., corresponding to Formulation 2, where the concentration of the salt in the ionic liquid is greater than 1 M). FIG. 9A is an example of a mixture of Zn TFSI in EMIM TFSI, and FIG. 9B is an example of a mixture of Zn OTf in EMIM OTf. In these examples, the mixtures are not fully dissolved solutions, but suspensions exceeding the solubility limit. In some cases, such electrolyte formulations comprising salt mixtures above the solubility limit may exceed the performance of electrolyte formulations comprising salt mixtures below the solubility limit.

In some embodiments, molarity of a salt or any dopant 1010 (e.g., the salt 1011, such as, for example, Zn triflate) in an ionic liquid or any carrier 1020 (e.g., the ionic liquid 1022, such as, for example, BMIM triflate or EMIM triflate) may be greater than about 0.75 M or greater than about 1 M. In one example, the electrolyte formulations may include metal salt in carrier (e.g., solvent) molarities greater than about 0.75 M. In another example, the electrolyte formulations may include metal salt in carrier (e.g., solvent) molarities greater than about 1 M. Various embodiments may include electrolytes comprising metal salt(s) in ionic liquid(s), and/or metal salt(s) in carbonates and/or other cosolvents. Further, the metal salt(s) may be combined with one or more other components of the dopant 1010. The metal salt(s) and/or other dopant components may be combined with one or more components of the carrier 1020, as described in greater detail elsewhere herein.

It was surprisingly discovered in the present invention that effective electrolyte formulations may not be limited by the solubility of the dopant in the carrier (e.g., solubility of the metal salt in the ionic liquid). Electrolyte formulations with high doping levels (e.g., high metal salt concentration) may in some cases exceed the solubility limit of the dopant (e.g., salt) in the electrolyte (and/or in the carrier). Further, it was surprisingly discovered that the high doping electrolyte formulations herein may not exhibit electrochemical cycling instabilities (e.g., cycling instabilities above 0.5 M). Further, viscosity concerns at high doping levels (e.g., at high molar concentrations) may be mitigated. The high doping (e.g., high molarity salt in ionic liquid) electrolyte formulations herein may provide improved capacity performance (e.g., in electrolyte formulations comprising salt, ionic liquid and polymer) and/or stable cycling capability. For example, electrolyte formulations with a salt molarity exceeding 1 M may offer improved performance compared to electrolyte formulations with lower salt molarities. Illustrative examples of electrochemical cell chemistries that may advantageously benefit from the high doping electrolyte formulations herein are described in PCT Patent Publication No. WO 2012/037171 ("IONIC GEL ELECTROLYTE, ENERGY STORAGE DEVICES, AND METHODS OF MANUFACTURE THEREOF"), Xu et al., "NOVEL ZINC ION CONDUCTING POLYMER GEL ELECTROLYTES BASED ON IONIC LIQUIDS," Electrochemistry Communications 7 (2005), 1309-1317, and Ye et al., "ZINC ION CONDUCTING POLYMER ELECTROLYTES BASED ON OLIGOMERIC POLYETHER/PVDF-HFP BLENDS," Journal of Power Sources 165 (2007) 500-508, incorporated herein by reference in their entireties.

Figure 2:
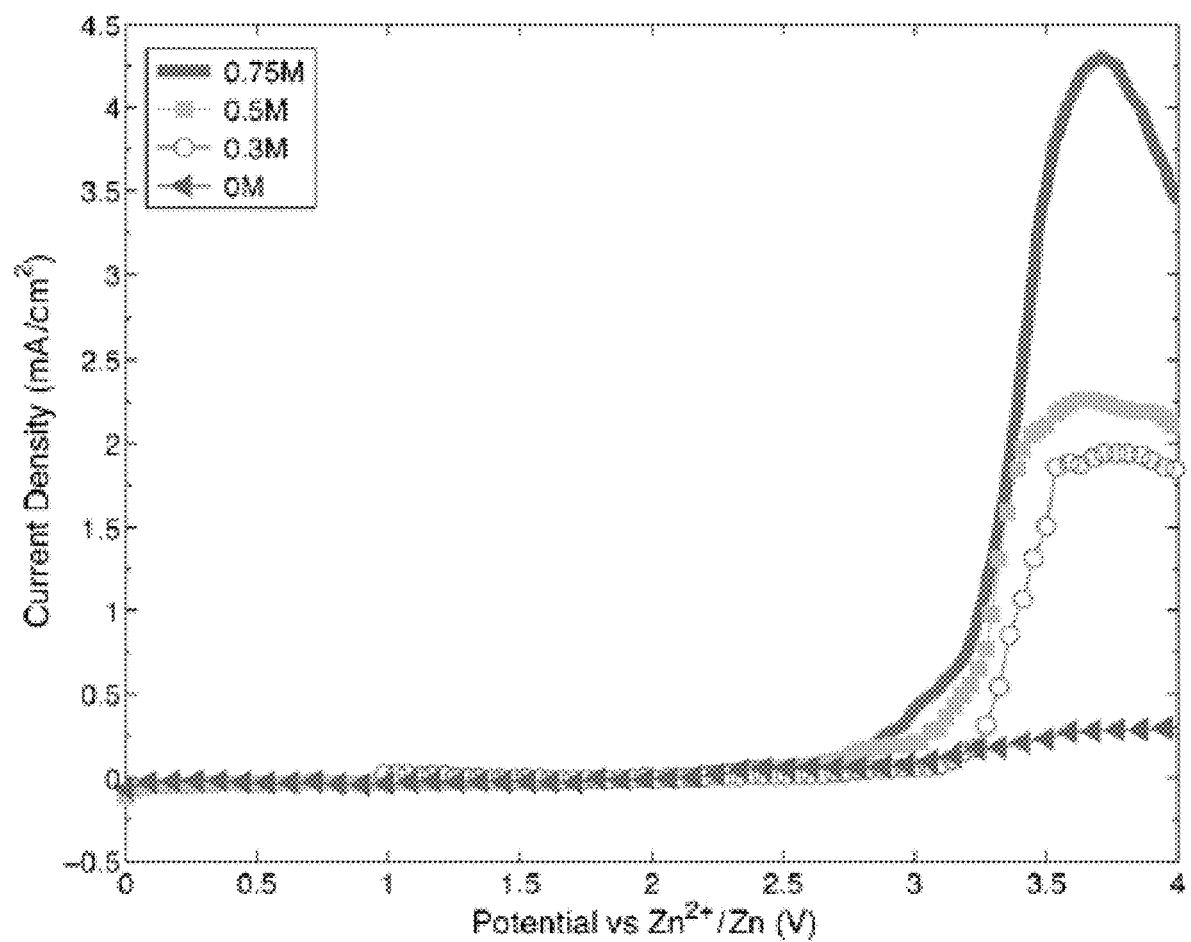
FIG. 2 provides voltammetry measurements in cells comprising Zn triflate-BMIM triflate electrolytes with varying concentrations of the Zn salt in the ionic liquid.

FIG. 2 provides voltammetry measurements in cells comprising Zn triflate-BMIM triflate electrolytes with varying concentrations (0 M, 0.3 M, 0.5 M and 0.75 M) of the Zn salt in the ionic liquid. The cells comprise Zn and stainless steel electrodes, and current density is measured as a function of voltage with respect to the Zn electrode. In this example, increasing electrode current densities are measured in voltage sweeps for higher Zn salt molarity electrolytes (e.g., beyond 0.5 M salt in ionic liquid). The higher electrode current densities may indicate increased reactivity between the Zn electrode and the high Zn salt molarity electrolytes.

Figure 3:
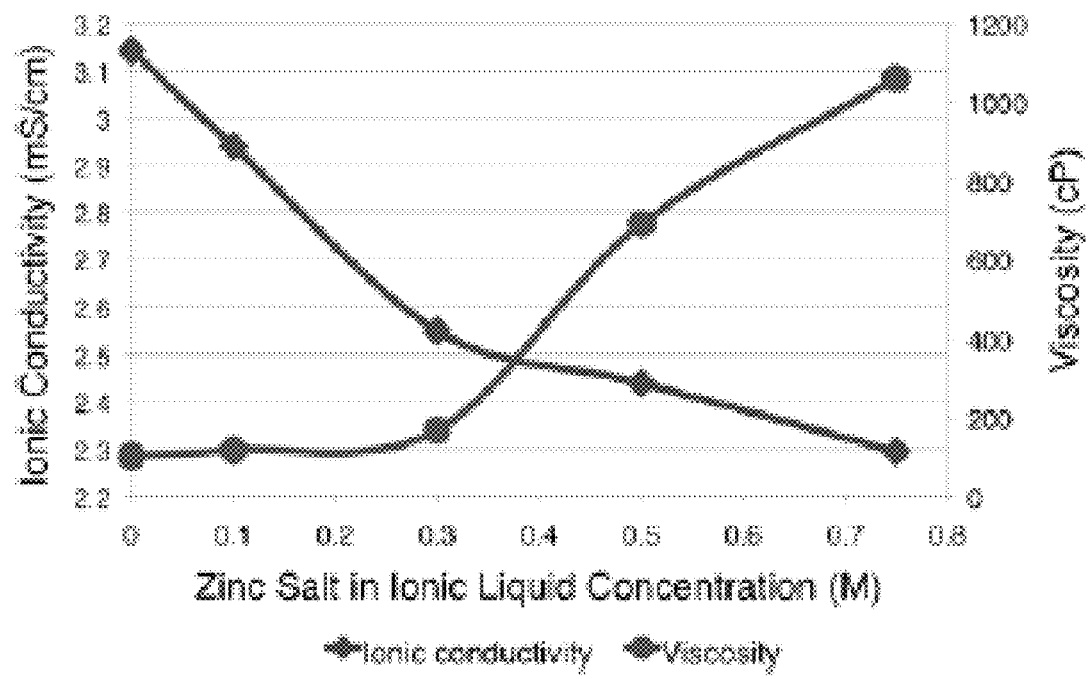
FIG. 3 provides measurements of ionic conductivity and viscosity versus concentration of Zn triflate in BMIM triflate ionic liquid.

FIG. 3 provides measurements of ionic conductivity and viscosity versus concentration (0-0.75 M) of Zn triflate in BMIM triflate ionic liquid. In this example, as the salt or dopant concentration (also "level," "doping" and "content" herein) increases, the ionic conductivity of the electrolyte decreases (e.g., despite increasing Zn ion concentration), and the viscosity of the electrolyte increases. In some cases, the salt or dopant (e.g., Zn triflate, Zn TFSI, Zn acetate, etc.) may be solid at room temperature, and increasing addition of the salt or dopant to the ionic liquid or carrier may increase the viscosity and/or lower the ionic conductivity of the electrolyte. The decreasing ionic conductivity and/or increasing viscosity of the high doping formulations may be mitigated in order to take advantage of the high reactivity of the high doping formulations.

In some embodiments, addition of viscosity lowering additives may increase the ionic conductivity of high doping electrolytes (e.g., high salt content electrolytes), allowing for a combination of high reactivity (e.g., Zn reactivity or reactivity with any other electrode herein) and high ionic conductivity to be achieved. For example, tailored or optimized high doping (e.g., high molarity or high metal salt content) formulations with additives may be used to further increase or maximize the ionic conductivity and reactivity potential of the high doping electrolytes herein. Further, as previously described, additives may be added to alter viscosity, ionic conductivity, reactivity, electrochemical stability, or any combination thereof. For example, with continued reference to FIG. 2, the measured current densities may increase above a given voltage (e.g., 2.7 V). The increased current densities may indicate a decreasing electrochemical stability (e.g., decreasing anodic stability and/or electrolyte decomposition). In some cases, a greater increase in current density may occur at greater doping levels (e.g., greater zinc salt concentrations). In this instance, an additive that increases the electrochemical stability of the high doping electrolyte may be used to extend its electrochemical stability range.

In some embodiments, the electrolyte formulations in TABLES 4-7 may be printed, coated, cast or sprayed to form solid film electrolytes (e.g., solid film electrolytes that are effective secondary Zn ion battery electrolytes).

As previously described, electrolyte formulations with high doping levels (e.g., salt molarities exceeding 1 M) may exhibit improved performance compared to electrolytes with lower doping levels (e.g., lower salt molarities). Moreover, such electrolytes may form different microstructures at various consistencies (e.g., when in a flowable state and/or when in a solid or semi-solid state). For example, high doping (e.g., high molarity) formulations of triflate electrolytes may in some cases result in milky dispersions of salts in the electrolyte (and/or in the carrier). This may indicate a dispersion of salt-rich suspended particles. In a solid film, this may result in an over-doped multiphase microstructure including salt-rich domains that contribute to high salt activity in the cell and ionic liquid-rich regions with high ionic conductivity.

Figure 5A:
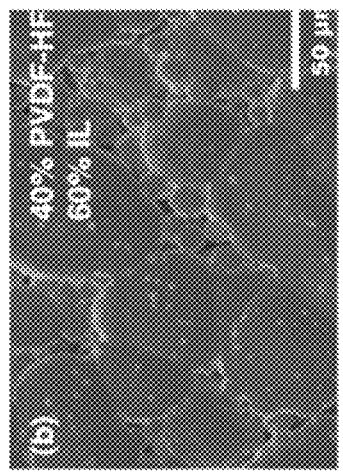
FIGS. 5A-5D provide micrographs of gel electrolytes comprising ionic liquid and PVDF-HFP cast from an NMP solvent-borne solution.
Figure 5B:
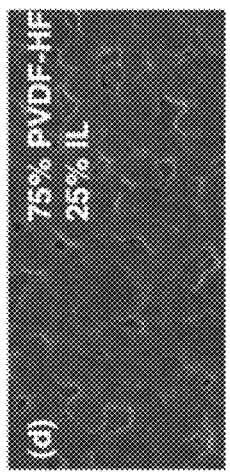
Figure 5C:
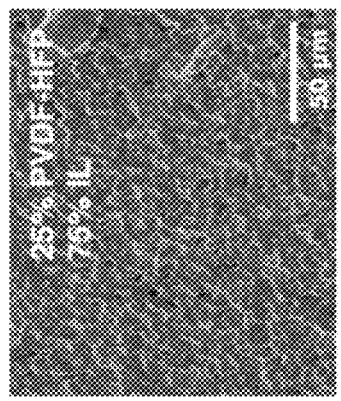
Figure 5D:
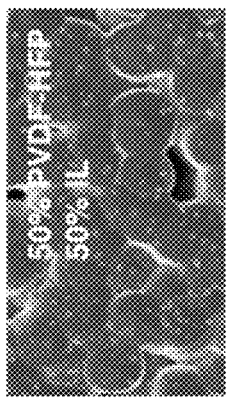

FIGS. 5A-D provide micrographs of gel electrolytes comprising ionic liquid and PVDF-HFP cast from an NMP solvent-borne solution. Morphological changes may occur as a function of composition of the electrolyte (e.g., the electrolyte 1000). The morphologies in FIGS. 5A-D are consistent with film formation by drying of a liquid suspension of gel particles to form a semi-dense solid film with some voids and a grain structure that retains some of the rounded suspension particle shapes. In FIGS. 5A-D, the electrolyte comprises 25% (e.g., weight %), 40% (e.g., weight %), 50% (e.g., weight %) and 75% (e.g., weight %), respectively, of PVDF-HFP (e.g., the polymer 1024), and 75% (e.g., weight %), 60% (e.g., weight %), 50% (e.g., weight %) and 25% (e.g., weight %), respectively, of an ionic liquid-containing component (e.g., the ionic liquid 1022 combined with the salt 1011). In the examples of FIGS. 5B-D, an increasing amount of the ionic liquid-containing component may lead to enlarged grains. In FIG. 5A, the grain size decreases, and the polymer and the ionic liquid-containing components may become compositionally more heterogeneous and/or phase separation of more polymer-rich and more ionic liquid or salt-rich regions may occur.

Figure 12:
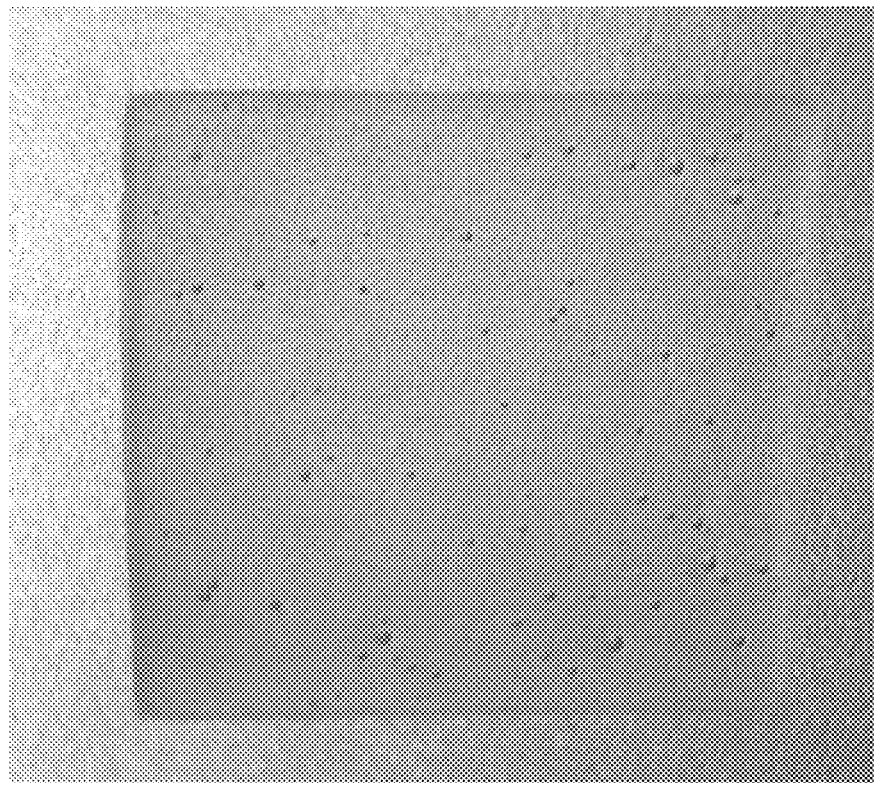
FIG. 12 is an optical image of a printed high Zn TFSI-doped solid gel electrolyte film on a Zn foil substrate.

FIG. 12 is an optical image of a printed high Zn TFSI-doped solid gel electrolyte film on a Zn foil substrate. In this example, the film comprises bubbles. In some cases, the bubbles may be eliminated (e.g., through optimization of printing parameters).

Electrochemical Cells

A further aspect of the disclosure relates to electrochemical cells and energy storage devices comprising electrolyte formulations described herein. Such electrochemical cells may allow for robust, thin and flexible battery cells that can be fabricated with low cost, customizable and high throughput printing and/or coating equipment. Further, the zinc-based electrochemical cells described herein may provide a new path to non-lithium-based high energy density batteries that can use more stable, lower toxicity, and more earth abundant cell materials. Electrochemical cells based on these materials may find use in applications with microwatt-hour (µWh) to greater than watt-hour (Wh) energy storage capacities. The electrochemical cells herein may be rechargeable. In some embodiments, at least a portion of the electrochemical cells herein (e.g., low toxicity electrolytes, low toxicity or disposable cell materials) may be disposable.

An energy storage device may include at least one electrochemical cell. The electrochemical cell may include a negative electrode, an electrolyte adjacent to the negative electrode, and a positive electrode adjacent to the electrolyte. The negative electrode may be separated from the positive electrode by the electrolyte. The negative electrode may be an anode during discharging. The positive electrode may be a cathode during discharging. The negative electrode may include negative electrode material and the positive electrode may include positive electrode material. In some embodiments, the negative electrode and/or the positive electrode may comprise one or more electrolyte components (e.g., one or more components of the electrolyte 1000). Electrons may be provided to and from the positive and negative electrodes via positive and negative current collectors, respectively.

During discharging (e.g., when the battery is coupled to a load), the negative electrode material may be oxidized to yield one or more electrons and cations of the negative electrode material. The negative electrode may comprise a metal that yields multivalent cations. For example, the negative electrode material may comprise zinc, aluminum, magnesium, yttrium, or any combination thereof. The cations may migrate through the electrolyte to the positive electrode material and intercalate in the positive electrode material through electrochemical reduction (insertion). The positive electrode material may comprise a metal oxide or any material capable of intercalating the cations. For example, the positive electrode material may comprise manganese dioxide, vanadium pentoxide, cobalt oxide, lead oxide, or any combination thereof. In some embodiments, the positive electrode material may further comprise a polymer, a polymer binder, conductive particles (e.g., carbon particles or conductive nanoparticles), rheology-enhancing particles (e.g., titanium oxide powder or silica particles), or any combination thereof.

During charging (e.g., when the electrochemical cell is coupled to an external power source), the cations in the positive electrode material may deintercalate through electrochemical oxidation (extraction) and migrate through the electrolyte back to the negative electrode. At the negative electrode, the cations may be reduced to the neutral negative electrode material by accepting one or more electrons.

The negative and/or the positive electrode may comprise a printed layer. The negative and/or positive electrode may have a thickness (e.g., a printed layer thickness) of, for example, between about 8 microns and about 60 microns. An electrode may be in electronic communication with an external electric circuit (e.g., circuit comprising a power source or load). An electrode may be in electronic communication with the external electric circuit via a current collector. The current collector may comprise a printed layer. The current collector may have a thickness (e.g., printed layer thickness) of, for example, between about 8 microns and about 60 microns. The current collector may comprise a metallic foil with a thickness between about 1 micron and about 80 micron. In some examples, an electrode has a thickness of less than about 100 microns, 80 microns, 60 microns, 40 microns, 30 microns, 20 microns, 10 microns, 5 microns, 1 micron, or less. In some examples, a current collector has a thickness of less than about 100 microns, 80 microns, 60 microns, 40 microns, 30 microns, 20 microns, 10 microns, 5 microns, 1 micron, 0.5 micron, or less.

In some embodiments, an electrochemical cell of the disclosure can comprise a positive electrode, a negative electrode and an electrolyte between the positive electrode and the negative electrode. The electrolyte can comprise a metal salt and a carrier. The electrochemical cell can have a capacity of at least about 0.001 milliampere-hours (mAh). In some cases, a molarity of the metal salt in the carrier can be at least about 0.4 molar (M) or at least about 1 M. In some cases, a molarity of the metal salt in the carrier can exceed a solubility limit of the metal salt in the carrier.

In some embodiments, an electrochemical cell of the disclosure can comprise an electrolyte comprising a metal salt and an ionic liquid. A molarity of the metal salt in the ionic liquid can be greater than about 1 molar (M). The electrolyte can be adjacent to an electrode layer that comprises a metal salt or an ionic liquid of the present disclosure.

In some embodiments, the electrochemical cell may be configured to suppress diffusion of ionic species (e.g., ions of the negative electrode material) from the electrolyte into the adjacent electrodes and collectors. Suppression of outdiffusion and of loss of electrolyte function may be especially desirable in electrochemical cells comprising the high doping electrolyte formulations herein, where the driving forces for outdiffusion may be high (e.g., due to high metal salt molarities).

In some cases, outdiffusion may be suppressed by providing electrodes and/or current collectors with salt- or dopant-containing materials (e.g., binders) up to and beyond the concentration of the salt or dopant (or any other component of the electrolyte 1000) in the electrolyte. In some cases, the electrodes and/or current collectors may be infused and/or coated with such materials. Such electrodes and/or current collectors may be advantageously combined with the high doping electrolytes herein. In an example, the electrodes and/or current collectors may comprise a material with a concentration of the dopant (e.g., metal salt) of at least about 0.3 M, at least about 0.7 M or at least about 1.2 M. In some examples, the electrodes and/or current collectors may comprise a material with a concentration of the dopant (e.g., metal salt) of less than, equal to, or greater than any of the concentrations or levels of the dopant in the electrolyte described herein. For example, the electrodes and/or current collectors may comprise a material with a concentration of the dopant (e.g., metal salt) of at least about 0.1 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 1.6 M, 1.7 M, 1.8 M, 1.9 M, 2 M, 2.1 M, 2.2 M, 2.3 M, 2.4 M, 2.5 M, 2.6 M, 2.7 M, 2.8 M, 2.9 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, or more. In some situations, the electrodes and/or current collectors may comprise a sufficient level of the dopant to achieve a given performance (e.g., just enough to achieve a given cycling performance). Further examples of electrochemical cells adapted to suppress diffusion of ionic species from the electrolyte into the adjacent electrodes and collectors are described in U.S. patent application Ser. No. 13/844,221 ("ELECTROLYTIC DOPING OF NON-ELECTROLYTE LAYERS IN PRINTED BATTERIES"), incorporated herein by reference in its entirety.

In some cases, outdiffusion may be suppressed by providing electrodes and/or current collectors with materials (e.g., binders) having low solubility and/or diffusivity for ions or atoms of the salt or dopant (or any other component of the electrolyte 1000). In some cases, the electrodes and/or current collectors may be infused and/or coated with such materials. Such barriers may be used to suppress loss of these species from the electrolyte and/or from electrode layers, and/or to prevent loss of electrolytic activity during processing or over time due to diffusion stemming from the high diffusion gradients present in the high doping (e.g., high molarity) electrolyte formulations herein. For example, metal salt electrolytes with molarities of the salt in the carrier greater than 0.4 M may be provided adjacent to electrodes and/or current collectors with binders having low solubility and/or diffusivity for the metal salt. Example barriers may include, but are not limited to, non-HFP PVDF, methacrylates including, for example, PMMA and polystyrene sulphonate-based materials, partially crosslinked polymers, or any combination thereof. In some examples, a solubility and/or a diffusivity for ions or atoms of the salt or dopant (or any other component of the electrolyte 1000) in the barrier may be at least about 5%, 10%, 15%, 20%, 25%, 30%, 35%, 40%, 45%, 50%, 55%, 60%, 65%, 70%, 75%, 80%, 85%, 90%, 95%, or 99% less than a solubility and/or a diffusivity for ions or atoms of the salt or dopant (or any other component of the electrolyte 1000) in the electrolyte.

In an example, an electrochemical cell may comprise an electrolyte adjacent to an electrode layer (e.g., positive electrode layer or negative electrode layer). In some implementations, the electrode layer may comprise a metal salt, an ionic liquid and/or any other electrolyte component. For example, a binder of the electrode layer or a binder of a collector layer adjacent to the electrode layer may comprise the metal salt or the ionic liquid in a concentration equal to or greater than a concentration of the metal salt or the ionic liquid in the electrolyte (e.g., the concentration of the metal salt or the ionic liquid in the electrolyte mixture as a whole) adjacent to the electrode layer. The concentration of the metal salt or the ionic liquid in the binder (e.g., the concentration of the metal salt or the ionic liquid in the binder mixture as a whole) may be, for example, greater than about 0.4 M, 1 M or 1.2 M. In some examples, the concentration of the metal salt or the ionic liquid in the binder may be at least about 0.1 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 1.6 M, 1.7 M, 1.8 M, 1.9 M, 2 M, 2.1 M, 2.2 M, 2.3 M, 2.4 M, 2.5 M, 2.6 M, 2.7 M, 2.8 M, 2.9 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, or more. In some cases, providing a similar or higher concentration of the metal salt or the ionic liquid in the binder than in the electrolyte may counteract a driving force for outdiffusion of the metal salt or the ionic liquid from the electrolyte. The driving force may be a function of the concentration difference between the binder and the electrolyte.

In some embodiments, an electrochemical cell comprises a first electrode, a second electrode and an electrolyte between the first electrode and the second electrode. The electrochemical cell can be rechargeable. The electrolyte can comprise a metal salt and an ionic liquid. A molarity of the metal salt in the ionic liquid can be greater than about 1 molar (M). The first electrode or the second electrode can form an electrode layer adjacent to the electrolyte. The electrode layer can comprise the metal salt or the ionic liquid. A binder of the electrode layer or a binder of a collector layer adjacent to the electrode layer can comprises the metal salt or the ionic liquid in a concentration greater than or equal to a concentration of the metal salt or the ionic liquid in the electrolyte adjacent to the electrode layer. The concentration of the metal salt or the ionic liquid in the binder can be greater than about 0.4 M, greater than about 1 M or greater than about 1.2 M.

In some embodiments, the electrolyte formulations herein (e.g., electrolyte formulations in TABLES 4-7) may be cast, dispensed or printed (e.g., screen printed) and then dried to form layers with a thickness of, for example, 1-120 microns, 1-100 microns, 1-30 microns, and the like. In some examples, the thickness may be at least about 0.1 microns, 0.2 microns, 0.5 microns, 1 micron, or more (e.g., to prevent dendritic growth). In some examples, the thickness may be less than about 100 microns, 50 microns, 25 microns, 15 microns, 10 microns, 5 microns, 1 micron, or less. The electrolytes or inks may exhibit air stability that makes them suitable for printing. The layers may form a robust solid gel electrolyte layer. In one implementation, a cell stack using this electrolyte may be built up by first depositing a carbon and PVDF adhesion layer onto a stainless steel substrate, depositing a $MnO_2$/carbon/PVDF cathode electrode on the carbon layer, depositing and drying the electrolyte layer on the cathode layer and depositing a Zn particle containing layer on top of the electrolyte. This may be followed by depositing a current collector layer onto the zinc anode layer to form a full electrochemical (e.g., battery) cell. Cells may also be formed by casting and lamination.

In some embodiments, the electrolytes herein may be formulated with polymers to enhance the physical properties and allow the formation of robust solid flexible electrolyte films. The electrolyte layers or films herein may provide separation between the positive and negative electrodes. For example, the electrolytes may provide a low electrical conductivity gap between the positive and negative electrodes and/or their respective current collectors. In some embodiments, the electrolyte may encapsulate the positive and/or negative electrode. The electrolyte layers or films herein may serve as structural material (e.g., provide flexibility at the same time as structural support). The layers or films may be substantially compressed and/or mechanically robust without substantially altering electrolyte function, integrity, composition, consistency (e.g., separation of the components of the electrolyte 1000), etc. In some embodiments, such as, for example, for liquid cells, the PVDF may be limited or eliminated in the formulation, but the doping (e.g., molarity of the Zn salt in the ionic liquid) may still be maintained at similar levels. In some embodiments, the electrolytes may be infiltrated into porous separators or exploited in fixed gap liquid cells. For example, in the case of liquid electrolyte cells, a separator may be incorporated into a laminated electrode cell or coin cell and then saturated with the electrolyte.

Figure 13:
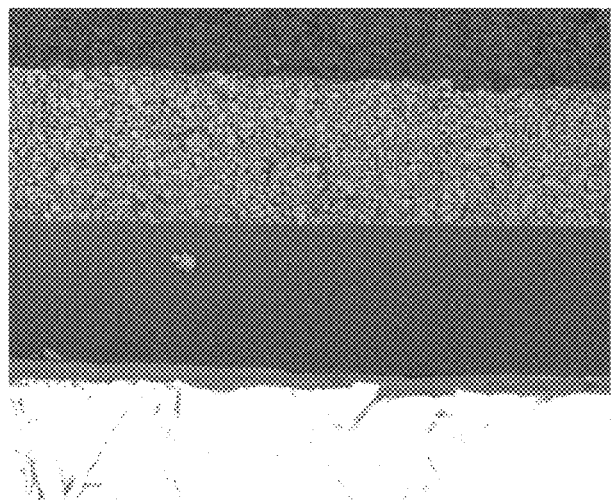
FIG. 13 provides an electron micrograph of a printed battery cell.

FIG. 13 provides an electron micrograph of a printed battery cell formed by successive printing and drying of a high molarity Zn TFSI gel electrolyte, a $MnO_2$ cathode film and a carbon current collector. The electrolyte may be deposited (e.g., cast, dispensed or printed, such as, for example, screen printed) onto an electrode surface (e.g., onto the positive electrode). The deposition process may allow nooks and crannies in the electrode surface to be filled in with the electrolyte. This flooding process may in some cases provide more intimate contact and easier penetration of the electrolyte into/onto the electrode surfaces as compared to, for example, wicking (e.g., wicking into a separator placed between positive and negative electrodes). The improved electrolyte interpenetration may improve robustness to flexing (e.g., thereby making the cell less likely to fall apart, decreasing liquid leakage, decreasing electrical failure, etc.), increase adhesion/anchoring between each electrode and the electrolyte (e.g., thereby making the cell less susceptible to delamination), enable better performance, or any combination thereof. In some cases, lower viscosity electrolytes may allow improved electrolyte interpenetration. As described in greater detail elsewhere herein, electrolyte morphology at electrode surfaces (e.g., the negative electrode surface) may affect cell performance. In some implementations, the electrolyte deposition process may be tailored in concert with methods for controlling electrolyte morphology (e.g., controlling electrolyte consistency or composition to achieve a given particle size) to control solid voids and/or regions with low polymer content at electrode-electrolyte interfaces.

In some embodiments, electrolyte layers or films (e.g., gel electrolyte layers) may be formed from heterogeneous mixtures (e.g., suspensions) of particles. For example, deposition from suspensions may be used for high concentration ionic liquid and salt based electrolytes exceeding the solubility limit in a solvent carrier formulation or ink for process (e.g., Zn triflate and imidizolium triflate combinations, imidizolium acetate and acetate salt combinations, etc.).

Figure 14A:
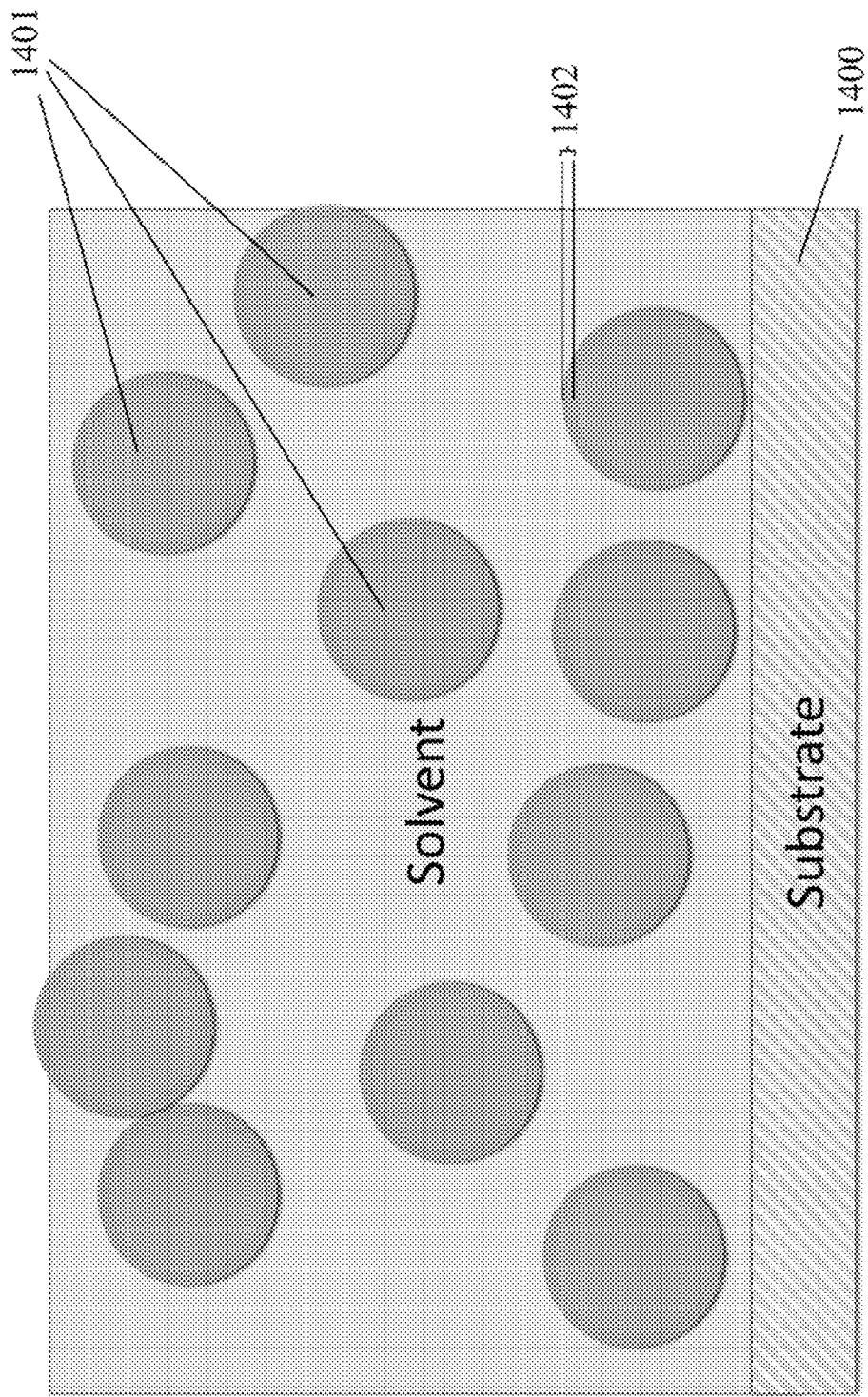
FIGS. 14A-14D schematically illustrate an example film formation process from a heterogeneous mixture.
Figure 14B:
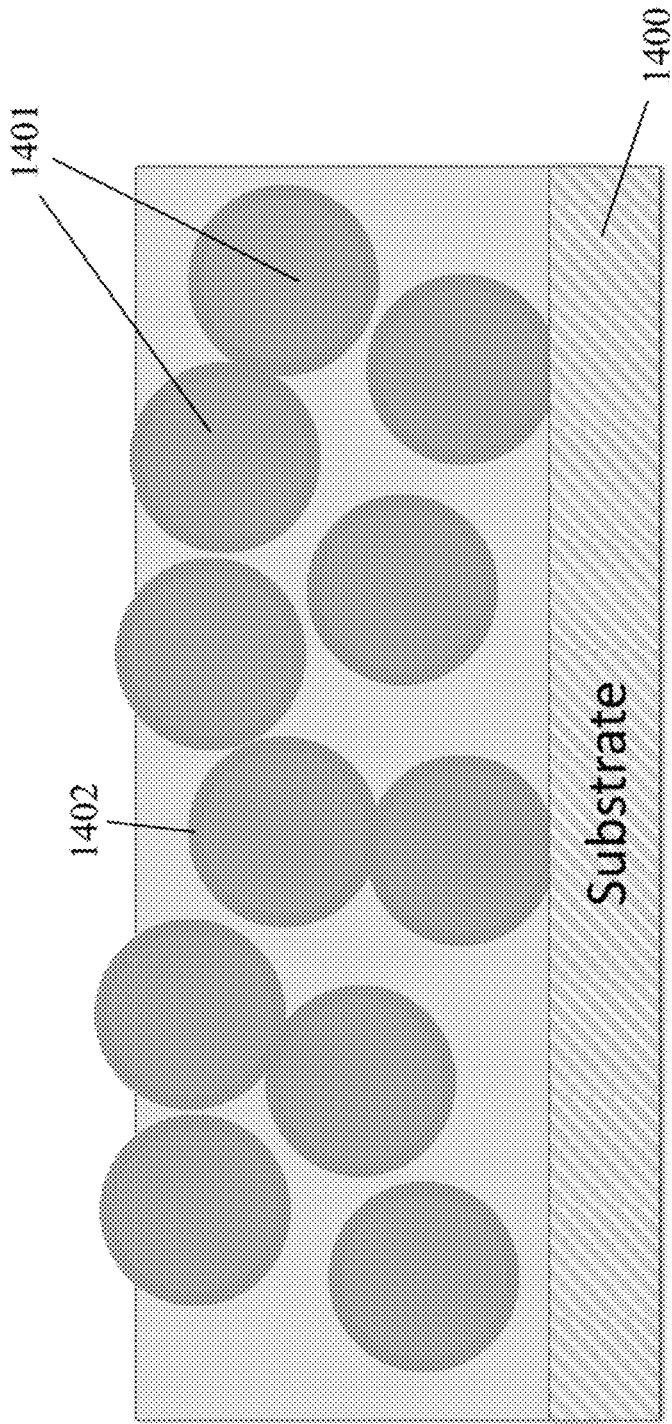
Figure 14C:
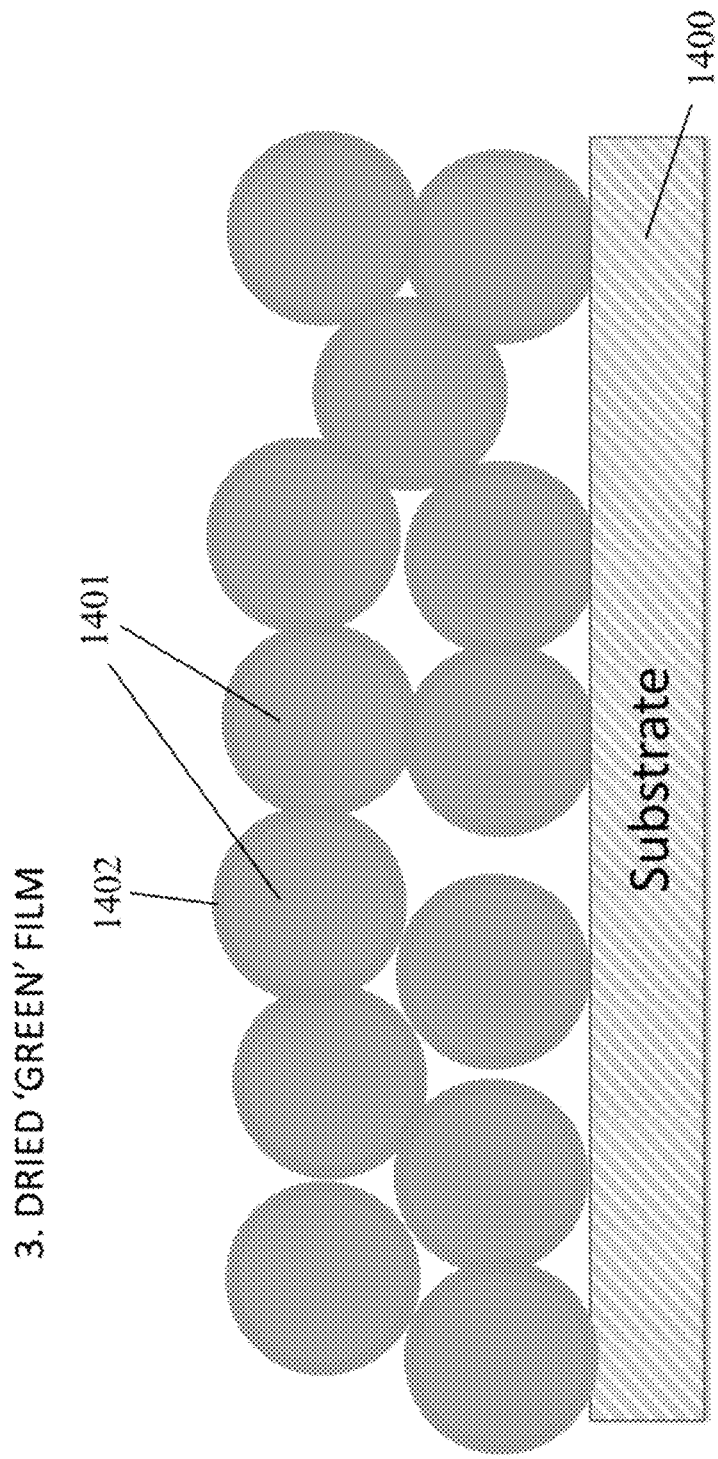
Figure 14D:
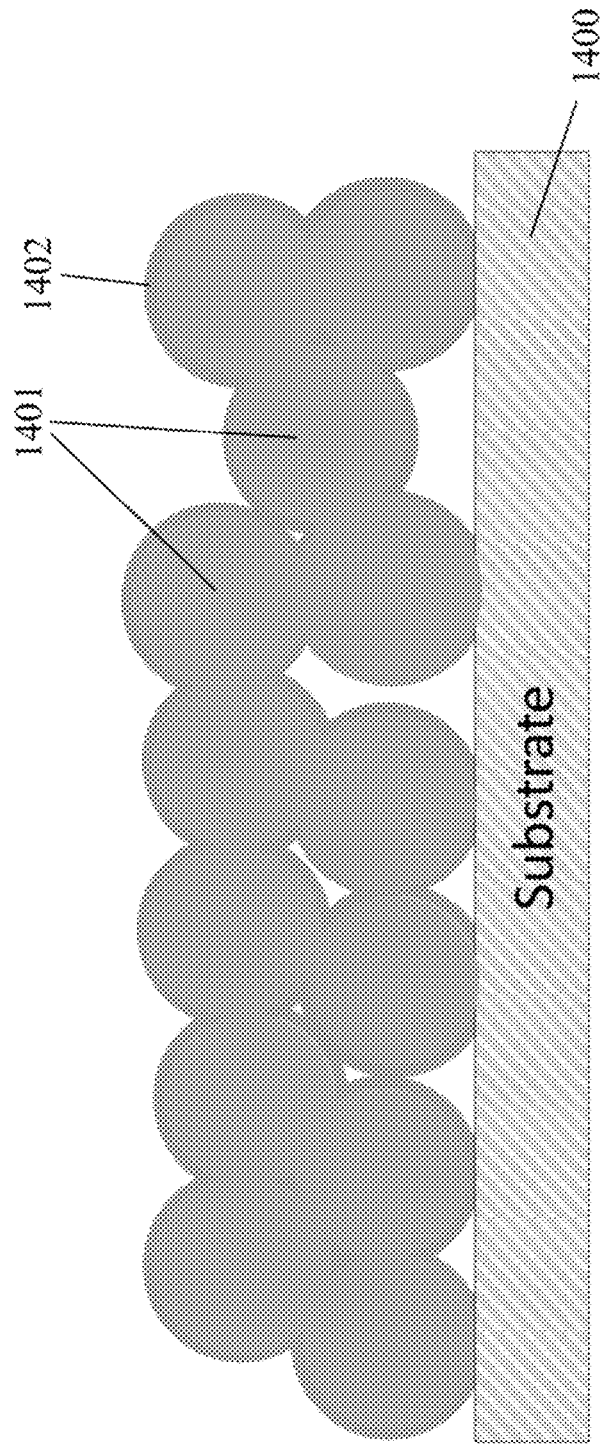

FIGS. 14A-D schematically illustrate an example film formation process from a heterogeneous mixture (e.g., suspension) in a gel electrolyte film. FIG. 14A shows an example of a liquid suspension as deposited on a substrate. FIG. 14B shows an example of solvent loss and settling of particles. FIG. 14C shows an example of a dried film (e.g., dried "green" film). FIG. 14D shows an example of a densified film with intergranular voids.

In a first step, a liquid suspension of particles (e.g., gel particles) 1401 may be deposited on a substrate 1400 (e.g., a cathode or anode layer) (FIG. 14A). One or more of the particles 1401 may each comprise a surface or outer layer 1402. Next, the gel particles may settle and the film may shrink due to solvent loss (FIG. 14B). After substantial solvent removal, a solid or semisolid dried film of gel particles may form on the substrate (FIG. 14C). In the "green" film in FIG. 14C, liquid may be transformed to a solid or semisolid film in which most or all process solvent has been removed; however, the "green" film may not be fully densified, fused, grain ripened and/or converted from precursor to final composition, and/or particle to particle contact may not be complete. Finally, partial coalescence of particles into a semi-connected but void-containing granular structure may occur, thereby forming a densified film with intergranular voids (FIG. 14D).

The particle (e.g., gel particle) surface or outer layer 1402 may comprise or be characterized by inherent surface tension of the material composition of the particles versus their surrounding medium, form a segregation layer of the particles' substituents at or adjacent to one or more interfaces between the particles and the surrounding medium (e.g., in the vicinity of the particle to medium interface), form an intentional surfactant layer, segregation layer or moisture layer, or any combination thereof. The outer layer on the particles (e.g., gel particles) may comprise an intentionally added surfactant, or it may be a result of segregation of suspension-enhancing materials to the particle surface (e.g., ionic liquid, salt, special groups on the polymers in the gel, etc.). The outer layer on the particles in the film (e.g., surfactant or some surface layer of particles) may give way or may get displaced between the steps in FIG. 14C and FIG. 14D to allow particle to particle contact and/or fusion and densification of the film (e.g., at which point it is no longer "green"). The "green" to densified film transformation in FIGS. 14C-D may or may not include a surfactant (e.g., the transformation can include a surfactant/surface fusion transformation and/or another type of surface or bulk transformation).

Figure 15:
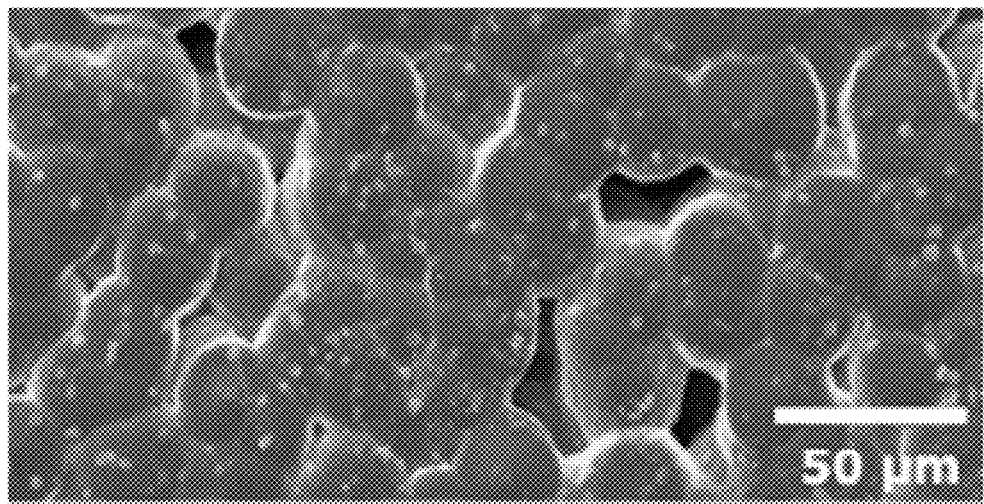
FIG. 15 provides a micrograph of an example electrolyte film showing characteristic heterogeneous deposition characteristics.

FIG. 15 provides a micrograph of an example electrolyte film showing characteristic heterogeneous (e.g., suspension) deposition characteristics. The micrograph shows a Zn OTf/BMIM OTF/PVDF-HFP gel electrolyte cast from an NMP solvent-borne mixture. The morphology is consistent with film formation by drying of a flowable (e.g., liquid) suspension of gel particles to form a semi-dense solid film with some voids and a grain structure that retains some of the rounded suspension particles shapes.

In some embodiments, particle size of the suspension may be reduced in order reduce the void size in the film and therefore limit dendritic growth. In some cases, by reducing the grain size of the electrolyte film to well below the film thickness, the probability of a direct, void (e.g., unobstructed) pathway through the electrolyte may be reduced. As a result, rapid shorting of cells due to dendritic growth through this continuous pathway may be limited or eliminated.

Figure 16A:
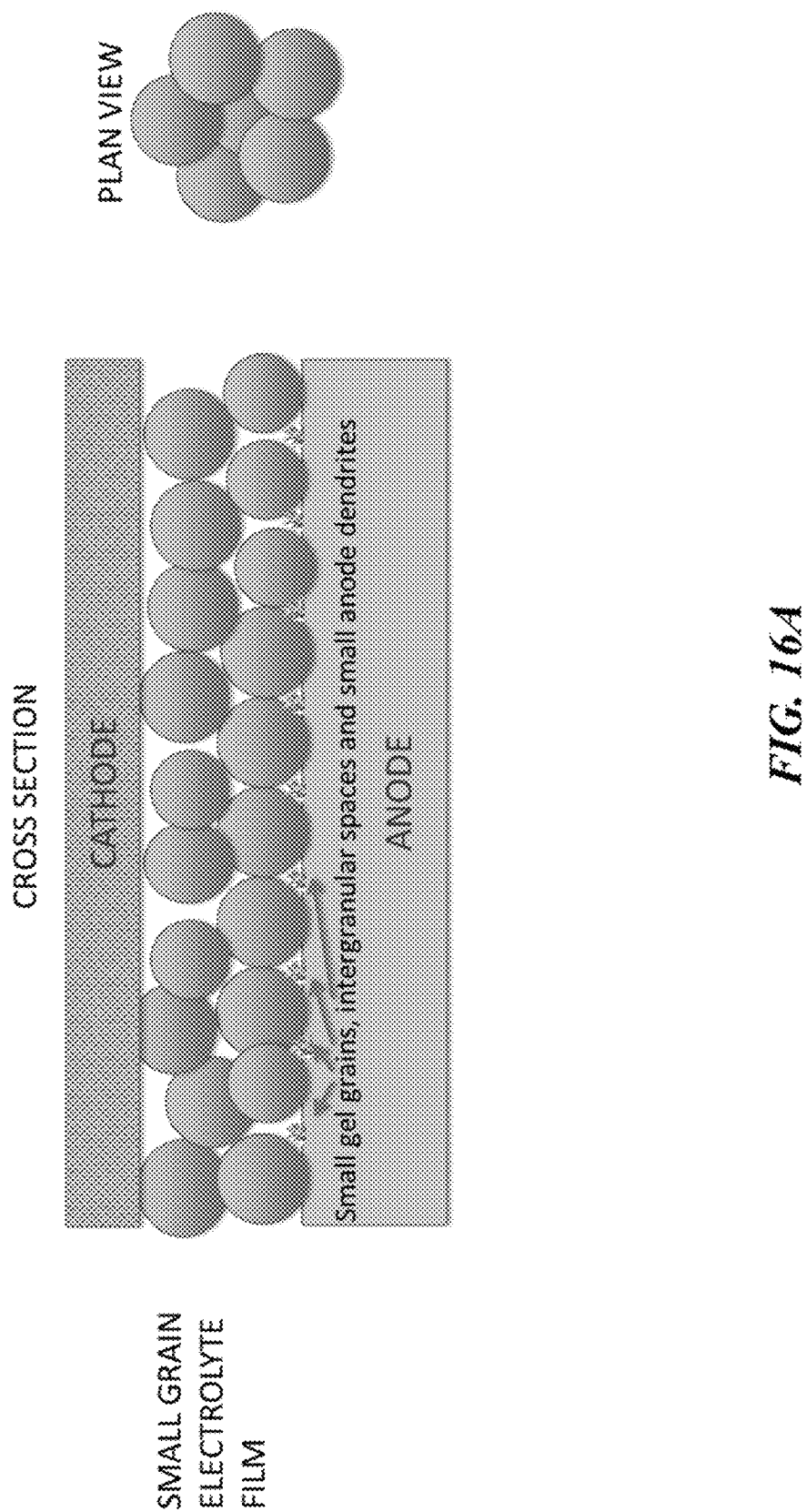
FIGS. 16A-16B schematically illustrate electrolyte-electrode interfaces in electrochemical cells comprising electrolytes with various grain sizes.
Figure 16B:
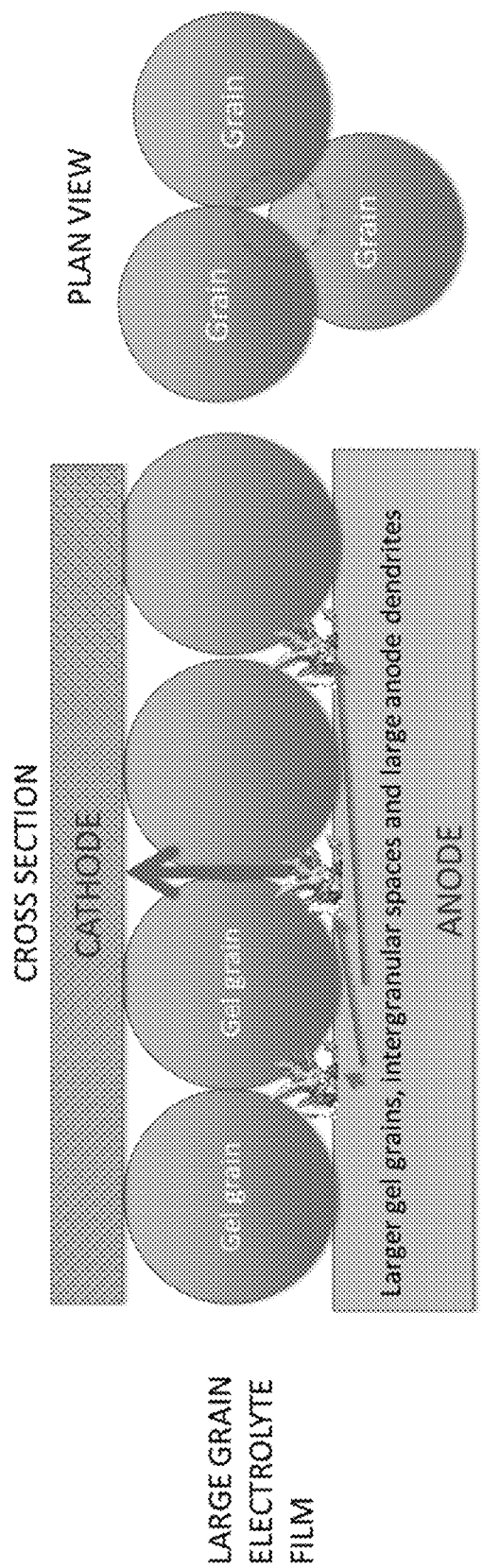

FIGS. 16A-B schematically illustrate electrolyte-electrode interfaces in electrochemical cells comprising electrolytes with various grain sizes. Small voids may be available for dendritic growth in smaller grained electrolyte films (FIG. 16A), while grain boundaries in large grain films may extend through the electrolyte (e.g., through the entire thickness of the electrolyte film) and provide a direct pathway for dendritic growth (FIG. 16B). Dendritic growth may include, for example, growth of anode dendrites or other dendrites.

An anode/electrolyte interface may show small anode dendrite growth in films formed from small gel particle size ranges (e.g., particle diameter <film thickness) (cross-sectional view, left in FIG. 16A). The gel electrolytes may change stability of interfaces (e.g., dendrite growth) in cells. Small grain electrolytes may form small intergranular spaces and small dendrites (e.g., anode dendrites). The fine grain structure may provide limited (e.g., only tortuous) pathways for dendrites to penetrate through the electrolyte (plan view, right in FIG. 16A).

Anode dendrite growth may be larger in films formed from large gel particle size ranges (e.g., particle diameter similar to film thickness) (cross-sectional view, left in FIG. 16B). Larger grain electrolytes may form larger intergranular spaces and large dendrites (e.g., anode dendrites). The larger grain films may provide a higher concentration of continuous, direct pathways for dendrites to penetrate through the electrolyte (e.g., pathways across the entire electrolyte thickness). For example, such pathways may form at three grain boundaries (plan view, right in FIG. 16B). The boundary of three grains may in some cases lead to a linear void or micropipe through the electrolyte film. In some situations, full cell shorting pathways may form from these pathways and may promote more rapid degradation of cells (e.g., as a result of three-dimensional anode interface growth).

Figure 17:
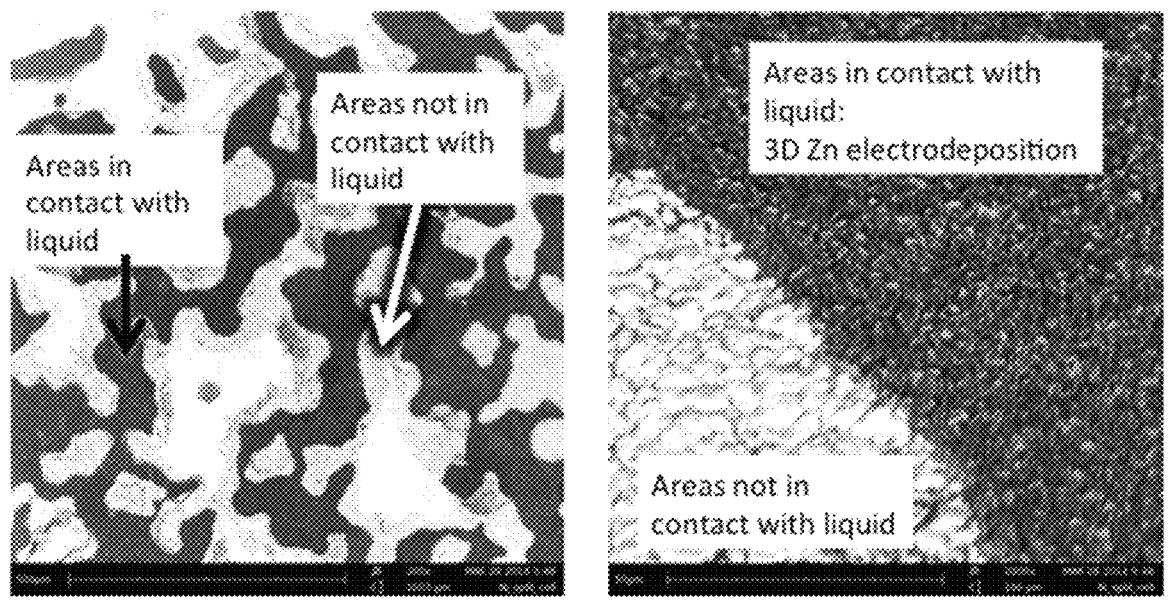
FIG. 17 provides electron micrographs of early stages of three-dimensional Zn electrodeposition on a surface in contact with a flowable electrolyte.

FIG. 17 provides electron micrographs of early stages of three-dimensional Zn electrodeposition on a surface in contact with a flowable (e.g., liquid phase) electrolyte in an electrochemical cell. In this example, the electrolyte comprises an ionic liquid. The electron micrographs use a backscatter detector of electrodeposition of Zn on the surface. Dark areas with visible three-dimensional structure in the higher magnification image on the right are Zn plates/dendrites forming into a free liquid. The three-dimensional growth into the liquid (e.g., during charging) may ultimately lead to cell shorting and failure due to shorting. This phenomenon of non-planar Zn deposition may in some cases occur in voids and intergranular spaces in solid films formed from suspensions. In some cases, it may be prevalent due to accelerated deposition in areas where there is a greater or more active presence of low viscosity liquid and/or an absence of physical or surface energy blocking effects of the polymers or other components in the electrolyte or electrode binder mixture. The low electrical conductivity gap (e.g., the electrolyte) between the negative electrode (anode during discharging) and the positive electrode (cathode during discharging) and/or their respective current collectors may be reduced as a result of the non-planar Zn deposition. The growth of Zn between the electrodes may occur at the surface(s) of anode metal particles (e.g., particles comprising Zn or an alloy of Zn with, for example, indium (In) or bismuth (Bi)), anode metal-containing anode-contacting metal foils (e.g., metal foils comprising Zn or an alloy of Zn with, for example, indium (In) or bismuth (Bi)), current collectors or other foils, films, coatings or printed features (e.g., formed of metal or any other conductive material) in electrical contact with the anode (e.g., current collectors or other foils, films, coatings or printed features comprising, for example, nickel (Ni), stainless steel, titanium (Ti) or carbon (C)), or any combination thereof. In an example, the surface can be a Zn foil surface or a nickel current collector surface.

Thus, in some situations, when depositing films from heterogeneous mixtures such as suspensions, smaller particle suspensions may be promoted in order to decrease or minimize solid voids and/or regions with low polymer content in the resulting films. The voids may in some cases lead to accelerated dendritic growth of positive electrode material (e.g., dendritic growth of anode metal, such as, for example, zinc) in non-solid or low polymer content voids. In some examples, a particle size of the suspended particles of less than or about equal to a film thickness, or in some cases significantly less than the film thickness (e.g., from less than about ½ of the film thickness to less than about 1/10 of the film thickness) may be selected. In some examples, gel electrolytes may be selected to provide a polymer (or particle) network with a given density, separation, size and/or total volume of non-solid or low polymer content (or intergranular) voids. For example, the network may be a factor of at least about 1, 2, 3, 4, 6, 8, 10, 15, 20, 30, 40, 50, 75 or 100 tighter (e.g., having a larger separation and/or a smaller size of non-solid or low polymer content (or intergranular) voids) than a characteristic dimension of the cell, a characteristic dendrite dimension/size, etc. Further, in some cases, the voids may fill with liquid or higher ionic mobility materials due to degradation of the gel, syneresis of the gel (e.g., separation of liquid phase from the gel network or a contraction of the gel accompanied by the separating out of liquid), and/or moisture absorption. A continuous pathway of higher ionic conductivity areas at localized places in the films may lead to current crowding and non-uniformities in local charging and discharging of the electrodes, local electrode swelling, hot spotting and other problems which may lead to poorer overall cell charge or discharge performance and accelerated degradation on cycling (e.g., particularly if degradation mechanisms are non-linearly dependent on current rate).

Electrolyte (and/or other portions of electrochemical cells herein) may be deposited from heterogeneous mixtures such as, for example, suspensions (e.g., not stable solutions). Such heterogeneous mixtures may comprise particles, including particles formed within the electrolyte (or portions thereof), particles added to the electrolyte (or portions thereof), or a combination thereof. For example, nanoparticle dispersions may be added to alter or stabilize electrolyte composition (e.g., the high molarity), consistency, structure or a combination thereof. For example, particle dispersions can enhance stability of high doping (e.g., high molarity) electrolytes.

In some embodiments, the electrolyte may comprise a dispersion of fine solid particles to accommodate a high electrolyte doping level and/or to stabilize a microstructure of a solid film (e.g., solid film formed as a result of printing the electrolyte). Use of such dispersions may lead to, for example, improved battery performance, improved mechanical properties, longer term stability to environmental exposures and flexing, or any combination thereof. High electrolyte molarities of (e.g., liquid) species such as ionic liquids, solvents, and electrolyte salt-imbibed ionic liquids and solvents in polymer gel electrolytes can result in syneresis. High electrolyte molarities of (e.g., liquid) species such as ionic liquids, solvents, and electrolyte salt-imbibed ionic liquids and solvents in polymer gel electrolytes can result in precipitation or segregation of liquid components to form liquid domains and accumulations of liquids within the electrolyte film, at electrolyte/electrode interface(s), at electrode/current collector interface(s), and/or at collector (e.g., current collector), packaging and/or interconnect interface (s).

Figure 18A:
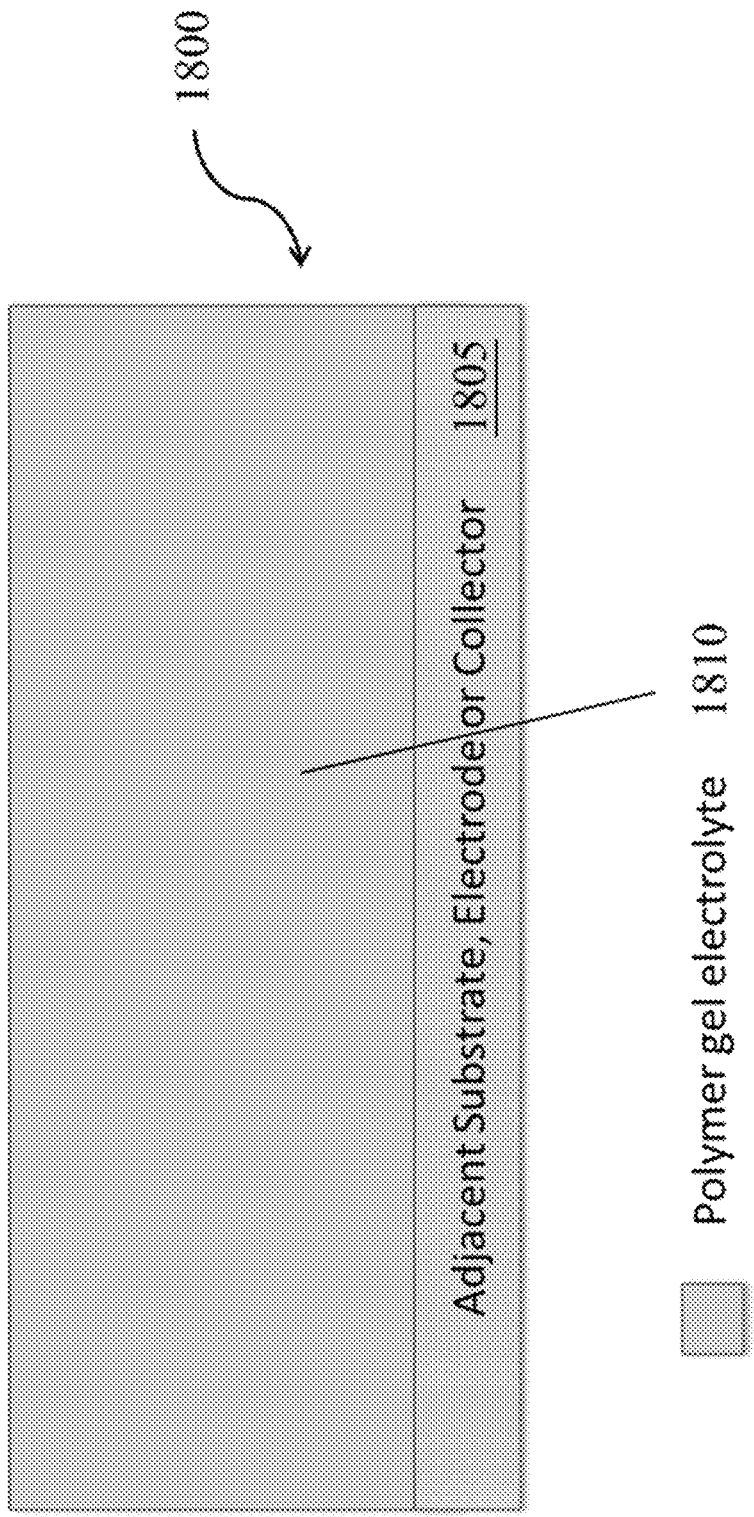
FIGS. 18A-18E schematically illustrate electrolyte films with various compositions, consistencies and/or morphologies, including examples of liquid accumulations in an electrolyte film.
Figure 18B:
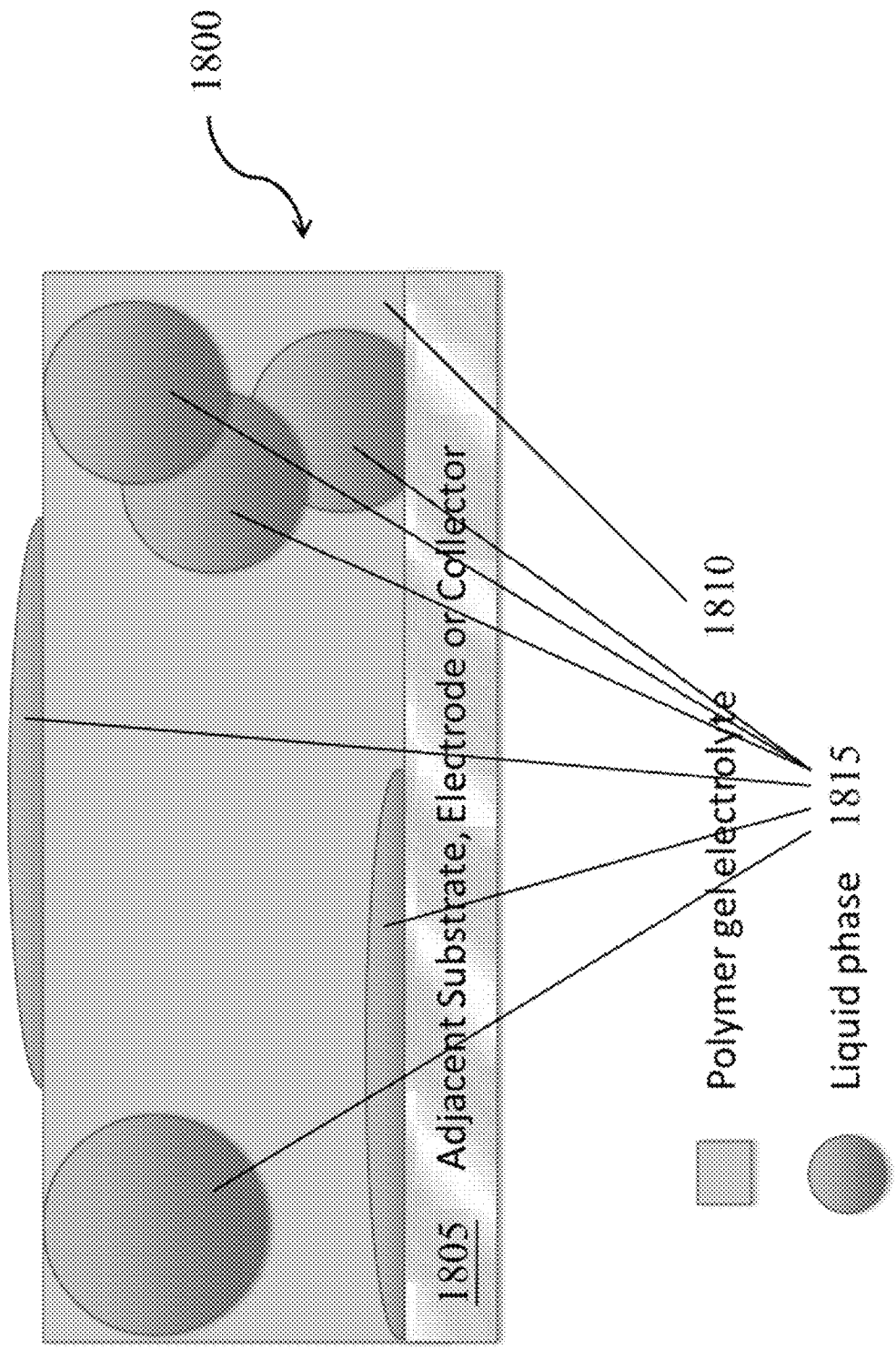
Figure 18C:
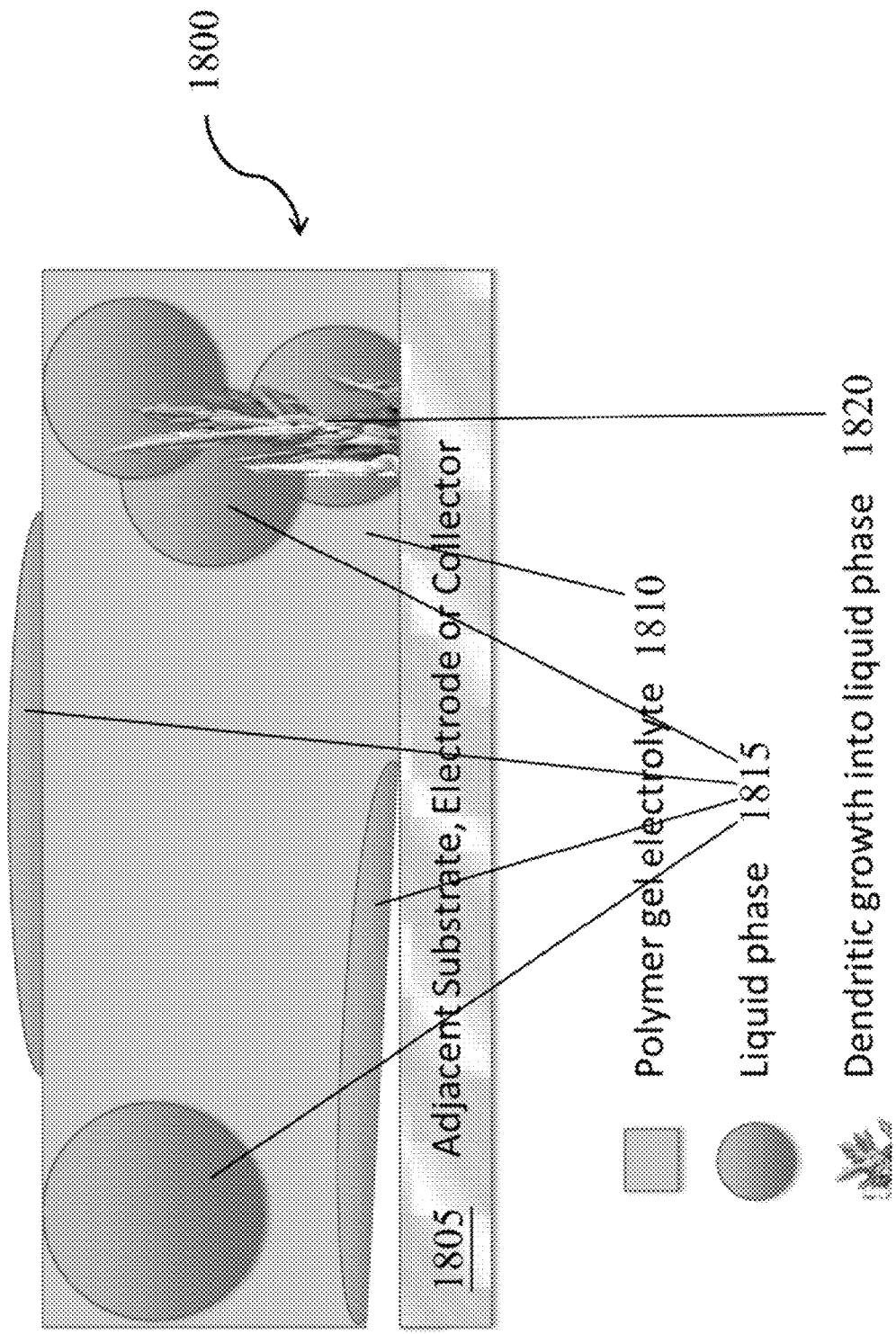
Figure 18D:
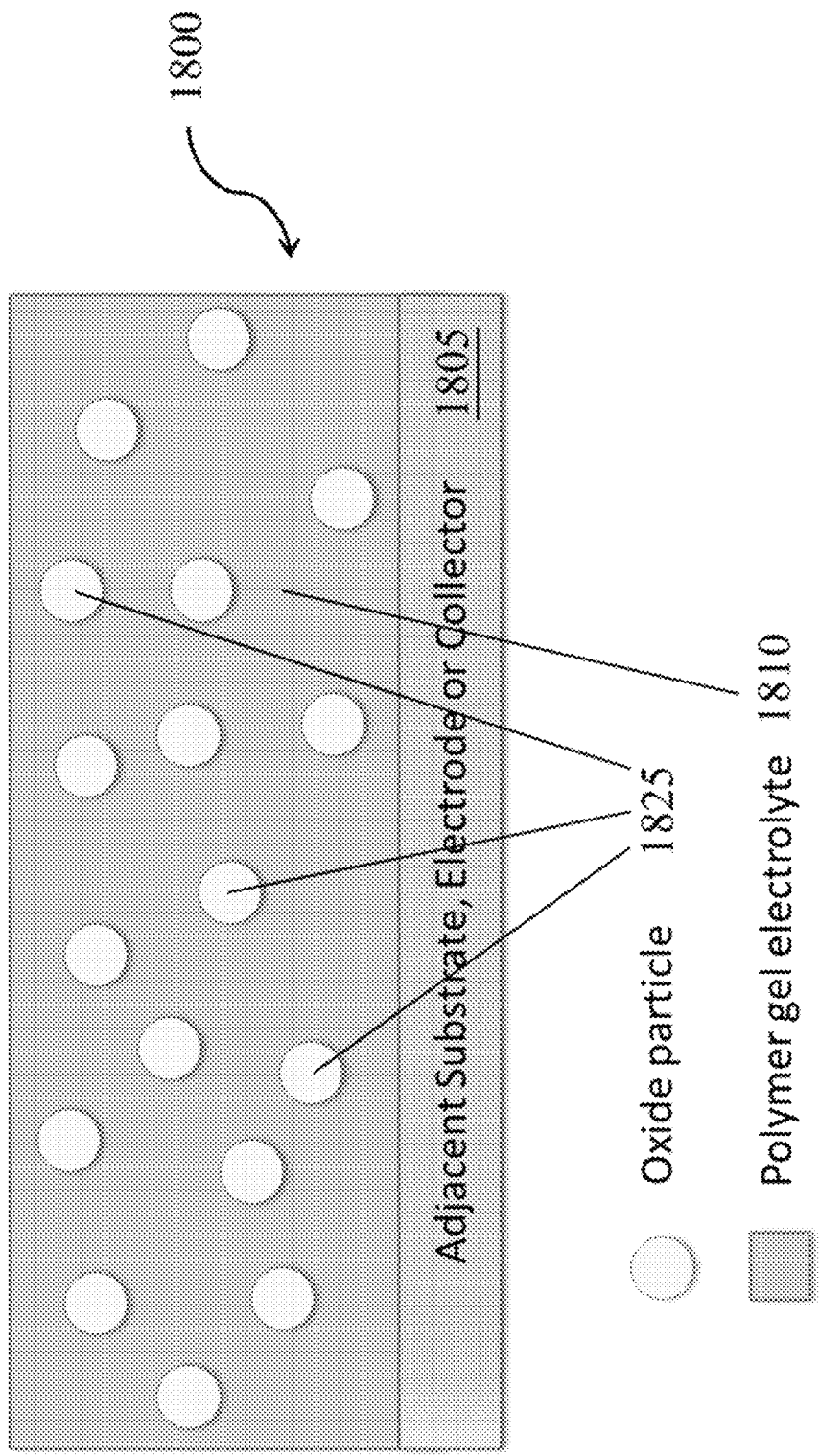
Figure 18E:
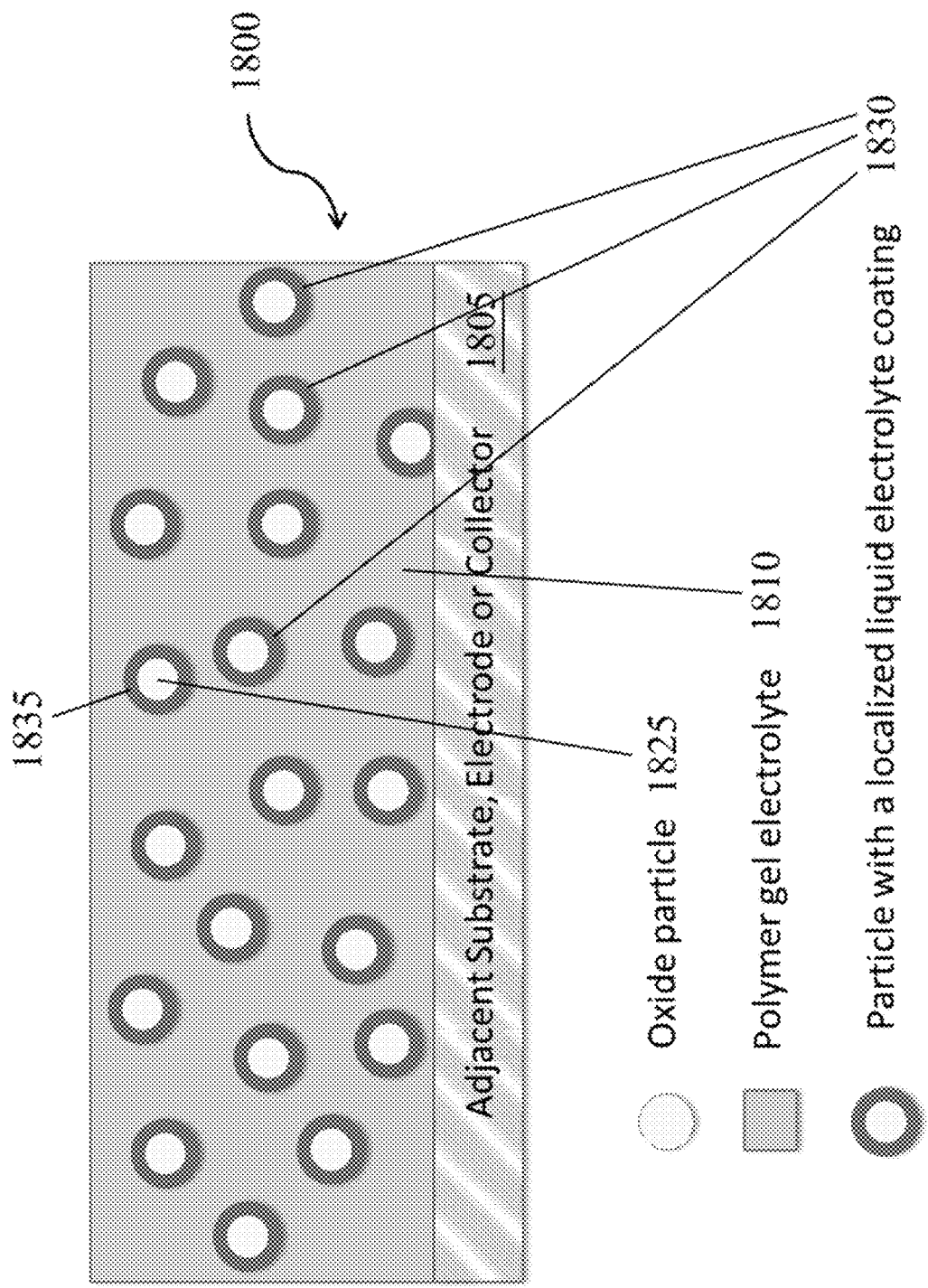

FIGS. 18A-E schematically illustrate electrolyte films with various compositions, consistencies and/or morphologies, including examples of liquid accumulations in an electrolyte film. FIG. 18A shows a polymer gel electrolyte film 1800 on an adjacent substrate, electrode or collector (e.g., current collector) 1805. The polymer gel electrolyte film 1800 in FIG. 18A is homogeneous and comprises a polymer gel electrolyte 1805. FIG. 18B shows the polymer gel electrolyte film 1800 with liquid domains or phases (e.g., large scale liquid domains) 1815 appearing from uncontrolled syneresis, precipitation or segregation of liquid. The liquid domains or phases 1815 can be interspersed within the bulk of the polymer gel electrolyte 1810, at inner interface(s) of the polymer gel electrolyte 1810, at outer interface(s) of the polymer gel electrolyte 1810 (e.g., the top interface of the polymer gel electrolyte film 1800 shown in FIGS. 18B-C), or any combination thereof. FIG. 18C shows the polymer gel electrolyte film 1800 with dendritic and delamination effects from large scale liquid domains appearing from uncontrolled syneresis, precipitation or segregation of liquid. In FIG. 18C, dendritic growth (e.g., into liquid phase) 1820 may occur in the polymer gel electrolyte film 1800. The dendritic growth can occur in concert with the liquid domains or phases (e.g., large scale liquid domains) 1815. Presence of the liquid domains or phases 1815 may in some cases enhance the dendritic growth. One or more of the liquid domains or phases 1815 may shift. For example, one or more of the liquid domains or phases 1815 at an interface (e.g., the inner interface shown in FIG. 18C) of the polymer gel electrolyte 1810 may detach from the interface (e.g., causing delamination). FIG. 18D shows the polymer gel electrolyte film 1800 with particle dispersion comprising, for example, oxide particles (e.g., oxide particle additive) 1825. The oxide particles may be distributed within the polymer gel electrolyte 1810. FIG. 18E shows the polymer gel electrolyte film 1800 with particle dispersion with liquid phase at particle/electrolyte interface. The particles may be distributed within the polymer gel electrolyte 1810. The particle dispersion can comprise, for example, particles 1830 with a localized liquid electrolyte coating. The particles may in some cases comprise the oxide particles 1825 coated with a localized electrolyte coating 1835. The localized electrolyte coating 1835 may be formed as a result of, for example, preferential precipitation, separation or segregation of liquid (e.g., liquid within the polymer gel electrolyte film 1800) to the interfacial region between the particles and the polymer gel electrolyte 1810.

The presence of liquid accumulations (e.g., the liquid domains or phases 1815), particularly in larger size domains, may cause unwanted effect(s) including, but not limited to, (i) promoting the growth of anode metal dendrites into these liquid domains, (ii) liquid domains that compromise the integrity of the film interface with adjacent layers, leading to mechanical delamination and/or electrical instability, (iii) localization of electrolyte into more dispersed larger domains, leading to depletion of essential electrolyte components from other areas of the electrolyte, or any combination thereof. Dispersions of fine solid particles, which can be inorganic, organic or polymeric in nature, may alleviate the tendency toward liquid syneresis and large scale phase separation by providing, for example, a fine, small lengthscale dispersion of sites at which liquid domains are preferentially situated (e.g., due to preferential precipitation, separation or segregation of liquid to the interfacial region between the particles and the electrolyte film).

Suppression of liquid accumulations at the top interface of the electrolyte (e.g., see FIGS. 18B-C) or other printed film or layer by using a particle dispersion can be advantageous, as the liquid accumulations can interfere with printing of subsequent layers. For example, suppression of liquid accumulation at the top interface of a printed layer may be advantageously used for low volatility liquids such as, for example, some ionic liquids (e.g., EMIM TFO, EMIM TFSI and/or other ionic liquids herein), because ionic liquid accumulations after printing and/or during process solvent drying steps may not be easily removed by thermal means.

Relatively small particles may be used such that the liquid wetting surface area of the particle is increased per mass or volume of particle additive. For example, particles with diameter(s) less than a thickness of the electrolyte film can be used. Particles with characteristic size(s) (e.g., diameter (s)) less than or equal to about 5 microns ($\mu m$), 4 $\mu m$, 3 $\mu m$, 2 $\mu m$, 1 $\mu m$, 900 nanometers (nm), 800 nm, 700 nm, 600 nm, 500 nm, 400 nm, 300 nm, 200 nm, 100 nm, 50 nm, 25 nm, 10 nm, 5 nm, 1 nm or less may be used. In some examples, particles may have diameter(s) less than about 1 $\mu m$, or less than about 100 nm, Individual particles in a plurality of particles may have substantially similar or different diameters. Different individual diameters can be within a given range or boundary (e.g., individual diameters may be different but may all be less than about 1 micron or 100 nm). Smaller particles (e.g., 100 nm to 10 nm, or less) may be more easily suspended in formulations (e.g., liquid formulations) used for processing of electrolyte film precursor solutions or inks, thus, for example, aiding (e.g., extending) usable lifetime of the precursor formulations or inks and/or improving their flow properties during deposition.

Addition of nanoparticles may be explored to improve ionic conductivity in polymer electrolytes by way of adding percolation networks of higher ionic conductivity through dense nanoparticle dispersions. Illustrative examples of such functionality are described in Das et al., "INFLUENCE OF OXIDE PARTICLE NETWORK MORPHOLOGY ON ION SOLVATION AND TRANSPORT IN "SOGGY SAND" ELECTROLYTES," J. Phys. Chem. B 114(20) (2010) 6830-6835, incorporated herein by reference in its entirety. Lower, sub-percolation particle densities may be used (e.g., see FIG. 19).

The particles may be organic or polymeric in nature. The particles may include surface areas or regions with suitable (e.g., good or high) compatibility or swelling tendency toward the electrolyte liquid components (e.g., components of the electrolyte with a tendency to form liquid domains or phases 1815) that they are intended to control distribution of Wetting, swelling and/or compatibility of these surface areas with the liquid electrolyte components (e.g., components comprising electrolyte liquid species) may be enhanced by surface energy treatment(s) such as, for example, plasma and/or ozone exposure(s), addition(s) of one or more surfactants, addition(s) of heterophilic polymer(s) or copolymers, or any combination thereof. Wetting, swelling and/or compatibility of these surface areas with the liquid electrolyte components (e.g., components of the electrolyte with a tendency to form liquid domains or phases 1815) may be enhanced by presence of ethylene oxide, propylene oxide or hexafluoropropylene groups (e.g., at the surface of the particles), presence of polymers or copolymers at the surface, presence of tethered anion or cation groups (e.g., at the surface of the particles), other surface modifying materials, or any combination thereof (or in combination with one or more surface energy treatments). The cation or anion groups may correspond to or be structurally similar to the cation(s) or anion(s) in the electrolyte liquid species (e.g., triflate, TFSI, DCA, EMIM, BMIM or pyrrolidinium). The surface modifying materials may be based on polymerized cations or anions (e.g., ionic and ionic liquid polymers). Illustrative examples of polymer ionic liquids are set forth in Yuan et al., "POLY(IONIC LIQUID)S: AN UPDATE," Progress in Polymer Science, 38 (2013) 7, 1009-1036, incorporated herein by reference in its entirety.

The particles themselves may comprise (e.g., be composed of) polymer and/or copolymeric species such as ionic and/or ionic liquid polymers, such as, for example, polystyrene sulfonic acid derivatives or polymer ionic liquids based on pendant or backbone-incorporated anionic or cationic moeities (e.g., imidizolium sidechains). Such polymer and/or copolymer particles may have a suitable arrangement or conformation. For example, a polymer and/or copolymer particle may have an arrangement or conformation in the particle such that the surface has enhanced compatibility with the liquid components of the electrolyte (also "electrolyte liquid components" and "liquid constituents of the electrolyte" herein). The surface may have preferential character from the ionic groups (e.g., from or among the ionic groups in the particle and/or from the ionic groups in the electrolyte) such that compatibility with the liquid components of the electrolyte is enhanced. For example, a tethered or backbone-incorporated cation or anion of the particle can have an equal or higher affinity to one or more given counterions in the electrolyte (e.g., a counterion in a liquid component of the electrolyte) than the given (electrolyte) counterions have to other ions in the electrolyte.

The surface wetting and/or compatibilization steps herein may produce or promote ionic conductivity channels (e.g., create enhanced ionic conductivity channels along the particle surfaces). The surface wetting and/or compatibilization steps herein may decrease or limit (e.g., prevent) formation of larger domains of liquid by, for example, encouraging a smaller dispersion to form by providing nanoparticle nucleated sites for the liquid to appear at (e.g., otherwise it may spontaneously collect in larger areas or at interfacial areas). The surface wetting and/or compatibilization steps may increase ionic conductivity and decrease formation of larger domains of liquid. The localization of the liquid to the particles may serve to effectively trap more liquid in the film, which may serve as a reservoir of liquid that can maintain the film at its saturation limit (e.g., even if some liquid components are deactivated, decomposed, diffuse away or mayotherwise be depleted). A decrease or elimination/avoidance of the formation of large liquid voids may advantageously aid in decreasing or limiting (e.g., preventing) large scale dendrite growth that may grow larger in large liquid domains, and/or preventing appearance of liquid at interfaces where it can cause mechanical delamination, cause electrical isolation of electrodes and current collectors or interfere with subsequent printing.

FIGS. 19A-B provide optical images showing printed cell delamination in electrochemical cells without nanoparticle dispersion (FIG. 19A) and with nanoparticle dispersion (FIG. 19B). The nanoparticle dispersion can comprise oxide particles. FIG. 19A is an image of a printed stack comprising underlying rectangular concentric current collector and cathode films 1901 (dark), electrolyte (semitransparent film) 1902, anode film (grey) 1903 and an anode collector film (center dark) 1904 on stainless foil without nanoparticle dispersion, showing delamination and curling of the electrolyte film edge related to liquid segregation to the electrolyte interface. FIG. 19B is an image of the same film stack but with a printed rectangular electrolyte film with a zinc oxide nanoparticle additive that reduces syneresis and improves electrolyte adhesion. A reduction in printed cell delamination can be achieved with oxide particles. In the example in FIG. 19, reduced delamination is achieved with an ionic liquid gel electrolyte including a zinc oxide nanoparticle dispersion with the formulation in TABLE 8.

TABLE 8 provides a control formulation and an electrolyte formulation with zinc oxide nanoparticles. The zinc oxide nanoparticle dispersion in this example comprises particles with less than 100 nm in diameter and about 15-25 $m^2$/gram surface area. The electrolyte film in this example is a relatively low weight fraction nanocomposite formulation (e.g., formulation comprising a relatively low weight fraction of nanoparticles).

TABLE 8

| Electrolyte type | PVDF-HFP [w %] | NMP [w %] | Ionic liquid [w %] | Zn triflate [w %] | ZnO < 100 nm, 15-25 $m^2$/g nanoparticles [w %] |
| --- | --- | --- | --- | --- | --- |
| Control | 41 | 184 | 41 | 15 | 0 |
| Electrolyte with zinc oxide nanoparticles | 42 | 184 | 42 | 15 | 2 |

Electrolyte films can be formed from formulations comprising a given amount of nanocomposite (e.g., nanoparticles). The formulations may comprise a relatively low weight fraction nanocomposite (e.g., added as component 1026 (or as additive 1021)). In some examples, a suitable diameter of the nanoparticles may be correlated with a suitable weight (or volume) fraction. For example, different weight fractions of smaller particle additive (e.g., smaller diameter nanoparticles, such as, for example, particles with a characteristic size of about 100 nm to 10 nm, or less) and larger particle additive (e.g., larger diameter nanoparticles, such as, for example, particles with a characteristic size of greater than about 100 nm) may be needed.

Electrolyte films formed from relatively low weight fraction nanocomposite formulations (e.g., from the example relatively low weight fraction nanocomposite formulation) and/or from other related formulations with smaller diameter nanoparticles may show significantly increased visual opacity. The increase in visual opacity may indicate a microstructural change from the control formulation without nanoparticles (e.g., see TABLE 8). This may indicate the formation of internal scattering interfaces and therefore a gel nanocomposite microstructure with a length scale (also "characteristic microstructural length scale" herein) close to the wavelength of light (e.g., micron to submicron scale). Printed electrolyte film thicknesses can vary, for example, from about 10 microns to about 100 microns such that the characteristic microstructural length scale is less than (e.g., at least about 1, 2, 5, 10, 20, 30, 40, 50, 60, 70, 80, 90, 100, 120, 140, 160, 180, 200, 225, 250, 500, 750 or 1000 times less than) the film thickness. The microstructure may restrict the growth of dendrites through the film thickness (e.g., since a large number of domains and solid regions may have to be crossed for electrode to electrode leakage pathways to emerge).

Negligible or substantially no reduction in battery performance was observed and long term cyclic charging stability was improved in the nanoparticle-based electrolytes herein with a reduction in charging-related failures. These improvements may be attributed to improved stability in electrode redeposition and/or a reduction in the formation of electrode to electrode leakage. Similar stabilization effects were also observed in similar Zn ion electrolytes with non-zinc oxide particles (e.g., with $SiO_2$ particles instead of ZnO particles). A broad range of nanoparticles and structures including, for example, silica, titania and/or similar nanoparticles and high surface area oxides may be used to in microstructures of the disclosure. In some embodiments, use of an oxide particle comprising the same metal cation as the working ion of the electrolyte (e.g., ZnO for a Zn ion conducting electrolyte) may have additional benefits in terms of electrolyte stabilization and buffering. For example, the presence of highly active metal oxide can buffer the electrolyte to prevent highly acidic swings (e.g., during storage or the charge or discharge cycle) that may damage the electrolyte, the electrodes (e.g., via acidic dissolution of $MnO_2$) and/or the collectors.

In an example, an electrochemical cell comprises an electrolyte comprising a small particle dispersion which serves to modify the morphology of the electrolyte film (e.g., to prevent detrimental effects in some high molarity electrolytes, such as, for example, large liquid domain formation within the electrolyte or at electrolyte interfaces with other battery components such as an underlying electrode, current collector or foil). The electrolyte can include a dispersion of solid particles with a particle size (e.g., diameter) that is less than a thickness of the electrolyte film. At least a portion of the particles can be or can comprise oxide particles. At least a portion of the particles (e.g., oxide particles) can be less than about 1 micron or less than about 100 nanometers (nm) in diameter. For example, the particles can have a diameter of less than about 100 nm. At least a portion of the particles can have a surface area of greater than or equal to about 1 meter square per gram ($m^2/g$), 10 $m^2/g$ or 15 $m^2/g$. For example, the particles can have a surface area of at least about 15 $m^2/g$. At least a portion of the particles can be or can comprise solid polymer particles with a low solubility (e.g., less than about 10% by volume, or in some cases less than about 2%, 4%, 6%, 8%, 10%, 12%, 14%, 16%, 18%, 20% or 25% by volume) for liquid constituents (e.g., liquid phase) of the electrolyte. Particles surface(s) may be modified (e.g., prior to addition to the electrolyte) to increase an affinity of the liquid constituents of the electrolyte to the particle surface. The particle surface(s) may be modified, for example, with a copolymer, an organic oxide (e.g., ethylene oxide or propylene oxide), a copolymer, an ionic polymer or a polymer ionic liquid in which either a cation or anion is tethered to or incorporated into the backbone of the polymer, or any combination thereof. The cation or anion of the particle can have an equal or higher affinity to a counterion in the electrolyte than other ions in the electrolyte.

Electrochemical cells formed with electrolytes of the disclosure (e.g., high doping formulations herein) may achieve improved cycling and/or capacity (also "discharge capacity" herein) performance. An electrochemical cell may have a capacity of at least about 0.001 milliampere-hours (mAh). In some examples, the electrochemical cells may have a capacity after 1 cycle (also "cycle 1 capacity" herein) of at least about 0.01 milliampere-hour (mAh), 0.05 mAh, 0.1 mAh, 1.0 mAh, 10 mAh, 100 mAh, and the like. In some cases, the capacity may be expressed on a per electrode material basis (e.g., per positive electrode material basis) such as 10 mA/g, 50 mAh/g, 100 mAh/g, 200 mAh·g, 300 mAh/g, 400 mAh/g, and the like. The discharge capacity can also be expressed on a per unit area basis such as 0.1 milliampere-hour per square centimeter ($mAh/cm^2$), 0.2 $mAh/cm^2$, 0.3 $mAh/cm^2$, 0.4 $mAh/cm^2$, 0.5 $mAh/cm^2$, 0.6 $mAh/cm^2$, 0.7 $mAh/cm^2$, 0.8 $mAh/cm^2$, 0.9 $mAh/cm^2$, 1 $mAh/cm^2$, 1.1 $mAh/cm^2$, 1.2 $mAh/cm^2$, 1.3 $mAh/cm^2$, 1.4 $mAh/cm^2$, 1.5 $mAh/cm^2$, 1.6 $mAh/cm^2$, 1.7 $mAh/cm^2$, 1.8 $mAh/cm^2$, 1.9 $mAh/cm^2$, 2 $mAh/cm^2$, 2.2 $mAh/cm^2$, 2.4 $mAh/cm^2$, 2.6 $mAh/cm^2$, 2.8 $mAh/cm^2$, 3 $mAh/cm^2$, 3.5 $mAh/cm^2$, 4 $mAh/cm^2$, 4.5 $mAh/cm^2$, 5 $mAh/cm^2$, 6 $mAh/cm^2$, 7 $mAh/cm^2$, 8 $mAh/cm^2$, 9 $mAh/cm^2$, 10 $mAh/cm^2$, 11 $mAh/cm^2$, 12 $mAh/cm^2$, 13 $mAh/cm^2$, 14 $mAh/cm^2$, 15 $mAh/cm^2$ and the like of either cathode area, anode area or current collector area of either electrode. This per unit area definition can be of particular utility for designing printed batteries where the processing is more easily characterized on an areal basis due to the areal nature of these fabrication processes. The electrochemical cells may be rechargeable. In some cases, the capacity may change with cycle number. In some examples, the capacity between cycles may decrease by less than about 0.001%, 0.01%, 0.1%, 1%, 2%, 5%, 10%, 15%, 20%, 25%, 30%, and the like. In some examples, the capacity between cycles may increase by greater than about 0.001%, 0.01%, 0.1%, 1%, 2%, 5%, 10%, 15%, 20%, 25%, 30%, and the like. In some examples, the electrochemical cells may achieve at least about 1, 5, 10, 15, 20, 25, 50, 100, 150, 200, 250, 500, 1000, 2000, 5000, 10000, 15000, 20000, 30000, 40000, 50000 or more charge/discharge cycles. The capacity after the last cycle may be at least about 99.9%, 99.5%, 99%, 98%, 95%, 90%, 85%, 80%, 75%, 70%, 60% or 50% of the cycle 1 capacity. Further examples of electrochemical cell performance are provided below.

EXAMPLES

Example 1

Figure 7:
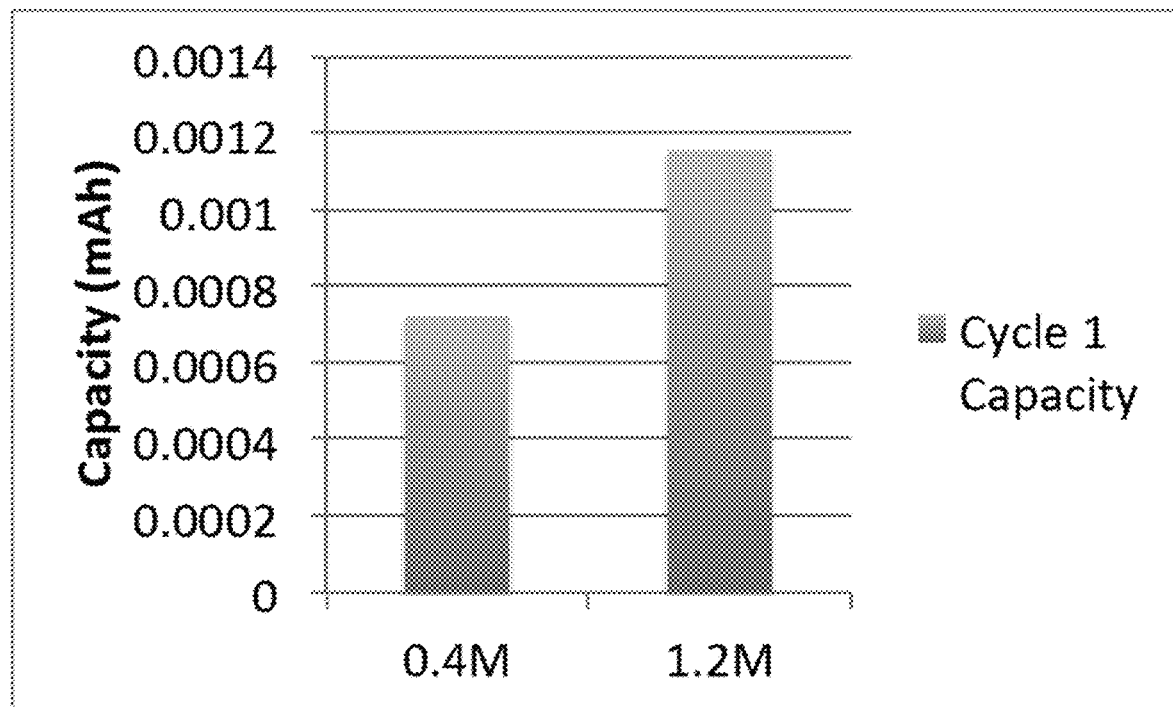
FIG. 7 provides experimental results comparing capacities of an electrolyte comprising 0.4 M Zn salt dopant in ionic liquid carrier versus an electrolyte comprising 1.2 M Zn salt dopant in ionic liquid carrier.

FIG. 7 provides experimental results comparing capacities (in mAh) of an electrolyte comprising 0.4 M Zn salt dopant in ionic liquid carrier versus an electrolyte comprising 1.2 M Zn salt dopant in ionic liquid carrier. The data was obtained using a printed architecture built from a Zn foil anode substrate, stencil printed electrolyte, $MnO_2$/C/PVDF-HFP cathode, and topped with a C/PVDF current collector. The printed architecture was packaged with a stainless steel contact foil and a pressure sensitive adhesive coated plastic film. Cycle capacities were measured after 1 cycle (also "cycle 1 capacity" herein).

Cycle 1 capacities were measured for Zn OTf/BMIM OTf ionic liquid/PVDF-HFP film electrolytes with Zn triflate in BMIM triflate molarities from about 0.4 M to about 1.2 M. Cycle 1 capacities were also measured for Zn TFSI/EMIM TFSI ionic liquid/PVDF-HFP film electrolytes with Zn TFSI in EMIM TFSI molarities from about 0.4 M to about 1.2 M. Due to lack of availability of reproducible Zn TFSI density numbers, TFSI molarities were estimated assuming that Zn TFSI density in the ionic liquid is the same as Zn OTf density in the ionic liquid. For example the Zn TFSI weight fraction of electrolyte, which may be defined as the weight of the Zn TFSI as a fraction of the combined weights of the Zn TFSI and EMIM TFSI, can be 12%, 27%, 33% or higher. For example the Zn TFSI weight fraction of electrolyte including the polymer, which may be defined as the weight of the Zn TFSI as a fraction of the combined weights of the Zn TFSI, the EMIM TFSI, and the PVDF or PVDF-HFP polymer, can be 6.6%, 15%, 25% or higher.

The molarities were determined to within uncertainties associated with uncertainties in density due to moisture content.

In this example, increasing the zinc salt molarity uniformly boosted the cycle 1 capacity in electrochemical cells comprising Zn foil anodes and printed $MnO_2$/C cathodes by a factor greater than 1.5 for both OTF and TFSI electrolytes. Additional experiments over a broadened range of formulations were also conducted, yielding a similar result: electrolyte formulations with higher molarity of the Zn salt in the ionic liquid (e.g., beyond the light scattering-inferred solubility limit) achieved improved performance.

Example 2

TABLE 9 provides average cycle 1 discharge capacities (in mAh) from sets of cells comprising electrolytes with 0.5 M ("100"), 1.2 M ("200") and 1.6 M ("300") Zn OTf in BMIM OTf (PVDF-HFP not included in molarity calculation) (top). TABLE 9 further provides 95% confidence interval analysis, showing that the differences in the observed capacity variable are statistically significant ("TRUE"=95% confidence test passed) when taking into account the spread of measured performance for the measured capacities in the experiment (bottom).

TABLE 9

| | Cycle 1 capacity |
|---|---|
| 100 | 0.000593 |
| 200 | 0.0009455 |
| 300 | 0.00120775 |

| | Cycle 1 compare |
|---|---|
| 200/100 | 1.594435076 |
| | TRUE |
| 300/100 | 2.036677909 |
| | TRUE |
| 300/200 | 1.277366473 |
| | TRUE |

Figure 8:
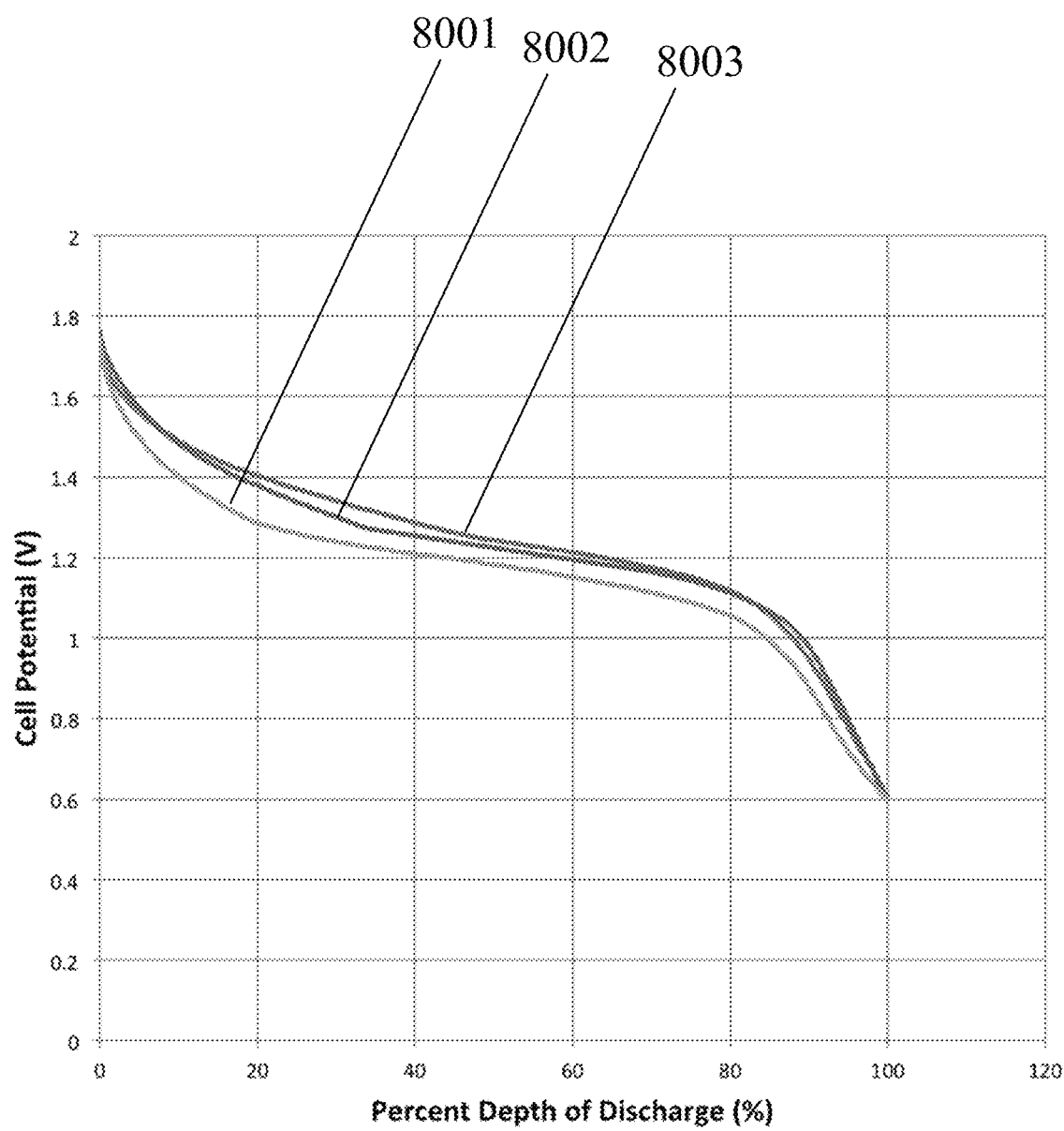
FIG. 8 provides discharge voltage curves for Zn OTf/BMIM OTf-based solid gel electrolytes with various compositions.

FIG. 8 provides discharge voltage curves (cell potential versus depth of discharge for cell) for Zn triflate/BMIM triflate-based solid gel electrolytes (with PVDF-HFP not included in molarity calculation) with 1.6 M salt in ionic liquid 8001, 1.2 M salt in ionic liquid 8002 and 0.5 M salt in ionic liquid 8003. The potential curves do not change dramatically in shape but indicate a slightly lower voltage for the heaviest doped samples. High performance from electrolytes comprising high salt in ionic liquid molarities (e.g., beyond 1 M) were also observed in trials using similar formulations in a Zn triflate/EMIM triflate electrolyte system. In some examples, higher molarities may be used for the Zn triflate/EMIM triflate due to smaller molecular size of EMIM triflate compared to BMIM triflate.

Example 3

In this example, comparisons of an electrochemical cell comprising an electrolyte with a Zn OTf/EMIM OTf Formulation 1 with two electrochemical cells comprising electrolytes with a Zn OTf/EMIM OTf Formulation 2 are provided.

TABLE 10 provides electrolyte and electrode layer doping parameters. The Zn salt molarity in the Formulation 1 electrolyte ("400") is approximately 40% of the Zn salt molarity in the Formulation 2 electrolytes ("100" and "300"). As described in greater detail elsewhere herein, electrochemical cells herein may comprise doped electrodes and/or current collectors to suppress outdiffusion (e.g., especially in high doping formulations). The "100" electrolyte comprises a doped electrode layer, while the "300" and "400" electrolytes comprise undoped electrode layers.

TABLE 10

| Series | Variable | Doped layers? |
|---|---|---|
| 100 | Formulation 2 | Doped |
| 300 | Formulation 2 | Undoped |
| 400 | Formulation 1 (~0.4 × Zn OTf salt molarity) | Undoped |

Figure 11:
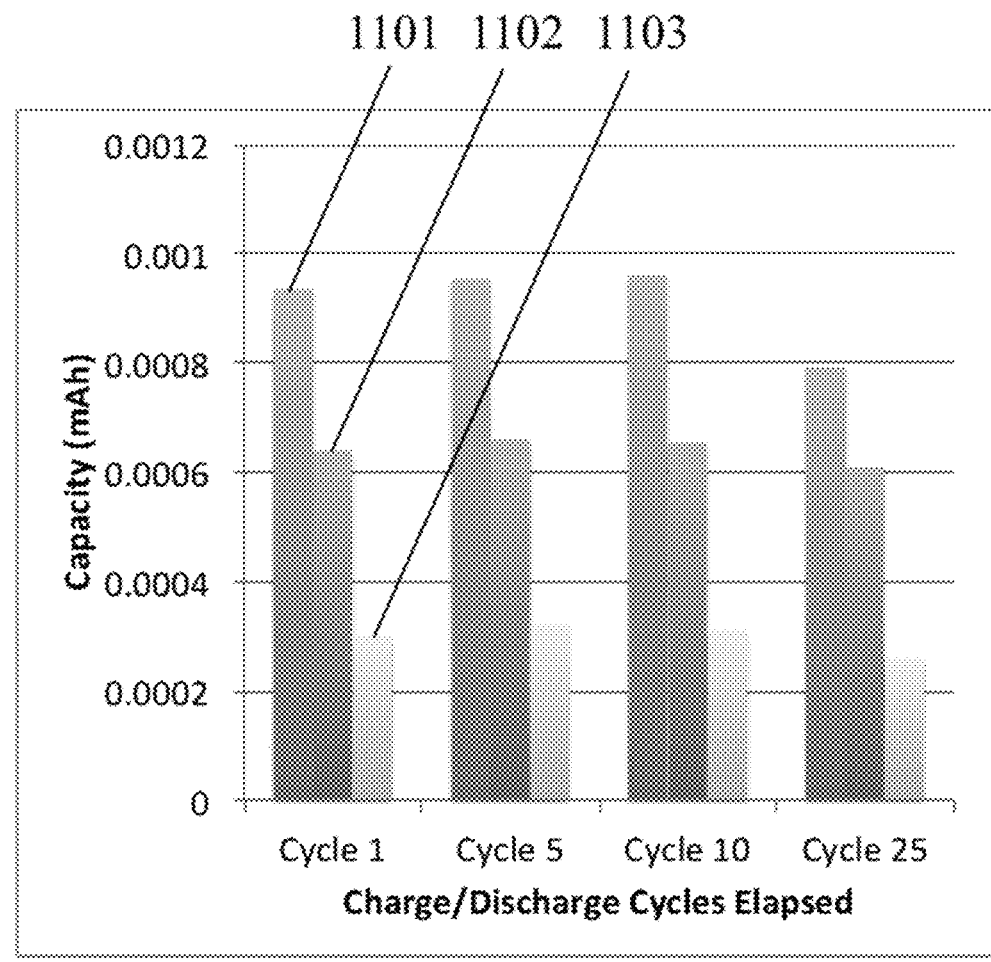
FIG. 11 provides discharge capacites (mAh) versus charge/discharge cycle number for a range of Zn OTf/EMIM OTf/PVDF solid polymer gel electrolytes and various electrode configurations.

FIG. 11 provides discharge capacities versus charge/discharge cycle number for electrochemical cells comprising Zn OTF/EMIM OTf/PVDF solid polymer gel electrolytes and various electrode configurations. The electrochemical cells comprise a 1.2 M Zn OTf electrolyte formulation with doped electrodes and current collectors 1101 ("100" electrolyte in TABLE 10), a 1.2 M Zn OTf electrolyte formulation with undoped electrodes and current collectors 1102 ("300" electrolyte in TABLE 10) and a 0.48 M Zn OTf electrolyte formulation with undoped electrodes and current collectors 1103 ("400" electrolyte in TABLE 10) (molarity calculated based on the Zn OTf in EMIM OTf only).

TABLE 11 provides examples of impedance analysis results for the electrochemical cells in TABLE 10 and FIG. 11. A comparison of the capacities of the "100" electrochemical cell with the "300" electrochemical cell indicates that not doping electrode and collector interfacial layers resulted in a capacity loss of about 33%. A comparison of the "300" electrochemical cell with the "400" electrochemical cell indicates that using a Formulation 1 electrolyte resulted in a capacity loss of about 66%. Thus, the high molarity formulations (~1.2M Zn OTF in the ionic liquid, Formulation 2) show substantially higher performance compared to the lower molarity formulation (~0.48 M, Formulation 1). The higher doping (e.g., higher molarity, such as, for example, >1 M) formulations may outperform the lower doping (e.g., lower molarity) electrolytes in terms of cell capacity. Lower impedance and higher rate capability for higher doping (e.g. higher molarity) electrolytes was also observed.

TABLE 11

| Series | 0.1 HZ, x value - resistance | 0.1 HZ, y value - capacitance | HF IR - R1 (Ohm) | Circle right side intercept - R2 (Ohm) |
|---|---|---|---|---|
| 100 | 66.125 | 19.09 | 17.485 | 25.205 |
| 300 | 90.53 | 26.41 | 28.11 | 26.29 |
| 400 | 115.869 | 39.172 | 25.2086 | |

Devices, systems and methods of the disclosure may be combined with or modified by other devices, systems and methods, such as electrochemical cells and printing methods described in PCT Patent Publication No. WO 2012/037171 ("IONIC GEL ELECTROLYTE, ENERGY STORAGE DEVICES, AND METHODS OF MANUFACTURE THEREOF"), U.S. patent application Ser. No. 13/844,221 ("ELECTROLYTIC DOPING OF NON-ELECTROLYTE LAYERS IN PRINTED BATTERIES"), Ho et al., "DIRECT WRITE DISPENSER PRINTING OF A ZINC MICROBATTERY WITH AN IONIC LIQUID GEL ELECTROLYTE," J. Micromech. Microeng. 20 (2010) 104009, and Ho, "Dispenser Printed Zinc Microbattery with an Ionic Liquid Gel Electrolyte," Ph.D. Dissertation, University of California, Berkeley (2010) 3444643 (UMI), which are entirely incorporated herein by reference.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electrochemical cell, comprising:
    a positive electrode;
    a negative electrode; and
    a printed electrolyte between the positive electrode and the negative electrode, the printed electrolyte comprising:
    an ionic liquid comprising at least one anion selected from the group consisting of bis(fluoromethanesulfonyl) imide, bis(fluorosulfonyl) imide, bis(trifluoromethanesulfonyl) imide, triflate, trifluoromethanesulfonate, and tetrafluoroborate; and
    a metal salt that releases multivalent cations when dissolved in the ionic liquid; wherein the multivalent cations are selected from at least one of zinc, aluminum, magnesium, and yttrium;
    wherein the molarity of the multivalent cations in the ionic liquid is greater than 1 molar (M);
    wherein the electrochemical cell is rechargeable.

2. The electrochemical cell of claim 1, wherein the molarity of the multivalent cations in the ionic liquid is greater than about 1.2 M.

3. The electrochemical cell of claim 1, further comprising (i) ethylene glycol or a related low molecular weight ethylene oxide derivative that increases ionic conductivity of the printed electrolyte, reduces viscosity of the electrolyte, or a combination thereof; or (ii) a fluorinated polyether that increases ionic conductivity of the printed electrolyte, reduces viscosity of the printed electrolyte, or a combination thereof.

4. The electrochemical cell of claim 1, wherein:
    (a) the metal salt comprises a mixture of anion types, and wherein the metal salt has a lower melting point than a neat metal salt comprising only one of the anion types; or
    (b) a ternary, quaternary or higher order mixture of anions has a lower melting point than (i) any individual binary mixture of the anions or (ii) a mixture comprising only one of the anions or any lower order mixture of the anions.

5. The electrochemical cell of claim 1, wherein the printed electrolyte comprises a mixture of cations and anions, and wherein the mixture comprises one or more cation types.

6. The electrochemical cell of claim 5, wherein a ternary, quaternary or higher order mixture of the cations and anions has a lower melting point than any individual binary, ternary, or lower order mixture of the cations and anions.

7. The electrochemical cell of claim 1, wherein the ionic liquid comprises at least one cation selected from the group consisting of imidazolium, pyrrolidinium, alkylammonium, pyridinium, piperidinium, phosphonium, and sulfonium.

8. The electrochemical cell of claim 1, wherein the printed electrolyte further comprises a carrier.

9. The electrochemical cell of claim 8, wherein the carrier comprises an ionic liquid, a carbonate, a fluorinated carbonate, or any combination thereof.

10. The electrochemical cell of claim 1 wherein the printed electrolyte forms a heterogeneous gel electrolyte mixture in a flowable state.

11. The electrochemical cell of claim 1, wherein the printed electrolyte comprises water under ambient conditions.

12. The electrochemical cell of claim 11, wherein the printed electrolyte comprises no more than about 5 weight percent of water under ambient conditions.

13. The electrochemical cell of claim 1, wherein the positive electrode comprises a metal oxide selected from the group consisting of manganese dioxide, vanadium pentoxide, cobalt oxide, and lead oxide.

14. The electrochemical cell of claim 8, wherein the molarity of the metal salt in the carrier exceeds the solubility limit of the metal salt in the carrier.

15. An electrochemical cell comprising:
    a positive electrode;
    a negative electrode; and
    a printed electrolyte between the positive electrode and negative electrode, the printed electrolyte comprising:
    an ionic liquid comprising at least one anion selected from the group consisting of bis(fluoromethanesulfonyl)

imide, bis(fluorosulfonyl) imide, bis(trifluoromethanesulfonyl) imide, triflate, trifluoromethanesulfonate, and tetrafluoroborate; and at least one metal salt that releases multivalent cations when dissolved in the ionic liquid; wherein the multivalent cations are selected from ions of at least one of zinc, aluminum, magnesium, and yttrium;

wherein the electrochemical cell has a capacity of at least about 1.5 milliampere-hour per square centimeter (mAh/cm$^2$);

wherein the electrochemical cell is rechargeable.

16. The electrochemical cell of claim 15, wherein the printed electrolyte forms an electrolyte film, and wherein the printed electrolyte comprises a dispersion of particles with a particle size that is less than a thickness of the electrolyte film.

17. The electrochemical cell of claim 16, wherein the particles are solid.

18. The electrochemical cell of claim 16, wherein the particles comprise (i) oxide particles, or (ii) solid polymer particles with a low solubility for liquid constituents of the printed electrolyte.

19. The electrochemical cell of claim 16, wherein at least a portion of the particles comprises a particle surface modified to increase an affinity of liquid constituents of the printed electrolyte to the particle surface.

20. The electrochemical cell of claim 16, wherein, in (c), the cation or the anion of the particle has an equal or higher affinity to a counterion in the printed electrolyte than other ions in the printed electrolyte.

* * * * *